United States Patent [19]
Heer et al.

[11] Patent Number: 6,028,933
[45] Date of Patent: Feb. 22, 2000

[54] ENCRYPTING METHOD AND APPARATUS ENABLING MULTIPLE ACCESS FOR MULTIPLE SERVICES AND MULTIPLE TRANSMISSION MODES OVER A BROADBAND COMMUNICATION NETWORK

[75] Inventors: Daniel N. Heer, Newton, N.H.; Robert J. Rance, Andover, Mass.

[73] Assignee: Lucent Technologies Inc., Murray Hill, N.J.

[21] Appl. No.: 08/837,423

[22] Filed: Apr. 17, 1997

[51] Int. Cl.[7] ........................................................ H04L 9/00
[52] U.S. Cl. .................................. 380/9; 380/10; 380/20; 380/21; 380/23; 380/25; 380/28; 380/29; 380/48; 380/49
[58] Field of Search .................................. 380/9, 10, 20, 380/21, 23, 25, 28, 29, 46, 48, 49, 50, 59

[56] References Cited

U.S. PATENT DOCUMENTS

| 4,885,778 | 12/1989 | Weiss | 380/48 |
| 5,001,756 | 3/1991 | Mayginnes et al. | 380/48 |
| 5,737,421 | 4/1998 | Audebert | 380/23 |

*Primary Examiner*—Bernarr E. Gregory
*Attorney, Agent, or Firm*—Gibbons, Del Deo, Dolan, Griffinger & Vecchione

[57] ABSTRACT

The specification relates to the encryption of data transmitted over a broadband multiple access bi-directional hybrid fiber/coax (HFC) network. The method supports downstream broadcast encryption from headend to cable modem, and also provides for encryption of transmissions from cable modems back to the headend. Although the present invention is described in relation to an HFC network, it is also equally applicable to a cellular wireless communications environment or any other digital broadcast medium. The invention is implemented in two subdivisions, a slow but secure software encrypting algorithm, and a fast but less secure hardware encrypting algorithm. The combination produces the security of the software subdivision, with the encrypting speed of the hardware subdivision. The encryption method and apparatus supports the various access and transmission modes, such as STM, ATM, and VL. The present invention utilizes a virtual random number generator at the individual cable modems to reduce cable modem hardware. The authentication and key generation process between headend and cable modem produces a mutually authenticated and mutually generated permanent key. The present invention features a cryptosync clock at the headend which is transmitted to individual cable modems as a broadcast clock, thus eliminating a need for a clock at each cable modem.

34 Claims, 23 Drawing Sheets

ENCRYPTING METHOD AND APPARATUS ENABLING MULTIPLE ACCESS FOR MULTIPLE SERVICES AND MULTIPLE TRANSMISSION MODES OVER A BROADBAND COMMUNICATION NETWORK

CROSS REFERENCES TO RELATED APPLICATIONS

This application claims the benefit of U.S. Provisional Application No. 60/019,774, filed on Jun. 14, 1996. This application is related to two other U.S. Patent Applications; the first having a filing date of Apr. 3, 1997, and Ser. No. 08/832255, entitled "Method and Apparatus Enabling Multiple Access for Multiple Services and Multiple Transmission Modes Over a Broadband Communication Network Utilizing an Adaptive Digital Access Protocol," (DOSHI 19-22-13-13-8-9) and having a common assignee; the second having a filing date of Apr. 23, 1997, and Ser. No. 08/841510, entitled "Method and Apparatus for Digital Transmission Incorporating Scrambling and Forward Error Correction While Preventing Bit Error Spreading Associated With Descrambling," (DOSHI 18-21-14-12-7-8) and having a common assignee.

FIELD OF THE INVENTION

This invention relates generally to digital communications and multimedia information transfer via a high bandwidth, bi-directional communications medium, and, in particular, to encryption of digital communications and multimedia information between a common headend and individual cable modems connected via a hybrid fiber/coax network to a common headend. The invention also relates to cellular wireless networks, which are akin to fiber/coax networks, in that mobile stations do not usually communicate directly with each other, but instead depend on a base station for feedback.

BACKGROUND OF THE INVENTION

Broadband hybrid-fiber/coax (HFC) networks provide a flexible, cost-effective platform for offering a wide range of telecommunications services to residences and businesses. One of these services, high-speed multimedia access, is a particularly attractive opportunity for HFC network operators. Some of the envisioned applications include Internet access, the ability to communicate with the office while working at home, voice and video telephony, interactive game playing, etc.

Although there is substantial near-term demand for basic high-speed data access over HFC networks, it is uncertain how interactive data services will evolve over time. There is a strong trend towards the integration of data and non-data services within end-user applications. Highly compelling applications such as 'audio plus data,' 'voice plus data,' and 'audio plus video plus data,' for personal computers and other devices, are all under development. Wide-area network transport infrastructures are migrating towards asynchronous transfer mode (ATM) as bandwidth and quality-of-service (QOS) issues become critical for supporting these applications.

HFC pure data systems installed in the near-term must be gracefully upgradable to support these new integrated applications since it is unreasonable to require wholesale replacement of less flexible early generation equipment that has been optimized for a restricted class of data-centric applications, e.g., those requiring only transport of Ethernet frames or IP packets. Although it may be technically possible to add limited inefficient support for other traffic types to these early systems through "extensions," it is preferable to develop a flexible basic transport structure in place from the outset to provide for future evolution as warranted by the customer needs and business considerations. Such a transport system must be capable of transporting synchronous transfer mode (STM) information, such as voice and video telephony; variable length (VL) information, such as Internet Protocol (IP) or IEEE 802.3 frames; and asynchronous transfer mode (ATM) cells.

As with other HFC and wireless applications and systems, downstream, and in some cases, upstream payload is accessible by both other legitimate subscribers to the system and non-registered attackers or pirates. Attacks or merely eavesdropping can offer varying degrees of value to an attacker, ranging from simple theft of services to illicitly acquiring privileged and confidential information and information representing monetary value, such as credit card numbers. Present security and encryption techniques could be incorporated into a bi-directional broadband multimedia, data, and communications system, however, several encumbrances hinder such an implementation.

Encryption systems implemented in hardware provide the speed required for a multimedia and data exchange system, however, the cost of required hardware at individual cable stations is generally prohibitive. For example, implementation of DES encryption in hardware requires a DES chip having approximately fifteen thousand gates with a total cost of ten dollars or greater. An alternative to implementation in hardware is a software implementation, however, encryption in software is much slower than in hardware and would not provide the necessary encryption speed for a multimedia and data exchange system with the degree of security required. For example, a software version of the triple-DES algorithm provides superb protection against decryption and adds very little cost for system-wide implementation, but, is relatively slow, much too slow to encrypt the plaintext bytestream of a high-speed multimedia and data exchange system. What is needed is a security and encryption system offering the speed and high degree of security of encryption software and the speed associated with encryption hardware.

SUMMARY OF THE INVENTION

The present invention is a method and apparatus providing security for and encrypting the transmissions of a broadband adaptive digital access protocol (ADAPT) that supports the delivery of a wide variety of interactive and non-interactive digital services over HFC networks. ADAPT is capable of efficiently transporting synchronous transfer mode (STM) information, variable length (VL) information, and asynchronous transfer mode (ATM) cells. Advantageously, the present invention is operable to secure and encrypt communications, multimedia, and data utilizing ADAPT for transport of information within these various modes. The present invention implements security and encryption partially in software and partially in hardware, thus maximizing the advantages of each for a highly secure, fast, and inexpensive security and encryption system.

For example, one embodiment of the present invention utilizes a triple-DES;, algorithm implemented in software. Triple-DES provides twice the encrypting power of a pure DES encrypting process. Although providing a high degree of security, generation of output from a software implementation is too slow to directly encrypt. Therefore, one embodiment of the present invention utilizes triple-DES software to generate cryptovariables which comprise rapidly changing keys for a high speed encrypting engine implemented in hardware. The high speed engine (HSE) is able to provide an encrypting keystream output enabling high speed encryption of plaintext into ciphertext. Because system encryption and decryption occur at the system headend or common controller as well as individual cable modems or mobile stations, the security and encryption system components are replicated at each cable modem or mobile station as well. By allocating as many encrypting functions as possible to software, overall system costs are minimized. For example, encryption hardware associated with one embodiment of the present invention reduces the number of gates to twenty percent of the number of gates necessary for an implementation purely in hardware. The result is a security and encryption system which provides the high degree of security and low cost available from a software implementation and the speed of a hardware implementation.

In addition, the present invention utilizes a cryptoclock at the headend, and broadcasts that clock to each of downstream cable modems or mobile stations, thus reducing the cost of each individual cable modem or mobile station, since a local cryptoclock is not required. One embodiment of the present invention is known as SpeedyDES. SpeedyDES utilizes the cryptoclock at each location for those portions of encryption and decryption implemented in both software and hardware.

One embodiment of the present invention utilizes a scheme for an asymmetrical computational division between headend and cable modem or between common controller and mobile stations. This asymmetrical division is provided to reduce the costs associated with individual cable modems and mobile stations. Many public key exchange algorithms require the operations of squaring or performing a square root of a quantity. While squaring a quantity is a relatively simple operation performed without much additional computation, performing a square root imposes a greater computational load and mandates greater memory capacity, greater hardware complexity, and therefore greater costs. The present invention implements certificate creation and verification algorithms with a unidirectional and asymmetric public key algorithm with a reverse secret key algorithm. By doing so, the headend or common controller performs the more expensive and computationally challenging square root operations, while the cable modems or mobile stations simply perform squaring functions. The result is yet another method for reducing costs of individual cable modems or mobile stations, thus reducing costs for the entire system.

Although the present invention is particularly well suited for bi-directional hybrid fiber/coax (HFC) networks with tree and branch topologies, it is also equally applicable to cellular wireless networks, which are akin to fiber/coax networks, in that mobile stations do not usually communicate with each other directly, but instead depend on a base station for feedback. Further, the present invention is also applicable to one-way HFC networks, wherein cable transport is only in the downstream (broadcast) direction, without provision for timely upstream bursts from cable modems to the headend.

BRIEF DESCRIPTION OF THE DRAWINGS

A more complete understanding of the present invention may be obtained from consideration of the following description in conjunction with the drawings in which.

DETAILED DESCRIPTION

An Adapt Overview

The present invention encompasses a system utilizing a broadband link protocol, which specifies physical (PHY) and medium access control (MAC) layers over a broadband communication network. The broadband link protocol utilized in conjunction with the present invention will hereinafter be referred to within this application as an adaptive digital access protocol (ADAPT). A variety of traffic types are time division multiplexed and modulated for integrated transport within a single radio frequency (PI) channel, or if desired, are segregated onto separate RF channels, subject to spectrum allocation and administration by a headend (HE) bandwidth manager. These traffic types include synchronous transfer mode (STM) service data units, asynchronous transfer mode (ATM) service data units, and variable length (VL) service data units.

Although the present invention is particularly well suited for bi-directional hybrid fiber/coax (HFC) networks with tree and branch topologies, and shall be so described with respect to this application, the present invention also relates to cellular wireless networks, which are akin to fiber/coax networks, in that mobile stations do not directly communicate with each other, but instead depend on a base station for feedback. Therefore, since one embodiment of the present invention is described in the context of a "headend" and a "cable modem," it is understood that the present invention may also function in the context of its wireless network counterparts. For example, in a wireless network, the functional equivalent of a "headend" is a "common controller," and the functional equivalents of "cable modems" are "mobile stations" or simply "stations." Further, the present invention is also applicable to one-way HFC networks, wherein cable transport is only in the downstream (broadcast) direction, without provision for upstream bursts from cable modems to the headend.

FIGS. 1 through 31, and the accompanying detailed description contained herein, are to be used as an illustrative example of a preferred embodiment of the present invention, and should not be construed as the only manner of practicing the present invention. Numerous modifications and alternative embodiments of the invention will be apparent to those skilled in the art in view of the following description. Details of the structure may be varied substantially without departing from the spirit of the invention.

Figure 1:
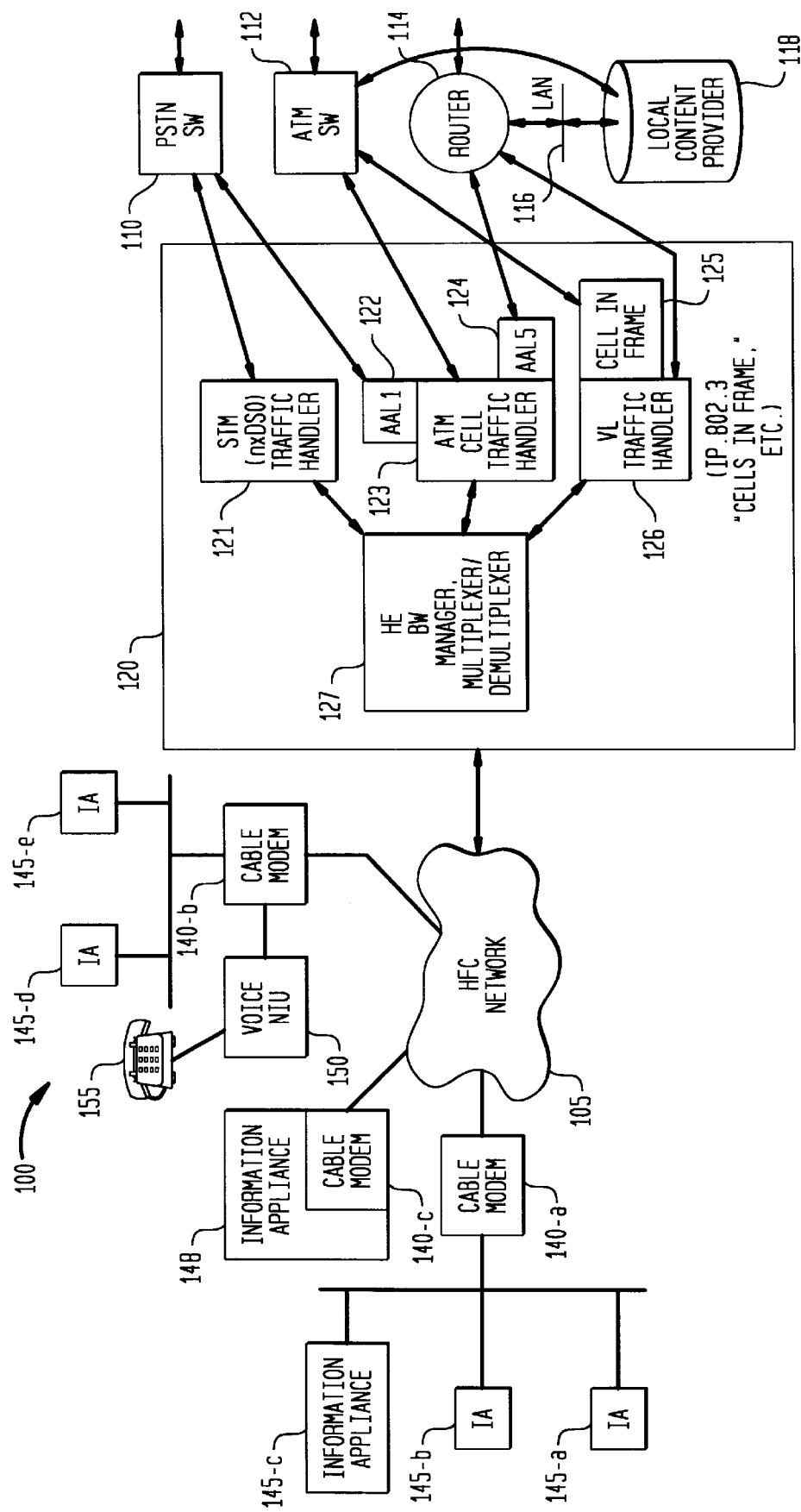
FIG. 1 illustrates an exemplary arrangement of a broadband hybrid fiber/coax network utilized in accordance with the present invention, the network connecting a headend to a plurality of cable modems for downstream signal broadcasting and allowing upstream information transmission from the individual cable modems back to the headend as well.

FIG. 1 illustrates an exemplary system operator's network 100 with which the present invention may be used. An HFC network 105 is comprised of coaxial cable with tree and branch topology, point-to-point optical fiber, or a combination of both and is characterized by a wide bandwidth. Typically, a 54–750 Megahertz (MHz) band is utilized for downstream (broadcast) cable television (CATV) frequency bands, and the frequencies between 5–42 MHz are reserved for upstream communications. The HFC 105 allows the system operator to connect cable modems to the end users. A headend (HE) 127 is maintained at the system operator's premises 120. The HE 127 performs certain core functions, including transmission to and reception from the HFC network 105, bandwidth management for upstream and downstream communications and data transfer, as well as signal multiplexing and demultiplexing.

For example, a public switched telephone network (PSTN) 110 as shown in FIG. 1 is linked to the HE 127 through a synchronous transfer mode (STM) traffic handler 121. The STM traffic handler 121 is then linked with the HE 127. Also, the PSTN 110 can route traffic through an ATM adaptation layer (AAL) 122. By so doing, the AAL 122 converts non-ATM bit streams into ATM cells, which are then processed by the ATM cell traffic handler 123 before again being passed to the HE 127 for downstream delivery over the HFC network 105.

ATM traffic enters the system operator's premises 120 from an asynchronous transfer mode switch (ATM SW) 112, which delivers ATM cells to the ATM cell traffic handler 123. In turn, the ATM cell traffic handler 123 communicates with the HE 127, which then transmits those cells onto the HFC network 105. The ATM SW 112 cap alternatively deliver ATM packets to a variable length (VL) traffic handler 126 after first converting those packets into proper VL form. This conversion takes place at the cell in frame processor 125 located at the system operator's premises 120. The VL traffic handler then forwards the data to the HE 127 for ultimate transmission over the HFC network 105.

A local content provider 118 is shown providing input to the system operator's premises 120 for ultimate dissemination over the HFC network 105. The local content provider 118 is connected to a local area network (LAN) 116. The LAN 116, in turn, is connected to a router 114, which provides the necessary interface for data from the LAN 116. The router 114 sends data directly to the VL traffic handler 126 or, if so directed, sends data through an ATM adaptation layer (AAL) 124. The AAL 124 converts non-ATM byte streams into ATM cells, which are then processed by the ATM cell traffic handler 123 before being passed to the HE 127 for downstream delivery. Data passed to the VL traffic handler 126 is converted into VL type format and is passed to the HE 127 directly for downstream delivery. Router 114 is also connected to Internet Protocol (IP) type networks (e.g.—Internet or Corporate Intranet). In this sense, HFC provides access to this Wide Area Data Network. Data units (e.g.—IP datagrams) arrive at router 114 from the outside network and are handled as those arriving from the local content provider 118.

Communications and data broadcasted over the HFC network are ultimately available at cable modems 140-a, 140-b and 140-c. The cable modem 140 converts the incoming data and communications into information usable by the information appliances 145-a to 145-e. An information appliance 145 can be a computer terminal, a phone 155, or some other processing or communication device; and a cable modem 140-c may be incorporated into the information appliance 148 itself. Additionally, a cable modem 140 may be used to provide telephony or video by utilizing a network interface unit (NIU) between the cable modem 140 and the information appliance. For example, cable modem 140-b is connected to a voice NIU 150, which provides the necessary continuity and conversion for use with a phone 155.

As previously stated, bandwidth is allocated upstream as well as downstream, so that information appliances can communicate with the HE 127. In the case of upstream transmission the sequence of processes and components described above are simply reversed. The processes performed by the HE 127 for downstream transmission are performed by the individual cable modems 140 for upstream transmission. Since the downstream communications are over a broadcast medium and the upstream communications are over a multiple access medium, there are some fundamental differences in the communication protocols for upstream and downstream transmission.

Figure 2:
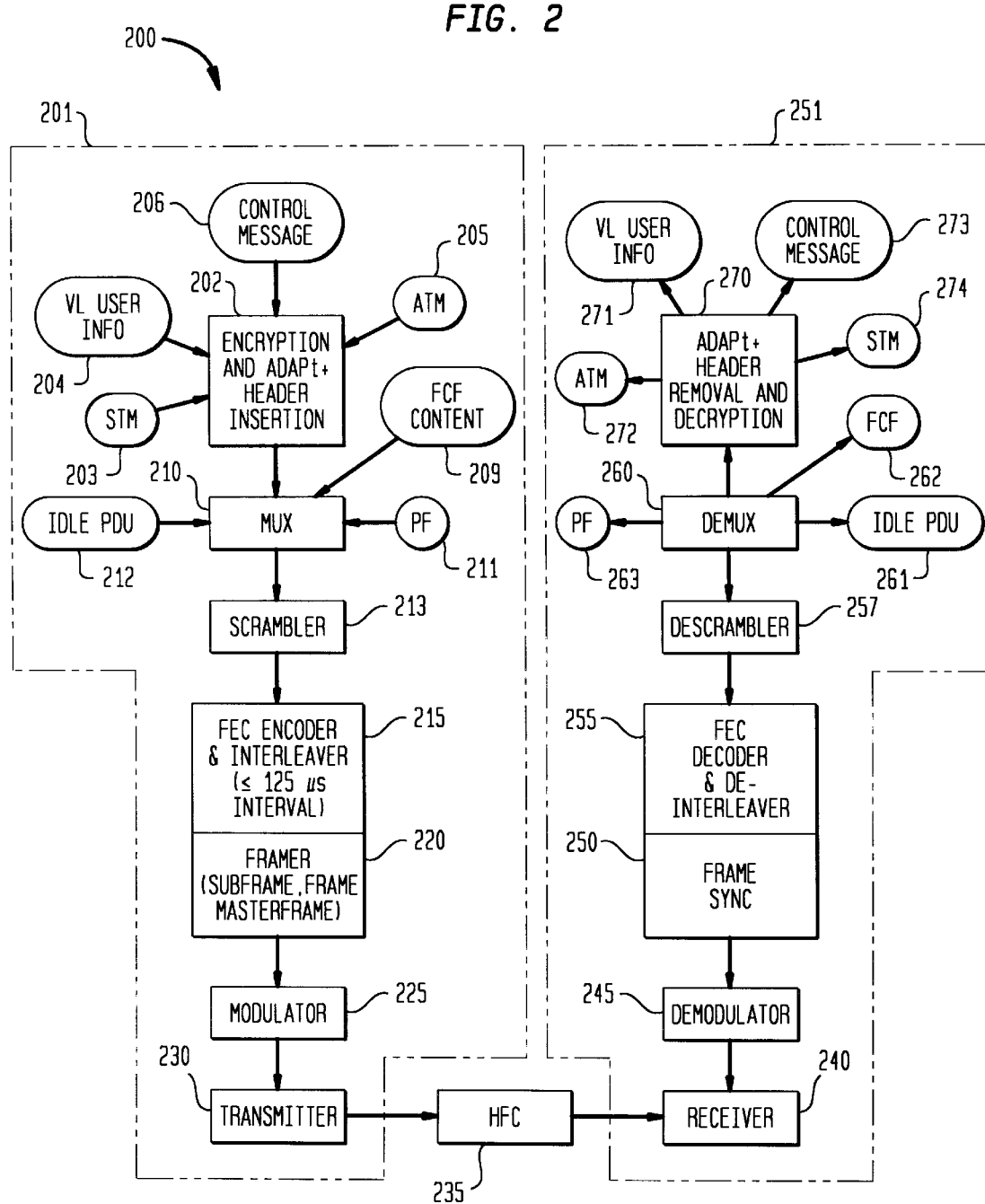
FIG. 2 is a block diagram illustrating an exemplary grouping of functional components utilized for downstream transmission in accordance with the present invention.

FIG. 2 is a block diagram illustrating an exemplary downstream transmission system 200 utilized in accordance with the present invention. Components utilized for transmission prior to broadcast over the hybrid fiber/coax (HFC) network are located at an operator's headend 201. At higher levels, queues are maintained for periodically arriving synchronous transfer mode (STM) and STM signaling bytes 203, for variable length (VL) data units 204, for fixed length asynchronous transfer mode (ATM) cells 205, and for control messages (206) which are transported as VL protocol data units (PDUs). VL data units may be of various types, including internet protocol (IP), internet packet exchange (IPX), IEEE standard 802.3 (802.3), or other variable length protocol data units (PDUs). The various queued PDUs are first processed by an encryptor 202, wherein after queued data is encrypted, an adaptive digital access protocol (ADAPT) header is appended. The output stream of the encryptor 202 is delivered to a multiplexer 210.

Traffic types other than those passing through the encryptor 202 are also generated at the headend 201. During periods when ATM, VL, or STM PDUs are not being transmitted from the headend 201 within their corresponding regions, an Idle PDU 212 is generated and transmitted. The headend 201 also generates a pointer field (PF) 211 and a fast control field (FCF) 209. Pointer fields 211, fast control fields 205, and Idle PDUs 212 are each delivered to the multiplexer 210 as well.

The various PDUs, PF, and FCF are then multiplexed into a subframe, frame, and masterframe structure. A scrambler 213 is utilized to maintain the symbol density of the transmitted data. The next functional block is a forward error correction (FEC) encoder and interleaver 215. The present invention utilizes a Reed Solomon coding scheme for forward error correction, although other methods of FEC may also be used, as would be apparent to those skilled in the art. FEC is completed within the subframe boundary to avoid excessive jitter, which will be described in more detail later. The output of the FEC encoder 215 is then prefixed with a framing byte at the framer 220, passed through a modulator 225 and broadcasted over the hybrid fiber/coax network 235 via a transmitter 230 for ultimate reception at individual cable modems 251.

The broadcasted signal is available to each cable modem receiver 240 tuned to this downstream channel. After passing through a demodulator 245, a framing bate identifies the boundary of a subframe. The payload subframe boundary is determined via a frame synchronizer 250 which analyzes the included framing byte. The framing byte is then removed and the payload is passed through the FEC decoder/deinterleaver combination 255. The output from the FEC decoderlinterleaver is sent to the descrambler regardless of the outcome of FEC operations. The subframe payload is then descrambled at a descrambler 257 and made available to a demultiplexer 260 at the cable modem. The demultiplexer 260 removes the PF 263, the FCF 262, and any idle PDUs 261 which may have been included in the transmission. The remainder of the received data stream is sent through a decryptor 270 to remove the ADAPT header and decrypt the encrypted data Various payload components are separated and processed, as will be described later in greater detail. These payload components include VL PDUs 271, ATM PDUs 272, STM PDUs 274, and control messages 273 carried as VL PDUs.

As previously stated, bandwidth is allocated upstream as well as downstream Upstream transmission is conceptually similar to downstream transmission. For the case of upstream transmission from cable modem to headend, the processes identified in conjunction with FIG. 2 for downstream transmission are performed in the same sequential order. However, the direction of transmission is now reversed, with the cable modem performing the functions of encrypting, multiplexing, scrambling, framing, modulating, and transmitting. Similarly, for the case of upstream transmission, the headend performs the functions of receiving, demodulating, frame synchronizing, descrambling, demultiplexing, and decrypting.

There are, however, several important differences between upstream transmission and downstream transmission. First, users "burst" into an upstream frame, synchronized with the received downstream frame, and under strict time-domain control established by ranging and managed from the headend (HE). The HE determines when a cable modem may burst upstream and onto which of several upstream channels the burst may occur. To avoid interference with bursts from other cable modems in the same RF channel, the burst includes pre- and post-guardtimes. Also, a preamble is included, indicating the beginning of data within the burst and allowing for HE receiver locking. Upstream traffic is not interleaved, and forward error correction is applied at the application level within each burst, rather than at the multiplexed bytestream level.

The present invention maintains an equal frame length for downstream transmission and upstream transmission, each two milliseconds for this illustrative embodiment. Downstream frames are further subdivided into an integral number of subframes per frame. This illustrative embodiment of the present invention utilizes sixteen subframes per frame, each subframe being 125 microseconds long. Subframes are divided into four regions: a synchronous transfer region (STR), an asynchronous transfer region one (ATR1), an asynchronous transfer region two (ATR2), and a fast control field (FCF). The STR transports isochronous traffic; ATR1 transports ATM cell PDUs; ATR2 transports VL PDUs, including both bearer data and ADAPT control messages; and the FCF transports real time control information. A pointer field (PF) is also included within each subframe. The PF indicates the segmentation of a VL PDU which spills over into the next subframe.

Unlike downstream transmission, upstream burst transmission is not divided into subframes. Rather, each two millisecond upstream frame is divided into a synchronous transfer region (STR) and an asynchronous transfer region (ATR). The upstream ATER frame is further divided into three regions: a contention-based region for upstream signaling and control messages; a contention based region for bandwidth requests; and a reserved region for bearer traffic. An upstream ATR is constructed from basic slots, used for bandwidth requests in a contention mode and used to serve as a basic unit of granularity for time slot allocation with ATM and VL PDUs. For example, an ATM cell always uses six consecutive basic slots while a VL PDU uses a variable number of basic slots to better support ranging and more efficiently transport VL packets. Six basic slots are utilized to comprise a superslot.

The following description of one embodiment of the present invention precisely defines many specific values, components, and functions so as to completely illustrate the present invention. Various modifications can be made to the present invention, as would be apparent to those skilled in the art, including but not limited to specific values corresponding to masterframe, frame, and subframe timing and construct, type of modulation and demodulation employed, and bandwidth allocated for downstream and upstream transmission. For the remainder of the description of this embodiment of the present invention, downstream transmission frequency is assumed to be 5.12 Msym/s and the method of downstream modulation elected is 64 quadrature amplitude modulation (64 QAM). These elections result in a raw bit transfer rate of 30.72 million bits per second (Mbps). Similarly, the upstream transmission frequency is assumed to be 1.28 Msym/s and the method of upstream modulation elected is quaternary phase shift keying (QPSK) at 2 bits per symbol. These elections result in a raw bit transfer rate of 2.56 million bits per second (Mbps). Accordingly, the specific number of bytes per master frame, frame and subframe, as well as the quantity of each within the transmission structure, are dependent on the elections made and will necessarily change if different transmission bandwidths or modes of modulation are chosen.

Downstream Transmission

Figure 3:
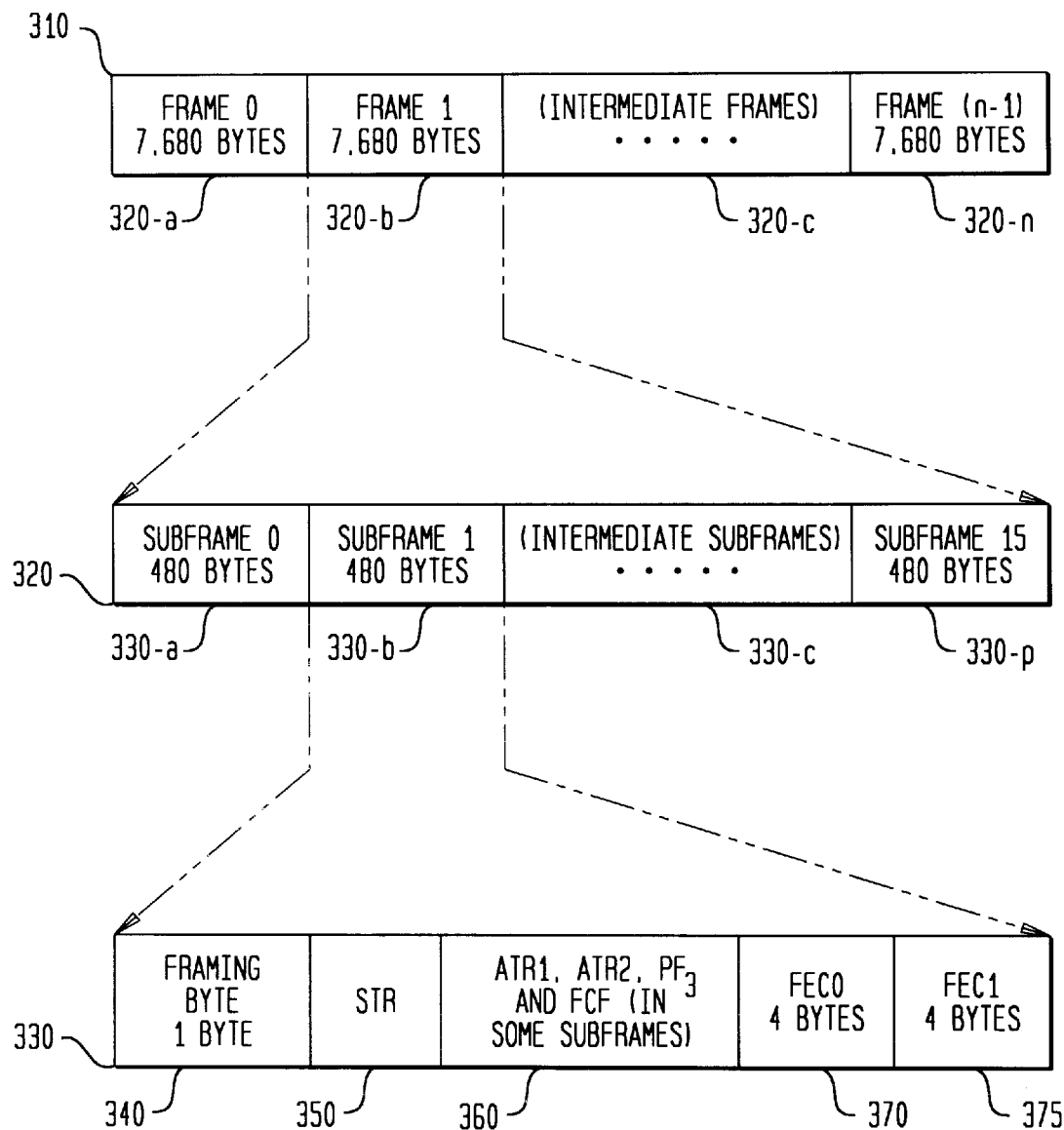
FIG. 3 is a representation of an exemplary embodiment of a downstream masterframe/frame/subframe structure as incorporated in accordance with the present invention.

FIG. 3 is a representation of an exemplary embodiment of a downstream frame structure of the present invention. A master frame 310 is comprised of an integral number, n, of frames 320. The illustrated master frame 310 is shown to contain frame zero 320-a, frame one 320-b, frame (n−1) 320-n, and an undefined number of intermediate frames 320-c. Since each frame 320 is two milliseconds long, and since there are n frames in each master frame, each master frame 310 is total of n times two milliseconds in length. Each frame 320 is comprised 7,680 bytes over two milliseconds and therefore each master frame is comprised of n times 7,680 bytes.

Each frame 320 is comprised of sixteen subframes 330, therefore each subframe is 125 microseconds long. A typical frame, frame one 320-b, is shown exploded into its constituent sixteen subframes 330-a through 330-p. Intermediate subframes two through fourteen 320-c are shown only as a block of intermediate subframes for the sake of brevity and clarity. Each subframe is comprised of 480 bytes.

Subframe one 330-b is shown in exploded view to illustrate the details and various regions of a subframe. Included within a subframe are one framing byte 340, a synchronous transfer region 350, an asynchronous transfer region 360 and two blocks utilized for forward error correction (FEC). FEC0 370 includes four bytes coded in parallel from even numbered payload bytes within each subframe. FEC1 375 includes four bytes coded in parallel from odd numbered payload bytes within each subframe. More detail regarding FEC will be revealed later in this section of the application. Since each subframe 330 is comprised of 480 bytes, and one byte is dedicated to framing and eight bytes are dedicated to forward error correction, there is a total of 471 bytes utilized for information carrying within each subframe 330.

Figure 4:
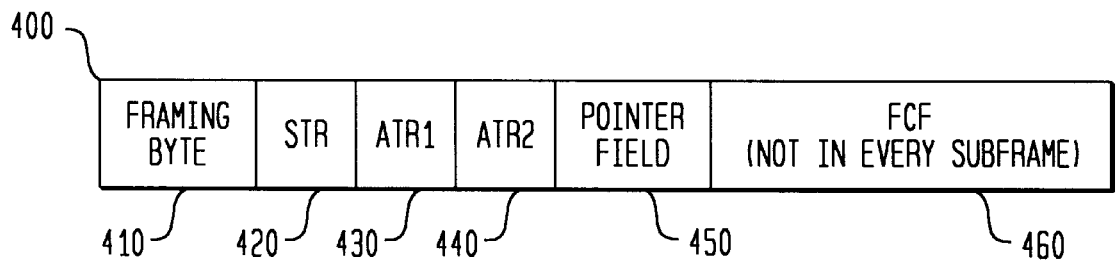
FIG. 4 is an exemplary representation for a division of information carrying bytes within a subframe into five regions.

FIG. 4 is an exemplary representation for the division of the 471 bytes dedicated to information carrying within a subframe 400 into five regions. The five regions include the synchronous transfer region (STR) 420, asynchronous transfer region one (ATR1) 430, asynchronous transfer region two (ATR2) 440, a pointer field (PF) for ATR2 450, and a Fast Control Field (FCF) 460. While it is likely that each of the first four regions will exist within each subframe of a frame, the FCF 460 is present only in the last $n_u$ subframes of each frame, where $n_u$ is the number of upstream channels associated with the specific downstream channel over which the FCF 460 is broadcasted. Also shown is the framing byte 410 that is included within each subframe.

The STR 420 transports synchronous PDUs in byte format. ATR1 430 transports fixed length ATM cells as PDUs and ATR2 440 transports variable length (VL) asynchronous PDUs. The PDUs may carry user information or may carry signaling and control information. The fast control field (FCF) 460 has a subfield which provides information about the boundary between ATR1 430 and ATR2 440 in the subsequent subframe. ATR1 430 and ATR2 440 collectively are known as the asynchronous transfer region (ATR). Because VL PDUs may be segmented and therefore partially transmitted in one subframe, a two byte pointer field (PF) 450 is used to specify the beginning location of the first full VL PDU in the next subframe.

Figure 5:
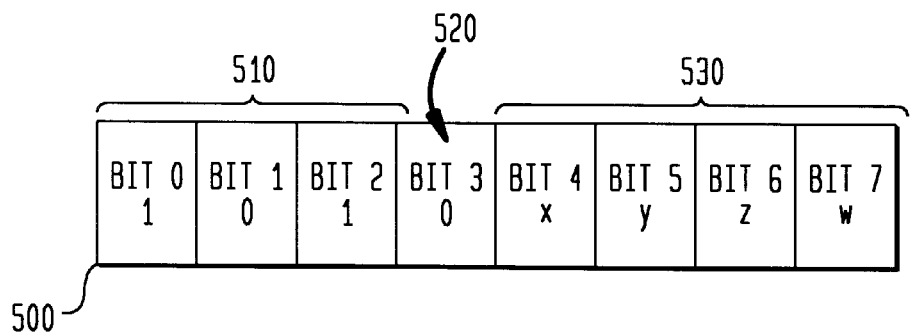
FIG. 5 is an exemplary representation of a subframe framing byte as utilized in accordance with the present invention.

FIG. 5 is an exemplary representation of a framing byte as utilized in accordance with the present invention. The first byte of a subframe is dedicated to a framing byte 500. The leftmost three bits (three most significant bits) of the eight bit pattern constitute a fixed marker pattern (FMP) 510, whose bits are fixed at '101.' The fourth most significant bit is a master frame marker 520, whose value is '1' in each of the sixteen subframes in the first frame of a new master frame, otherwise the master frame marker 520 value is '0.' The four least significant bits represent a subframe counter 530. The subframe counter 530 consecutively represents each successive subframe within a frame with a different bit combination for 'xyzw,' and therefore can completely represent each of the sixteen subframes within a frame with a different bit combination value. An exemplary embodiment of the present invention simply assigns the value '0000' to 'xyzw' for the first subframe in each frame, and increments the subframe counter 530 by one for each sequential subframe, until the sixteenth and final subframe within a frame assigns '1111' to 'xyzw.'

Cable modem receivers, or station receivers in a cellular wireless environment, utilize the framing byte 500 to synchronize to subframe boundaries, and additionally to synchronize to frame and master frame boundaries. Synchronization is needed when a cable modem initially joins the system or after a loss of synchronization. In either case, the receiver identifies each occurrence of the bit patterns '1011xyzw' or '1011xyzw' and then identifies the bit pattern after 479 bytes to check that the subframe counter 530 has incremented by one. One exemplary embodiment of the present invention elects to repeat this bit pattern check four times prior to declaring cable modem synchronization to a subframe boundary. It is understood that the number of bit pattern checks prior to declaring synchronization may vary from one embodiment to another. Requiring more checks than four will ensure, with a greater degree of accuracy, that a synchronization has in fact occurred. Conversely, performing a bit pattern check fewer than four times reduces the likelihood that a correct declaration of subframe synchronization has occurred.

Once cable modem synchronization to a subframe boundary has been accomplished, the cable modem looks to the subframe counter to identify the position of the subframe within a frame and thus identifies the frame boundary. Having already identified the subframe and frame boundary, the master frame boundary is identified utilizing the known boundary information and the master frame marker 520.

The first region of information carrying bytes within a subframe is the synchronous transfer region (STR). The STR is dedicated to synchronous traffic, allocating one byte of payload per payload per active voice channel (DS0) connection. For a synchronous connection requiring an integral number, n, of voice channels per connection (n times DS0), a total of n bytes per subframe, not necessarily contiguous, are allocated per connection. In addition to the bytes reserved for DS0 and n times DS0 traffic in each subframe, one byte is provided within the STR for call supervision signaling and trunk processing information to DS0 based public switched telephone network (PSTN) network interfaces for each group of sixteen or fewer DS0 channels. The position of the DS0 byte within the STR identifies a specific DS0 connection. This mapping, established when the connection is set up, allows for simple synchronous operation at the receiver for creating a DS0 stream by extracting one byte per subframe.

The second region of information carrying bytes within a subframe is ATR1, followed by ATR2. Together, ATR1 and ATR2 comprise the asynchronous transfer region (ATR). The boundary between the STR and ATR1, and between ATR1 and ATR2, is fixed within a frame, but may be changed from frame to frame. Changing the boundaries between each of these regions is accomplished via the HE bandwidth manager (BM). The resulting division of these regions and their respective boundaries are conveyed to cable modem receivers via the FCF. The FCF specifies the STR/ATR1 and ATR1/ATR2 boundaries for the next downstream frame.

Figure 6:
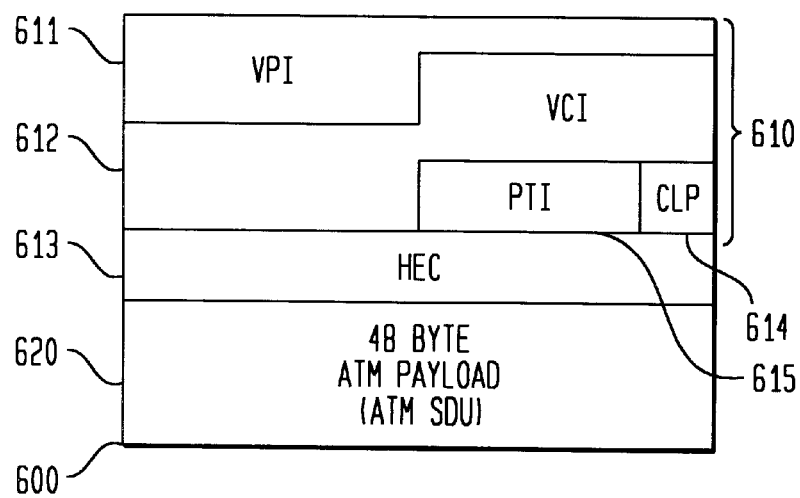
FIG. 6 is an exemplary illustration, in accordance with the present invention, of byte allocation for an ADAPT PDU with an ATM cell as payload.

FIG. 6 is an exemplary illustration, in accordance with the present invention, of byte allocation for an ADAPT ATM PDU 600. ATM PDUs are transmitted downstream within ATR1 of the asynchronous transfer region. ATR1s in successive subframes are concatenated to provide a bytestream for carrying ADAPT ATM PDUs 600, thereby allowing ATM PDUs 600 to cross subframe, frame, and master frame boundaries. A five byte ATM header serves as both an ATM cell header and as an ADAPT header 610. In a standard network-to-network interface (NNI) format, an ATM header and therefore an ADAPT header 610 as well, contains the following fields: a twelve bit virtual path identifier (VPI) 611, a twelve bit virtual channel identifier (VCI) 612, an eight bit header error control field (HEC) 613, a one bit cell loss priority field (CLP) 614, and a three bit payload type identifier (PTI) 615.

Cable modem receivers process the first five bytes of every PDU in the ATR1 bytestream to verify the HEC field 613. The polynomial utilized for HEC, '$1+x+x^2+x^8$', the correction and detection states, and the transitions are standard to ATM cells with a NNI format. With fixed length ATM cells in the byte stream generated by concatenated ATR1 s, the standard ATM cell delineation method, being well known by those skilled in the art, is used for ADAPT PDU delineation at the receiver. After verifying HEC 613, the cable modem receiver analyzes the VPI 611 to see if the PDU is destined for that cable modem. The ATM header VPI 611 is utilized by the present invention as, a surrogate for the receiving cable modem address.

When there are not enough ATM cells queued at the HE to completely fill the current ATR1, the portion of ATRL that is otherwise unused is filled with idle ATM PDUs. An idle ATM PDU is fifty-three bytes in length, and therefore maintains synchronization within ATR1. The five byte ATM header for an idle ATM PEDU includes a virtual path identifier (VPI), used as a surrogate cable modem address, just as an ATM PDU with payload does. The VPI for an idle ATM PDU is set to '1111 1111 1111,' which is a discard address. The forty-eight byte pseudo-payload is appended to the header to maintain proper spacing and synchronization within ATR1, but no data is appended within that space. Idle ATM PDUs therefore, provide a method of padding ATR1 when the headend bandwidth manager allocates more bandwidth to ATR1 than required for the downstream transmission of ATM cells queued at the headend.

Figure 7:
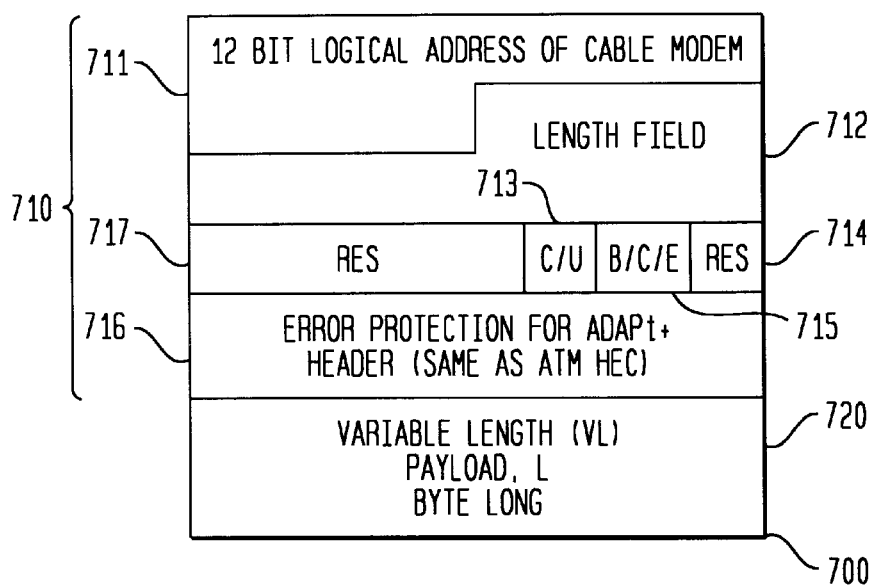
FIG. 7 illustrates an exemplary variable length (VL) payload with an ADAPT header for downstream transmission, in accordance with the present invention.

FIG. 7 illustrates an exemplary variable length (VL) payload with an ADAPT header for downstream transmission, in accordance with the present invention. ADAPT VL PDU segments 700 are transmitted within the second asynchronous transfer region, ATR2. ATR2s from successive subframes are concatenated to create a bytestream for VL PDUs. It is important to note the difference in terminology between an ADAPT VL PDU segment 700 and a VL PDU. A VL PDU represents the data frame or datagram from a higher level variable length PDU. An ADAPT VL PDU segment 700, however, is a VL PDU which has been segmented to a size no greater than MAX-SIZE. An ADAPT VL PDU segment 700 is transmitted downstream within ATR2. Cable modem receivers process the segments as a VL PDU bytestream and reestablish the original characteristics of the VL PDU. An ADAPT VL PDU segment 700 may alternatively be referred to as a "VL PDU segment," a "VL segment," a "PDU segment," or simply as a "segment." A VL PDU may alternatively be referred to as a "VL frame," a "VL datagram," or a "higher level VL PDU."

The payload 720 of an ADAPT VL PDU segment can be the whole or a portion of an Internet protocol (IP) datagram, an I.E.E.E. 802.3 frame (802.3), or an ADAPT control message. The payload may also be one or more ATM cells sent back-to-back to the same cable modem, in which case the ATM headers for all but the first ATM cell in the ADAPT VL PDU segment 700 are redundant and may be removed.

An ADAPT VL PDU segment 700 contains a five byte header 710 which includes the following fields within it: a twelve bit logical address 711 for the destination cable modem, a twelve bit length field, a one bit C/U field 713, a two bit B/C/E field 715, an eight bit HEC field 716, a one bit field reserved for future use 714, and a three bit field reserved for future use 717. The HEC field 716 within an ADAPT VL PDU segment 700 protects the entire five byte header 710 and provides for the capability for single bit error correction. The size of the header 710 and the HEC field 716 are identical to those for ATM cells. The polynomial, correction and detection states, and transitions are also the same as those of the ATM HEC.

The one bit C/U field 713 is used to specify whether the present ADAPT VL PDU segment 700 contains user information or a control message. The two bit B/C/E field 715 specifies whether the VL PDU segment carries the beginning, continuation, or end segment of a higher level PDU. A beginning segment VL PDU segment is indicated with a B/C/E field 715 equal to '00,' a continuation segment VL PDU segment is indicated with a B/C/E field 715 equal to '01,' an ending segment VL PDU segment is indicated with a B/CIE field 715 equal to '10.' If a higher level VL PDU is carried as payload. within a single ADAPT VL PDU segment 700, the BIC/E field 715 is equal to '11.'

The twelve bit length field 712 can specify an ADAPT VL PDU segment 700 up to 4095 bytes. Accounting for the five byte VL header, a total of 4090 bytes of VL payload may be described by the length field. An exemplary embodiment of the present invention therefore specifies the maximum length in bytes, MAXSIZE, for an ADAPR VL PDU segment 700. Therefore, if a higher level VL PDU is to be transmitted downstream and is larger than MAXSIZE minus five, the higher level VL PDU will first be segmented into one or more segments and transmitted downstream as separate ADAPT VL PDU segments 700, concatenated at the receiver, and reassembled with the aid of information from the B/C/E field 715.

Idle PDUs fill the unused portions of ATR2. The format for an idle PDU transmitted in ATR2 is the same as that of an ADAPT VL PDU segment 700. An idle PDU has a B/CIE field 715 equal to '11,' since the payload is of zero length and fits in one ADAPT VL PDU 700. The cable modem logical address 711 is the discard address of '1111 1111 1111.' The length of the payload is zero, therefore the length field 712 is equal to '0000 0000 0000.'

The twelve bit logical address 711 for the destination cable modem is explicitly specified in the VL header. Various addresses out of the 4095 possible combinations for this field are reserved and not used as specific cable modem addresses. Some examples include reservation for broadcast addresses, reservation as a discard address utilized in conjunction with idle PDUs, reservation for multicasting. Logical addresses not reserved for other purposes are available for identification of individual cable modems.

As introduced earlier, the ATR2s of successive subframes are concatenated to provide an ATR2 bytestream facilitating the transmission of VL PDUs. Since each VL PDU segment 700 contains a length field 712 in its header, a receiving cable modem is able to discern the VL PDU segment boundary from the bytestream, thus identifying the end of one VL PDU segment and the beginning of the next sequential VL PDU segment. In this fashion, a cable modem is self synchronizing. However, when a cable modem first joins the network, it needs to identify the first VL PDU segment boundary in order to establish synchronization. Also, a cable modem which receives or processes erroneous data may cause the receiver to lose synchronization. Therefore, a two byte pointer field is incorporated at the end of each ATR2 within a subframe to provide for quick resynchronization with a VL PDU segment boundary.

Because ATR2 is treated as a bytestream, the last VL PDU segment 700 in the ATR2 of a subframe can cross subframe, frame, and master frame boundaries. VL PDU segments will appear in consecutive order in the ATR2s of successive subframes until the entire higher level VL PDU is transmitted. At the end of each subframe, the headend recognizes the number of bytes transmitted and the number of bytes remaining to completely transmit a VL PDU segment. The HE also knows the length of the STR and ATR1 regions. This information is utilized to provide for VL PDU segment boundary identification at the receiver.

Figure 8:
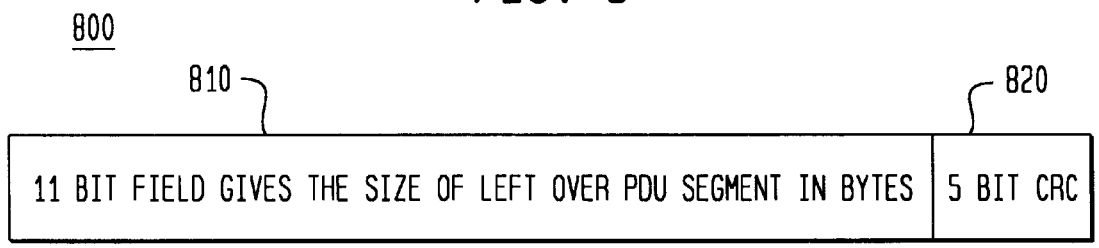
FIG. 8 represents an exemplary embodiment of a two byte pointer field (PF), in accordance with the present invention.

FIG. 8 represents an exemplary embodiment of a two byte pointer field (PF) 800, in accordance with the present invention. The bits of the PF are divided into two distinct fields. First, a length field of eleven bits 810 is dedicated to conveying information about the remaining untransmitted length of an ADAPT VL PDU segment at the end of the instant subframe. A five bit error protection field 820 is also included within the PF 800. The error protection field dedicates four bits for the result of a cyclic redundancy code (CRC) calculation and one bit for parity.

Figure 9:
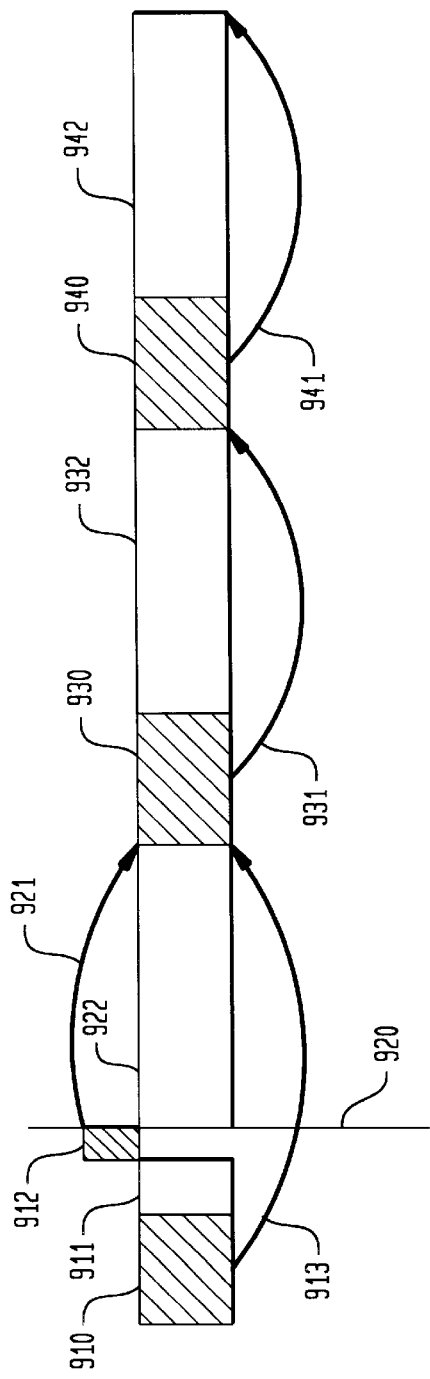
FIG. 9 is an exemplary illustration of the utilization of length field information contained within a downstream ADAPT VL PDU segment header, combined with a subframe pointer field, to mark the end of individual PDUs.

FIG. 9 is an exemplary illustration, in accordance with the present invention, of the utilization of the length field contained within a downstream ADAPT VL PDU segment header and a subframe PF to mark the boundary between adjacent VL PDU segments within an ATR2 bytestream. The VL PDU segment header 910 of a segment which has not been completely transmitted within a subframe boundary provides total segment length information about its associated PDU segment payload 911. The total length in this illustrative example is shown to traverse the subframe boundary 920 and the remainder of the PDU segment payload 911 is transmitted in the subsequent subframe as PDU segment payload 922. Length arrow 913 describes the PDU segment payload total length and points to the beginning of the next VL PDU segment header. Pointer Field (PF) 912 provides direct information regarding the byte position of the beginning of the header of the first full PDU segment in the next subframe. Thus, in effect, the PF 912 points to the same location as does the length field in the header 910. PF is particularly useful when one or more PDUs are discarded due to transmission errors. When one or more PDUs are discarded, the subsequent PDU boundary cannot be easily identified without a PF. Including PF within a PDU therefore allows PDU boundary identification at the next subframe.

The next sequential VL PDU segment header 930 provides total length information for its respective VL PDU segment payload 932 by pointing 931 to the beginning of the next VL PDU segment header 940. Similarly, the following VL PDU segment header 940 provides total length information for its respective VL PDU segment payload by pointing 941 to the beginning of the next sequential VL PDU segment header.

The process described above, therefore, marks the beginning of the first ATR2 PDU segment in the next sequential subframe, allowing for synchronization and resynchronization to an ADAPT VL PDU segment boundary. This synchronization process, however, is only necessary for initial identification of a VL PDU segment boundary, or for resynchronization after a synchronization loss. Once initial synchronization is achieved, implicit and explicit length information is utilized for continuing self synchronous operation. Also, the VL PDU segment header HEC is used for each VL PDU segment, for further confirmation of synchronization within VL PDU segments.

Figure 10:
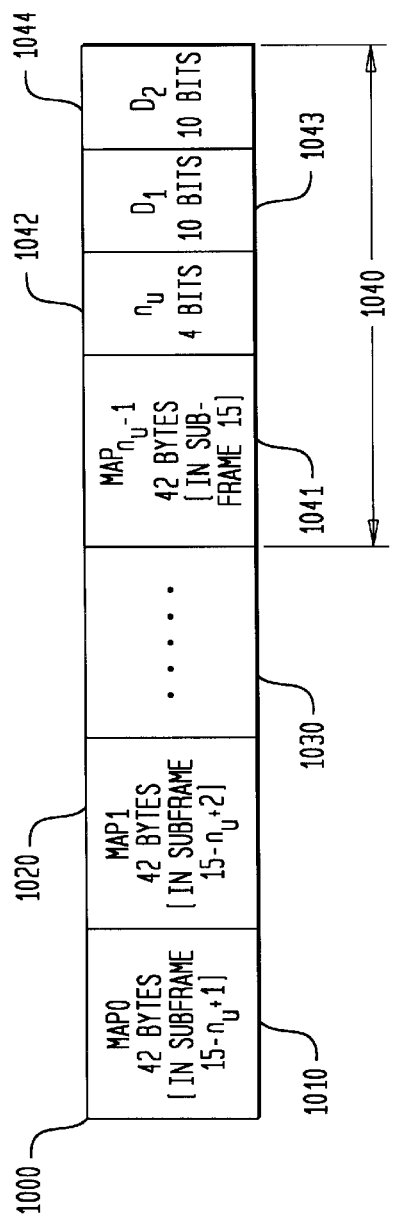
FIG. 10 is an exemplary depiction of a downstream fast control field (FCF), as utilized in accordance with the present invention.

FIG. 10 is an exemplary depiction of a downstream fast control field (FCF) 1000 as utilized in accordance with the present invention. Although a field within the asynchronous transfer region (ATR), the FCF 1000 is confined within a frame. The FCF 1000 is included in the last $n_u$ subframes of every frame, just after the two byte PF. The purpose of the FCF 1000 is to control the basic operation of the ADAPT medium access control (MAC) in real time. This aspect is particularly important, since the control information transported between headend and modem through the FCF tends to be relatively delay sensitive. In particular, the FCF 1000 provides six types of information to individual cable modems. First, the FCF 1000 informs the cable modems of the location of the boundary between the STR and the ATR1. Second, the FCF 1000 informs the cable modems of the location of the boundary between the ATR1 and the ATR2. Third, the FCF 1000 informs the cable modems of the location of the boundary between the STR and ATR for upstream transmission. Fourth, the FCF 1000 provides the cable modems with success/failure results from the contention slots of the previous upstream frame. Fifth, the FCF 1000 informs the cable modems of the reservation/contention status of each upstream basic slot for the next upstream frame. Lastly, the FCF 1000 informs the cable modems of basic slot allocation within the ATR for the next upstream frame.

The downstream FCF contains one upstream ATR MAP for each upstream channel, each MAP being forty-two bytes in length. MAP0 1010 is that portion of an FCF which is transmitted in subframe (16-$n_u$), where $n_u$ is the number of upstream channels associated with the downstream channel. MAP 1 1020 is that portion of an FCF which is transmitted in subframe (17-$n_u$). Intermediate MAP fields 1030 are also transmitted in subsequent subframes until the last subframe within a frame. MAP($n_u$-1) 1041, along with fields $n_u$ 1042, $D_1$ 1043, and $D_2$ 1044, are the final portions of an FCF to be transmitted within each frame, and are transmitted in subframe fifteen. That portion of an FCF transmitted in subframe fifteen 1040 is forty-five bytes in length, the $n_u$ 1042, $D_1$ 1043, and $D_2$ 1044 fields comprising an additional three bytes to the forty-two bytes of an accompanying MAP.

The $n_u$ field 1042 is a four bit representation for the number of upstream channels associated with the downstream channel transmitting the FCF 1000. Being four bits, the $n_u$ field 1042 can therefore specify up to sixteen upstream channels with any one downstream channel.

The $D_1$ field 1043 specifies the boundary between the STR and ATR1 in the next downstream frame. The boundary specification is conveyed to the cable modems in terms of length of the STR in bytes. The $D_2$ field 1044 specifies the boundary between the ATR1 and the ATR2 in the next downstream flame, in terms of the sum of the lengths of the STR and ATR1. The boundary specification is conveyed to the cable modems in terms of length of the ATR1 in bytes.

FCF transmission downstream is segmented. The last subframe in every frame carries a forty-five byte MAP for upstream channel number $n_u$-1, the $n_u$ field 1042, the $D_1$ field 1043, and the $D_2$ field 1044. Each of the preceding $n_u$-1 subframes carries a forty-two byte MAP, but no $n_u$ or D fields.

Figure 11:
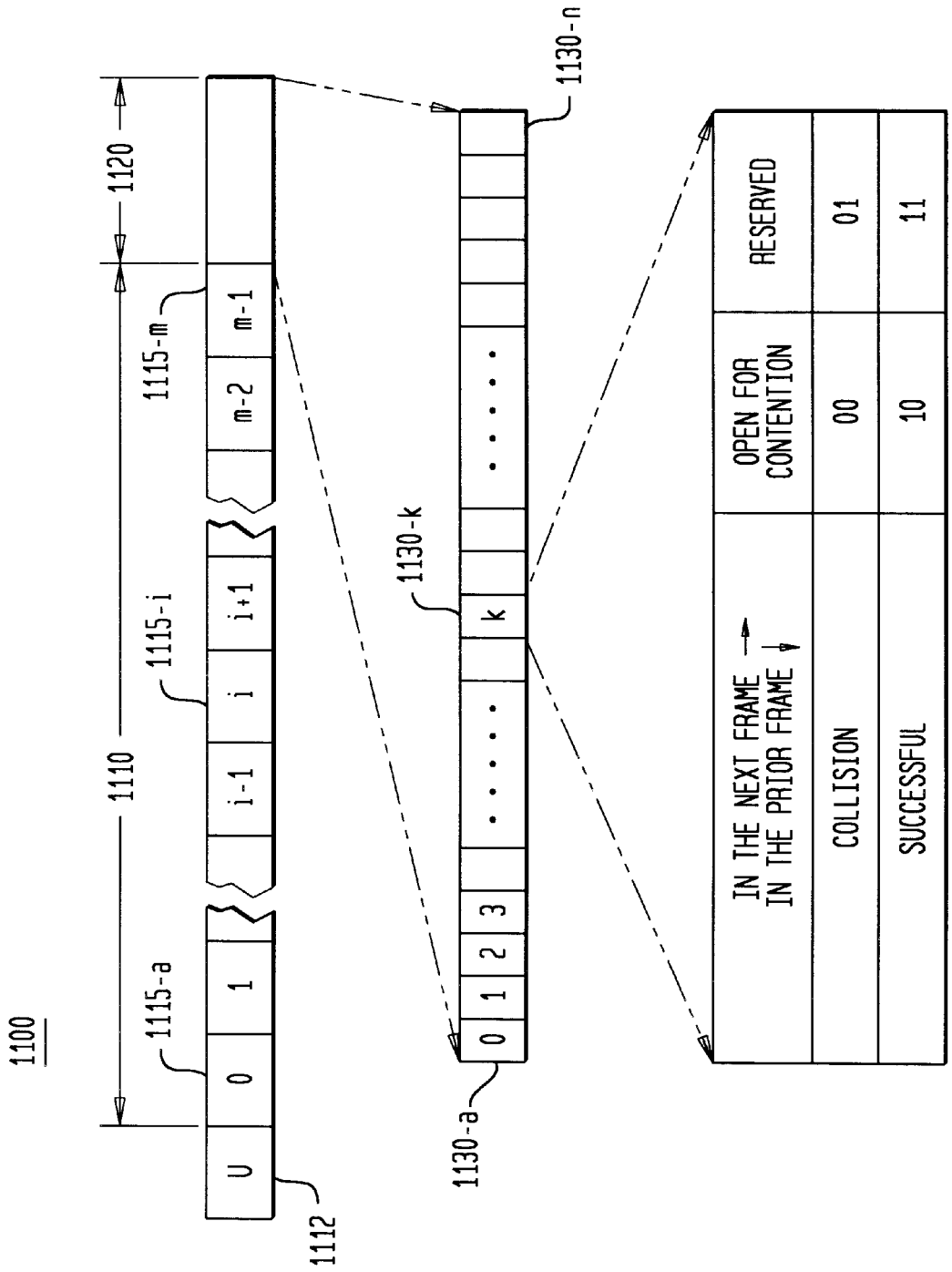
FIG. 11 is an exemplary representation, in accordance with the present invention, of the structure of a downstream MAP field, with exploded view of a status map for basic slots field.

FIG. 11 is an exemplary depiction, in accordance with the present invention, of the structure of a downstream MAP field 1100 with an exploded view of the status map for basic slots 1120. MAP is comprised of three major fields; an upstream boundary specification 1112, an upstream bandwidth allocation map for ATR 1110, and a status map for basic slots 1120.

The upstream boundary specification (U) 1112 conveys to the cable modems She boundary location between the synchronous and asynchronous regions within the next upstream frame. U is an eight bit long binary number and specifies the boundary region in units of basic slots. A basic slot is a subdivision of twelve contiguous bytes within the upstream transmission frame structure. Basic slots will be described in greater detail in this application, specifically during that portion of the detailed description describing upstream transmission.

The upstream bandwidth allocation map for ATR 1110 contains 'm' subfields, 1115-$a$ to 1115-$m$. Each subfield 1115 is three bytes in length. Each subfield 1115 is further subdivided into subordinate subfields as well. The upstream bandwidth allocation map for ATR 1110, the subfields 1115, and the subordinate fields will be described in greater detail shortly.

The status map for basic slots 1120, maintains a 2 bit status indicator, 1130-$a$ to 1130-$n$, for each basic slot within an upstream frame. The number 'n' represents the maximum number of basic slots in an upstream frame. The status indicator for slot 'k,' 1130-$k$, informs cable modems of the status of slot 'k,' 1130-$k$, in the previous upstream frame (i.e.—whether there was a collision or whether transmission was successful) and reports the status of allocation for slot 'k,' 1130-$k$, in the next upstream frame (whether slot is open for contention or reserved in the next upstream frame). The size of the status map for basic slots 1120 is determined by the number of basic slots 'n.' As will be subsequently described, since the upstream frame size is 640 bytes and since each basic slot is twelve bytes long, the maximum number of basic slots within an upstream frame is fifty-three. If 'n' is chosen to be greater than or equal to the number basic slots, then each upstream frame is adequately provided with a status map for basic slots 1120. Therefore, we can completely define the status for each upstream basic slot Allocating fourteen bytes to the status map for basic slots field 1120 provides a total of 112 bits. Since a status indicator 1130 is two bits in length, a total of fifty-six status indicators 1130 are available, or 'n' equals fifty-six.

Figure 12:
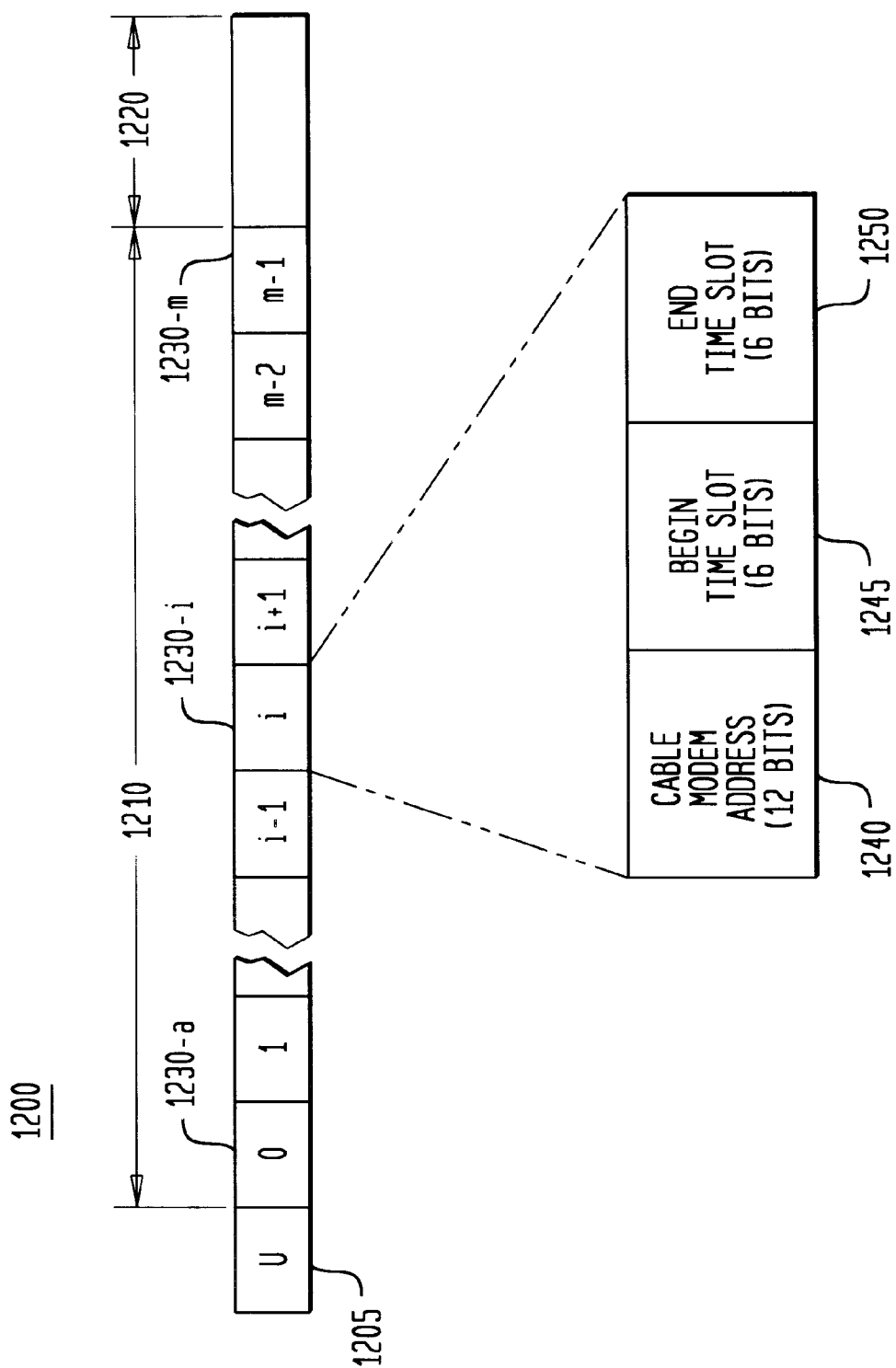
FIG. 12 is an exemplary representation, in accordance with the present invention, of the structure of a downstream MAP field, with exploded view of the upstream bandwidth allocation map for ATR field.

FIG. 12 is another exemplary representation, in accordance with the present invention, of the structure of a downstream MAP field 1200, but this time with an exploded view of the upstream bandwidth allocation map for ATR 1210. Previously examined, but included in this illustration for completeness, are the upstream boundary specification (U) 1205 and the status map for basic slots 1220. The upstream bandwidth allocation map for ATR 1210 contains 'm' subfields, 1230-$a$ to 1230-$m$. Each subfield 1230 is three bytes in length and is subdivided into subordinate subfields. A source address subordinate subfield 1240 contains a twelve bit address of the cable modem (CM) for which permission is being granted to transmit in the next upstream frame. Also included as subordinate subfields are the six bit begin time slot 1245 and the six bit end time slot 1250.

The source address subordinate subfield 1240 is used to convey information, from the bandwidth manager at the headend, to the cable modems, about which CM address has been granted permission to transmit in the next upstream frame. In the MAP 1200, the source address subordinate subfield 1240 is used to identify the CM to which the permission is being given, irrespective of whether the cable modem is transmitting and/or receiving ATM traffic, VL traffic, or both. All twelve bits of the source address subordinate subfield 1240 are set equal to '1' to indicate that a specified sequence of basic slots together form an upstream contention superslot for control purposes, such as signaling and ranging. Therefore, the source address subordinate subfield 1240 value of '1111 1111 1111' is not available as a CM address.

As previously noted, there are 'm' subfields 1230 included within the upstream bandwidth allocation map ATR 1210. The value of 'm' must be greater than or equal to the maximum number of possible ATM or VL PDU allocations per frame. Since an upstream frame is composed of 640 bytes, no more than eight complete ADAPT ATM PDUs with payload ATM cells may be transmitted upstream in any one frame. Assuming that an ATM PDU with payload is shorter in length than a VL PDU with payload, then setting 'm' equal to nine provides an adequate number of subfields 1230 within the upstream bandwidth allocation map for ATR field 1210. Therefore MAP default values of 'm' equal to nine and 'n' equal to fifty-six are initially established. The values of 'm' and 'n' may be changed if necessary.

Figure 13:
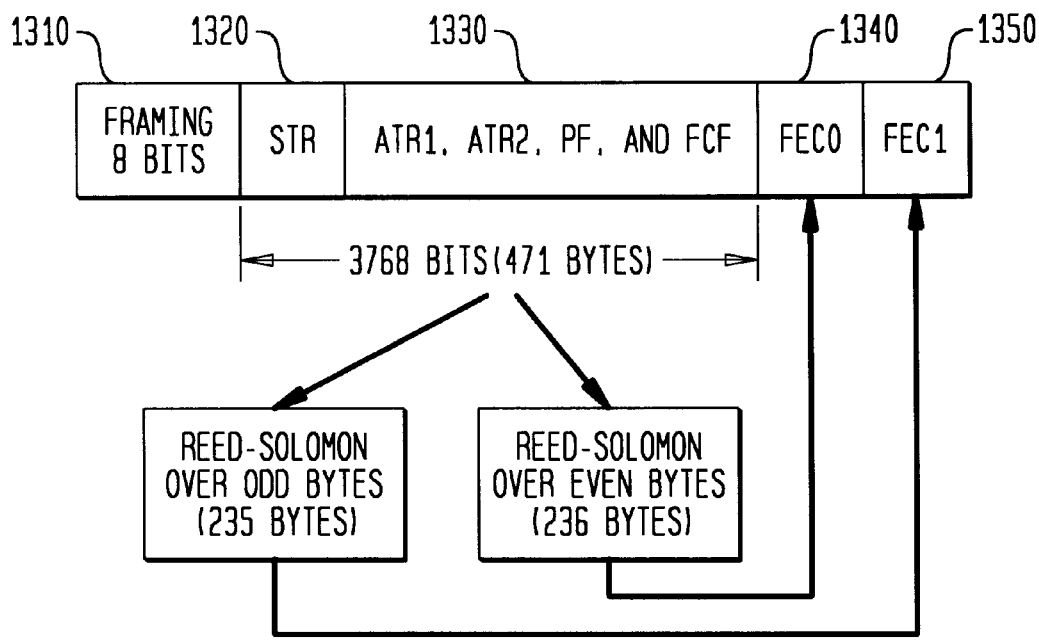
FIG. 13 illustrates an exemplary model for forward error correction (FEC) and interleaving over one subframe of downstream transmission, in accordance with the present invention.

FIG. 13 illustrates an exemplary model for forward error correction (FEC) and interleaving 1300. One subframe of 480 bytes is represented over 125 μs. As previously described, a framing byte 1310 is incorporated within each subframe. Also included in each subframe are eight bytes for forward error correction. This space is divided into two error correction syndromes, FEC0 1340 and FEC1 1350, each four bytes long. Therefore 471 bytes remain for the payload itself, whether allocated within the STR 1320, the asynchronous information and control region 1330, or a combination of both.

Some traffic types, such as compressed video, require a very low residual error rate either because the applications demand a low error rate or because the delay requirements associated with that traffic type preclude an automatic retransmission request (ARQ) type retransmission at the datalink layer. Other traffic types, such as voice telephony, may not allow datalink layer retransmissions but can tolerate moderate error rates.

The present invention utilizes FEC for each subframe payload individually so that the FEC blocks do not traverse subframe boundaries. This arrangement provides for extremely tight jitter control. Each 471 byte payload subframe is divided into two FEC blocks of even and odd bytes. Each of these two blocks is Reed Solomon coded with four bytes of FEC overhead, thus creating a 240 and a 239 nbyte FEC coded payloads. Although a Reed Solomon coding scheme is utilized for FEC in one embodiment of the present invention, other methods for FEC may also be used, as would be apparent to those skilled in the art. At the transmitter, the two FEC operations are performed in parallel using two FEC coders and thereby avoiding any extra delay in encoding. The transmitter sends the subframe bytes in original order followed by the FEC bytes. Advantageously, the interleaving is performed through FEC blocks of odd and even bytes without changing the order of transmission of data payload bytes (STM and asynchronous data). This arrangement of byte-wise interleaving over a subframe allows delay sensitive traffic within a subframe to be processed at a receiver without an FEC check, and therefore without any additional delay due to interleaving. Also, the byte-wise interleaving over a subframe, as performed in accordance with the present invention at the PHY layer, does not destructively interfere with any upper layer interleaving that has been performed at the application layer. At the receiver, the two FEC blocks are decoded by passing them sequentially through a single standard FEC decoder, thus reducing the cost of a cable modem. Therefore, the FEC utilized with an exemplary embodiment of the present invention is characterized by synchronization within individual subframes and systematic interleaving. Only FEC0 1340 and FEC1 1350 are interleaved. Therefore, synchronizing forward error correction and interleaving within a 125 microsecond subframe utilizing an integral number of FEC blocks provides jitter-free STM transmission, since it is not necessary to receive more than a single sub frame of transmission at a cable modem before interpretation of FEC code and deinterleaving.

The present invention, when transmitting, incorporates a self synchronous scrambler prior to application of FEC. At the receiver, decoding/deinterleaving is followed by a descrambler. In order to maintain bit count integrity for the descrambler and to avoid error propagation, the FEC decoder/deinterleaver at the receiver passes all the decoded bits to the descrambler, even if uncorrectable errors are discovered. Descrambling is disabled when a cable modem is hunting to regain synchronization to the sub frame boundary. Descrambling is resumed when synchronization is reestablished.

Upstream Transmission

Having fully described downstream transmission, with details regarding frame and PDU structure, of an exemplary embodiment of the present invention, a description specifying an exemplary embodiment for upstream frame and PDU structures follows. First, synchronous transfer mode (STM) traffic from voice or video telephony requires strict control of jitter. Because of this requirement, a relatively small sized downstream communication sub frame, with a length of 125 microseconds, was chosen. Sixteen subframes were designated to comprise a downstream frame. A suitable frame structure is also required for the upstream direction. High upstream physical (PHY) layer overhead encourages transmitting upstream STM in larger single bursts from the cable modem (CM). Therefore, one embodiment of the present invention utilizes a two millisecond frame structure to match the downstream frame structure and allow for upstream frame synchronization with the equally sized downstream frame. Like the downstream frame structure, an integral number of upstream frames are incorporated into one upstream master frame. However, unlike the downstream frame, the upstream frame is not comprised of subframes. This combination of upstream frames and masterframes provides a balance between low PHY layer overhead and low packetization delay for STM communications.

For the remainder of the description of exemplary embodiment of the present invention, upstream channel bandwidth is chosen at 1.8 MHz in the 5–42 MHz range and upstream symbol rate is chosen to be 1.28 megasymbols per second (Msym/s). The method of upstream modulation elected is quaternary phase shift keying (QPSK) at 2 bits per symbol. These elections result in a raw bit transfer rate of 2.56 million bits per second (Mbps). Various modifications can be made to the present invention, as would be apparent to those skilled in the art, including but not limited to specific values corresponding to master frame and frame timing and construction, type of modulation and demodulation employed, and bandwidth allocated to upstream channels. Accordingly, the selection of specific lengths for masterframes and frames, as well as the quantity of each are dependent on the elections made, and will necessarily change if different bandwidths or modes of modulation are chosen.

Figure 14:
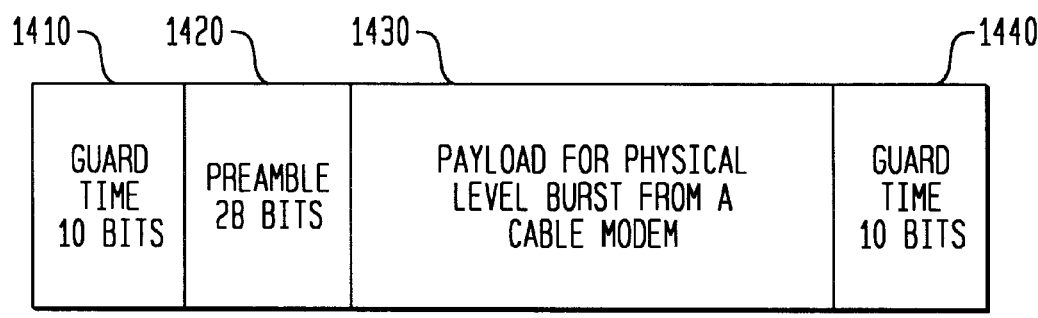
FIG. 14 illustrates an exemplary frame structure, in accordance with the present invention, of an ADAPT upstream burst transmission.

FIG. 14 illustrates an exemplary frame structure 1400, in accordance with the present invention, of an ADAPT upstream burst transmission. A transmission front guard band 1410 and transmission end guard band 1440 are each ten bits long, and a preamble 1420 is twenty-eight bits in length. The preamble 1420 is a fixed bit pattern used to indicate the start of data within a burst. Guard bands are utilized to compensate for inaccuracies inherent with CM ranging and synchronization with the HE.

Figure 15:
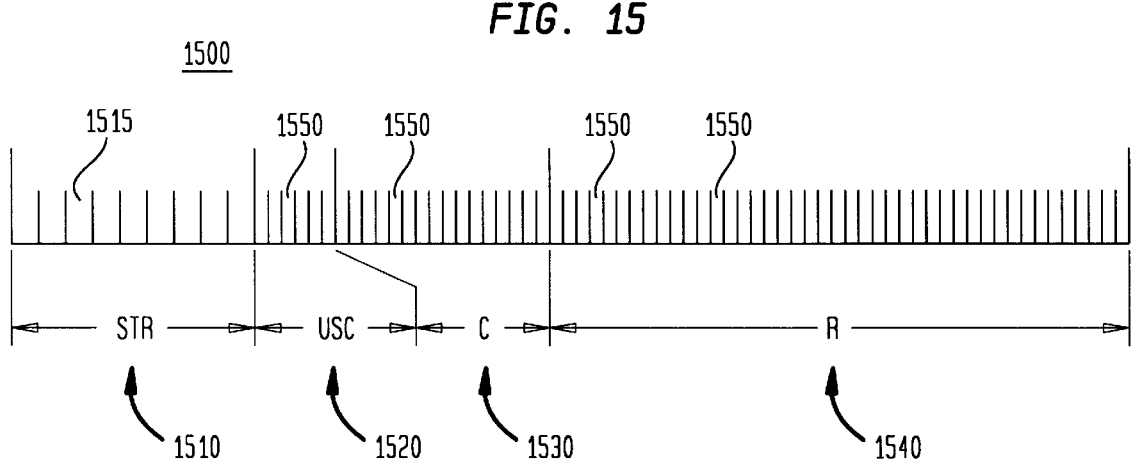
FIG. 15 illustrates an exemplary upstream transmission frame and slot structure, in accordance with the present invention.

FIG. 15 illustrates an exemplary upstream transmission frame 1500 and slot structure, in accordance with the present invention. As previously described, an upstream frame 1500 is two milliseconds long and synchronized with transmitted downstream frames. At 2.56 Mbps, there are a total of 640 bytes available within each frame 1500 and an integral number of frames 1500 comprise a master frame. A master frame is synchronized with a corresponding downstream master frame. The frame structure 1500 consists of four distinct regions; an STR region 1510 for synchronous voice or video telephony communication, an upstream slow control (USC) region 1520, a contention region (C) 1530, and a reserved region (R) 1540.

The STR region 1510 consists of individual DS0 STM time slots 1515, each twenty-seven bytes long. One STM time slot 1515 is dedicated to each upstream DS0 connection. Providing an STM time slot within each upstream frame 1500 allows sixteen bytes of STM information to be transmitted each two milliseconds, thereby facilitating low delay transmission for STM communications.

The upstream slow control region (USC) 1520, contention region (C) 1530, and (A reserved region (R) 1540 collectively comprise the upstream asynchronous transfer region (ATR). The ATR is composed of a multiplicity of basic slots 1550, each basic slot being twelve bytes in length. Accumulating an integral number of bytes to form a basic slot provides the granularity required for upstream transmission. User data PDU time slots are formed by combining multiple successive basic slots.

The contention region 1530 contains multiple basic slots in each frame. The exact number is variable and is changed by the headend bandwidth manager (BM), depending on loading and collision history. Cable modems use contention slots to request reserved slots in subsequent frames. Contention slots may be assigned contiguously as illustrated in FIG. 15, but are not so restricted. The BM may alternatively split and spread contention slots among any of the basic slots on a per frame basis and communicate the location of those contention slots to the cable modems through a corresponding MAP sent to cable modems in the downstream fast control field (FCF).

The upstream slow control (USC) region 1520 is a configurable region in specified frames within each master frame. The USC 1520 contains one contention superslot. Being comprised of six basic slots, a superslot is seventy-two bytes long. A superslot allows for the transmission of short messages without first making a reservation request. Some examples of messages appropriate for incorporation within a contention superslot include STM signaling, ranging, control and response messages. The superslot is particularly useful for CM initialization when it initially powers up. Off-hook and other signaling messages for voice and video telephony may also be transmitted in contention mode using superslots. In the event of a collision at a basic slot or a superslot between competing cable modems, a retransmission scheme is incorporated. One embodiment of the present invention includes a retransmission scheme incorporating a binary exponential backoff process. In other embodiments of the present invention, retransmission is accomplished utilizing a ternary tree algorithm or an adaptive p-persistence algorithm.

The reserved region 1540 is available to cable modems in multiples of the basic slot. The MAP of the fast control field (FCF) provides information for which subsets of basic slots in the reserved region are available to which modems. Asynchronous user data PDUs from a CM with reservations for message transmission utilize this reserved region for conveyance of that information. Typically, ATM PDUs and VL PDUs use the reserved region for upstream transmission. Upstream ATM PDUs can be transmitted in six basic slots. The headend BM uses type information to guarantee that all ATM reservations are in blocks of six contiguous slots per frame. Upstream VL PDUs are allocated as many contiguous basic slots as possible.

Figure 16:
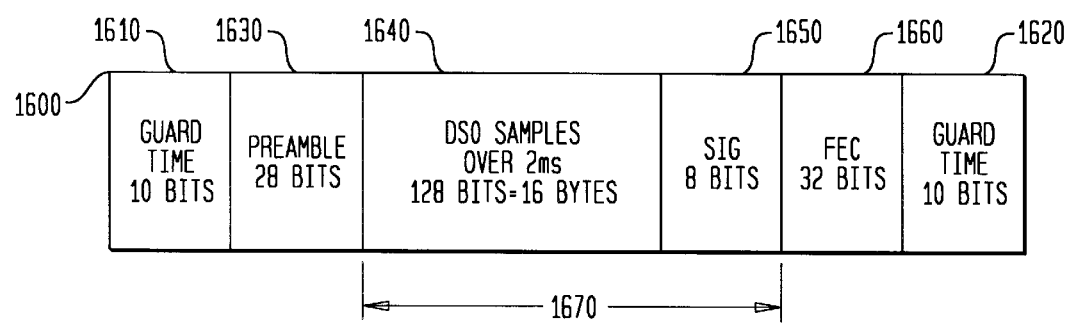
FIG. 16 is an exemplary illustration, in accordance with the present invention, for a structure of an STM upstream burst.

FIG. 16 is an exemplary illustration, in accordance with the present invention, of the structure of an STM upstream burst 1600. A ten bit guard band 1610 is included at the beginning of the burst. A twenty-eight bit preamble 1630 is also included. The STM payload 1640 is sixteen bytes. Less than four kbps bandwidth is required per DS0 connection for signaling. As a result, a one byte signaling field 1650 in the STM PDU is adequate to provide signaling capability for DS0 connections. Payload error is corrected over any two bytes of payload by using four bytes of forward error correction (FEC) 1660. FEC 1660 is provided for two regions 1670, the sixteen byte STM payload 1640 and the one byte signaling field 1650. Sixteen bytes of payload every two milliseconds provides a payload data bit transfer rate of 64,000 bps, however, the STM PDU overhead is eleven bytes long and therefore each STM PDU with payload is a total of twenty-seven bytes. A burst ending 10 bit guard band 1620 is also included in each upstream STM burst 1600.

Figure 17:
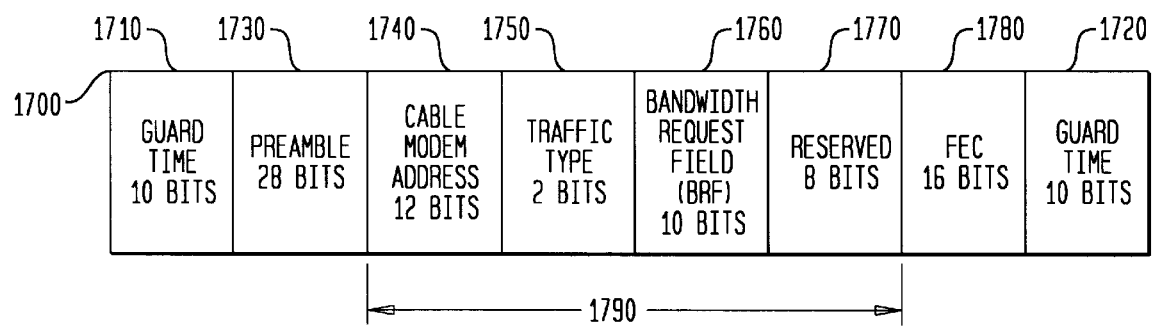
FIG. 17 is a exemplary diagram, in accordance with the present invention, for a structure of an upstream burst for pure contention.

FIG. 17 is an exemplary diagram, in accordance with the present invention, for a structure of an upstream burst for pure contention 1700, also known as a reservation request. Included as elements of a reservation request are a ten bit guard band at the burst front end 1710 and at the burst tail end 1720, and a twenty-eight bit preamble 1730. The reservation request 1700 also contains a twelve bit field identifying the sending cable modem (CM) address 1740 to the headend (HE). A two bit field indicating traffic type 1750 is also included. A bandwidth request field (BRF) 1760 is ten bits in length and sixteen bits are dedicated to FEC 1780. Finally, eight bits are reserved 1770 for future use. Forward error correction is applied over the cable modem address field 1740, the traffic type field 1750, the BRF 1760, and the reserved region 1770, and will correct any one byte within these fields 1790.

The traffic type field (TTF) 1750 specifies the type of PDU which is being transmitted upstream to the HE. A TTF 1750 value of '00' indicates that the PDU is transporting an ATM cell as payload. A TTF 1750 value of '01' indicates that the PDU is transporting a VL payload and that the VL payload is user data. A TTF 1750 value of '10' indicates that the PDU is transporting a VL payload and that the VL payload is an ADAPT control and management message. A TTF 1750 value of '11' is unassigned and reserved.

The bandwidth request field (BRF) 1760 represents a request from a specific cable modem, to the headend BM, for upstream bandwidth allocation in a future upstream frame. For subsequent transmission of upstream ATM PDUs, the BRF 1760 requests the number of upstream ATM cells which are desired to be reserved. An upstream ATM cell reservation consists of six contiguous basic slots. For subsequent transmission of an upstream VL PDU, the BRF 1760 requests the number of upstream basic slots required for transmission. Nine bits of the ten bit BRF 1760 specify the length of a request for bandwidth.

Requests are made absolutely or incrementally. An absolute request specifies the total number of basic slots or ATM cells currently awaiting transmission in a cable modem buffer. An incremental request is a request for additional bandwidth for ATM PDUs that have arrived in the CM buffer since the last request. One bit of the ten bit BRF 1760 denotes whether the request is an absolute or incremental request. The other nine bits specify the quantity of bandwidth requested.

A reservation request, transmitted upstream within a burst for pure contention 1700, is itself a payload. In essence, the BRF 1760 is a ten bit payload, subject to contention, and transmitted upstream with eighty-six bits of overhead. However, a BRF may also be transmitted upstream contained within an ATM or VL PDU. A BRF transmitted in this manner is constructed exactly the same as a BRF transmitted within a burst for pure contention. However, none of the overhead included in a burst for pure contention is included with a BRF accompanying an ATM or VL PDU, since an ATM or VL PDU already include all required information in their overhead. Furthermore, since an ATM or VL PDU are not transmitted in contention basic slots, but rather in reserved basic slots, the BRF included with an ATM or VL PDU is not subject to contention or collision. A BRF transmitted within the frame of an upstream PDU is known as a piggyback request.

Because a BRF 1760 is transmitted upstream from one of a plurality of cable modems to the headend in the contention region, the possibility of a collision is likely. A collision occurs when more than one cable modem attempts to transmit a BRF 1760 in the same basic slot of the same upstream frame. When a collision occurs, neither request is understood by the headend. Therefore, this exemplary embodiment of the present invention also includes a contention resolution mechanism to resolve any collisions. If a collision occurs between competing cable modems while transmitting a BRF 1760, each cable modem must retransmit its request in accordance with the contention resolution mechanism. One example of a contention resolution mechanism known in the art is a binary exponential back-off contention resolution mechanism. The contention resolution mechanism will be explained in greater detail in this application's description of medium access control (MAC) operation.

Figure 18:
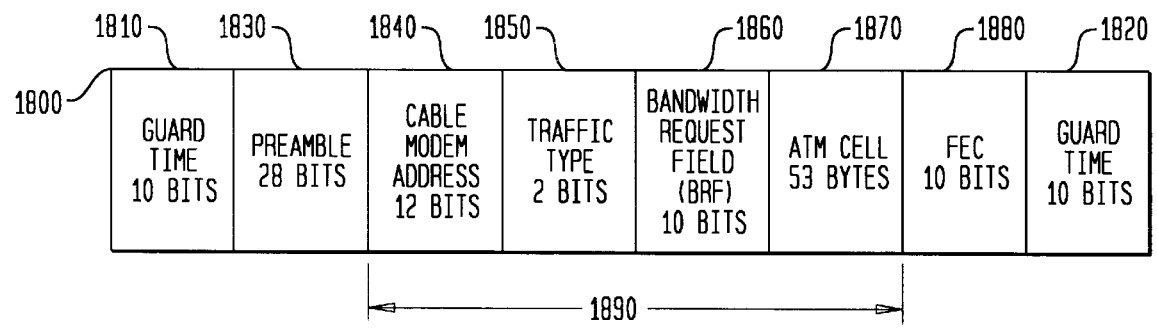
FIG. 18 illustrates an exemplary embodiment of the structure of an upstream burst for an ATM PDU with ATM cell as payload, as incorporated in accordance wit the present invention.

FIG. 18 illustrates an exemplary embodiment of the structure of an upstream burst for an ATM PDU with ATM cell as payload 1800, as incorporated in accordance with the present invention. The total PHY layer burst length for an ATM burst is seventy-two bytes, fifty-three bytes for the ATM cell 1870, the remaining nineteen bytes for overhead. The headend BM allocates six contiguous basic slots for each ATM PDU upstream burst.

Included as fields within the ATM PDU are a ten bit guard band at the burst front end 1810 and at the burst tail end 1820, and a twenty-eight bit preamble 1830. In addition to the ATM cell payload 1870, the ATM PDU 1800 also contains a twelve bit field 1840 identifying the address of the transmitting cable modem to the HE. A two bit traffic type field 1850 identifies the burst to the HE as an ATM PDU with an ATM cell payload. Ten bytes are dedicated to FEC 1880, which is applied over four fields 1890; including, the cable modem address field 1840, the TTF field 1850, the BRF 1860, and the ATM cell 1870. FEC 1880 is able to correct any five bytes over the fifty-seven bytes which are forward error corrected.

A BRF 1860 is included within the upstream ATM PDU 1800. In the pure contention mode, a BRF 1860 is the payload. The BRF 1860 included in the ATM PDU 1800 however, is a piggyback request. An ATM PDU piggyback request is a request for allocation of upstream bandwidth in subsequent upstream frames, made from the transmitting CM, and requested for the transmission of ATM cell payloads. A piggyback request requires no additional overhead, since it is included as part of the ATM PDU 1800, which already possesses the requisite information and overhead. Additionally, a piggyback request is incorporated within a PDU for which the HE had already reserved bandwidth, and therefore helps reduce the demand and load in basic slots assigned for contention requests.

Figure 19:
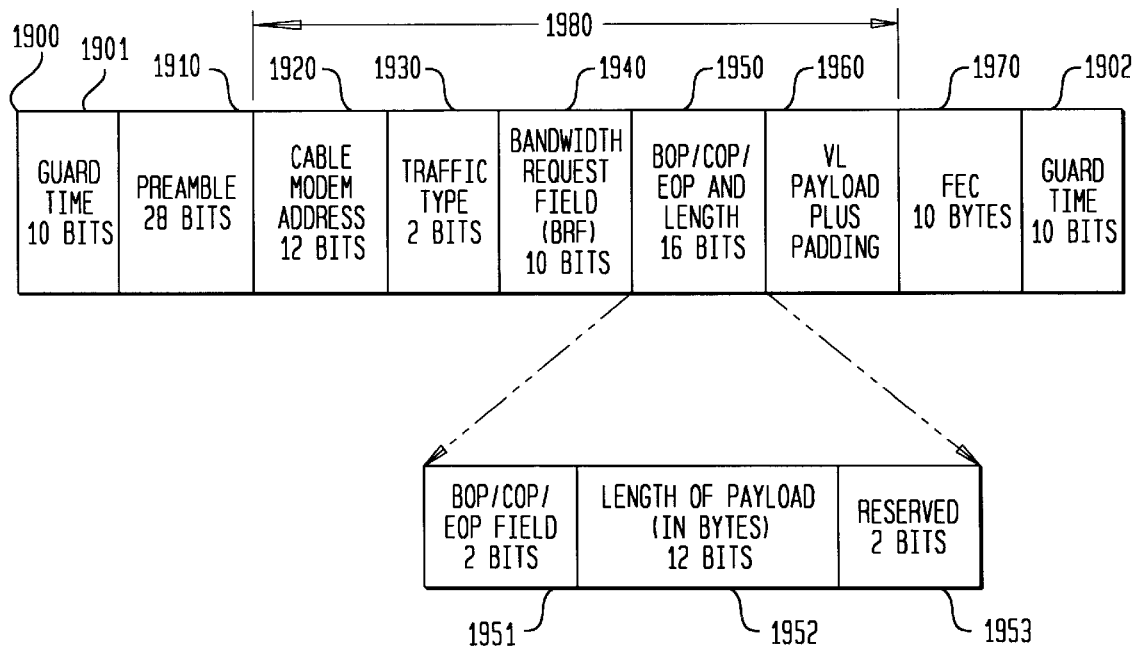
FIG. 19 illustrates an exemplary embodiment of the structure of an upstream burst for a VL PDU with VL payload, as incorporated in accordance with the present invention.

FIG. 19 illustrates an exemplary embodiment of the structure of an upstream burst for a VL PDU with VL payload 1900, as incorporated in accordance with the present invention. Included as elements of the VL PDU are a ten bit guard band at the burst front end 1901 and at the burst tail end 1902, and a twenty-eight bit preamble 1910. In addition do the VL frame payload 1960, the VL PDU 1900 also contains a twelve bit field identifying the sending cable modem (CM) address 1920 to the HE. A two bit traffic type field (TTF) 1930 identifies the burst to the HE as an VL PDU with an VL frame payload. Forward error correction (FEC) is applied over five fields 1980, including: the cable modem address field 1920, the TTF 1930, the BRF 1940, the length field 1950, and the VL payload field 1960. Ten bytes of FEC 1970 can correct any five bytes over the payload.

A ten bit BRF 1940 is included within the upstream VL PDU 1900. In the pure contention mode, a BRF is the payload. The BRF 1940 included in the VL PDU 1900 however, is a piggyback request. An VL PDU piggyback request is a request for allocation of upstream bandwidth in subsequent upstream frames, made from the transmitting CM, and requested for the transmission of VL payloads. A piggyback request requires no additional overhead, since it is included as part of the VL PDU 1900, which already possesses the requisite information and overhead. Additionally, a piggyback request is incorporated within a PDU for which the HE had already reserved bandwidth, thereby decreasing the loading of and demand for basic slots assigned for contention requests.

Also included within the VL PDU is a two byte length field 1950. The length field 1950 contains a two bit BOP/COP/EOP subfield 1951, a twelve bit length subfield 1952, and two bits 1953 reserved for future use. The length subfield 1952 describes the payload length in bytes. Twelve bits can therefore describe a VL frame size up to 4095 bytes. When basic slots have been reserved for upstream VL payloads, the minimum allocation for VL frames within a frame will be two basic slots, or twenty-four bytes. With larger VL frames, the headend BM allocates as many contiguous blocks of basic slots as possible.

Because VL PDUs vary in size and can extend beyond the boundaries of a frame or master frame, the BOP/COP/EOP subfield 1951 is used to describe to the headend BM whether the attached burst is the beginning, continuation, or end of an VL frame. If the associated VL frame is too long to completely transmit within the allocated bandwidth of one upstream burst, and the payload to be transmitted is the beginning of a new VL frame, then the BOP/COP/EOP subfield 1951 bits are set to '00' to indicate that this payload is the beginning of an VL frame and that the entire VL frame will not be transmitted in this burst. If a portion of an VL frame has already been transmitted in a previous upstream burst and the remainder of the frame is still too long to completely transmit within the allocated bandwidth of the current upstream burst, then the BOP/COP/EOP subfield 1951 bits are set to '01' to indicate that this payload is a continuation of a VL frame and that the entire VL frame will not be transmitted in this burst. If a portion of an VL frame has already been transmitted in previous upstream bursts and the remainder of the VL frame is capable of being transmitted within the allocated bandwidth of the current upstream burst, then the BOP/COP/EOP subfield 1951 bits are set to '10' to indicate that this payload is a continuation of a VL frame and that the entire VL frame will be transmitted in this burst. Finally, if a portion of a VL frame has not been transmitted in a prior upstream burst, and the VL frame is short enough that the entire VL frame is capable of being transmitted within the allocated bandwidth of the current upstream burst, then the BOP/COP/EOP subfield 1951 bits are set to '11' to indicate that a complete VL frame is being transmitted in one upstream VL PDU payload.

For example, suppose a CM is about to transmit a VL frame containing 400 bytes of payload upstream to the HE. Assuming the headend BM can and has allocated up to 204 bytes (17 basic slots) for this communication in each of three successive upstream frames (frames $n_0$, $n_1$, and $n_2$), then the CM transmits 204 bytes of the VL PDU with payload upstream in frame no. The BOP/COP/EOP field associated with the VL burst in frame $n_0$ is set to '00' to indicate that the beginning, but not a complete VL payload is being transmitted this frame. Since an upstream VL PDU burst contains twenty-one bytes of overhead, only 183 bytes of the VL frame are actually transmitted in frame $n_0$, leaving 217 bytes of the VL frame in the CM buffer to be transmitted in the following upstream frames. In frame $n_1$ the CM transmits the next 204 bytes of the VL PDU with payload upstream in frame $n_1$. The BOP/COP/EOP field associated with the VL burst in frame $n_1$ is set to '01' to indicate that a continuation of the VL frame is being transmitted, but not the remainder of the VL payload. Since an upstream VL PDU burst contains twenty-one bytes of overhead, only the next 183 bytes of the VL frame are actually transmitted in frame $n_1$, leaving thirty-four bytes of the VL frame in the CM buffer to be transmitted in the following upstream frame. Finally, in frame $n_2$, the CM transmits the remaining portion of the VL frame payload. Total required upstream bandwidth is sixty bytes (five basic slots), thirty-four bytes for the remaining VL payload, twenty-one bytes overhead, and five bytes for padding (to round the PDU to an integral multiple of basic slots). The BOP/COP/EOP field associated with frame $n_2$ is set to '10' to indicate the complete remainder of the VL frame is being transmitted in frame $n_2$.

Figure 20:
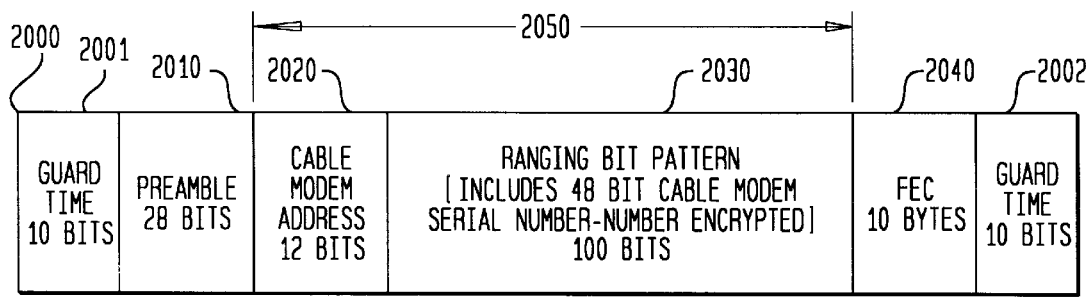
FIG. 20 illustrates an exemplary embodiment of the structure of a ranging upstream burst, an example of a message transmitted within a contention superslot, as incorporated in accordance with the present invention.

FIG. 20 illustrates an exemplary embodiment of the structure of a ranging upstream burst 2000, an example of a message transmitted within a contention superslot, as incorporated in accordance with the present invention. A contention superslot is created by the bandwidth manager (BM) for the purpose of transmitting upstream slow control (USC) messages. Upstream control, management, and signaling messages are referred to as USC messages, and are nominally transmitted in a contention superslot. Some illustrative examples of USC messages are 'power on' or 'off-hook' indication by a CM, ranging messages, etc. A USC message is comprised of a front end and a tail end guard band, a preamble, a cable modem address, and the control message.

A contention superslot is formed by combining six contiguous basic slots. The frequency and location of a superslot within an upstream frame is determined by the headend BM. The headend BM informs the cable modems that a USC superslot will be available in the next upstream frame by transmitting a reservation message in the downstream MAP field. The reservation message is assigned the cable modem address of '1111 1111 1110'. When a CM identifies this address, it interprets that it indicates a USC superslot will be available and can be accessed via the contention mode by any CM having a control or signaling message to transmit.

The USC superslot is accessed by cable modems in a contention mode only. Therefore, collisions of USC superslot PDUs are likely. The threat of a collision is not of a great concern however, since control and signaling messages are infrequent and sporadic in nature. Additionally, utilization of the contention mode limits access delays for control and signaling messages for two reasons. First, successful transmission in the contention region on a first transmission attempt provides immediate message delivery without the necessity of a reservation request. Second, the total demand for a USC channel with which to transmit upstream a control or signaling message is typically very low, approximately five to ten percent of the USC channel bandwidth.

The USC message illustrated in FIG. 20 is that of an upstream ranging burst 2000, a type of message transmitted within a USC superslot. A USC PDU contains a ten bit front end guard time field 2001, a ten bit tail end guard time field 2002, a twenty-eight bit preamble, a twelve bit cable modem address 2020, a control or signaling message, and thirty-two bits of FEC 2040. FEC over two regions 2050; the cable modem address 2020 and the USC message 2030 result in payload error correction of any two bytes. The ranging bit pattern for this upstream ranging burst 2000 is the USC message payload. The payload for a ranging burst is 100 bits in length, including an encrypted forty-eight bit cable modem serial number, generating a total ranging burst PDU length of 192 bits (24 bytes or 2 basic slots). In general, a USC PDU extends over all six basic slots allocated. A ranging burst is an exception to this general rule and can be transmitted anywhere within the span of a contention superslot.

Contention Transmission and Collision Resolution

Figure 21:
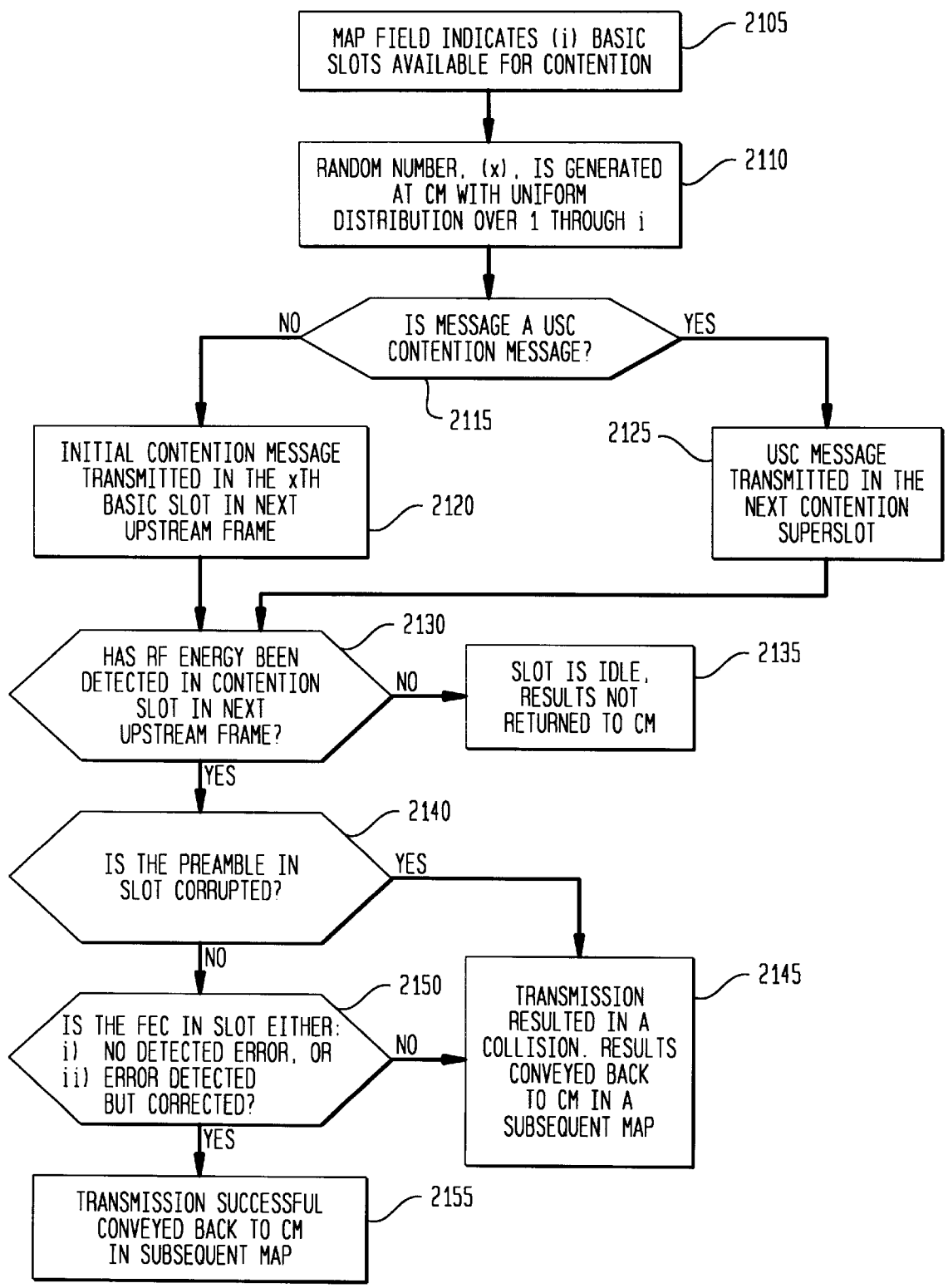
FIG. 21 is a flow diagram illustrating an exemplary collision resolution process, in accordance with the present invention.

FIG. 21 is a flow diagram illustrating an exemplary upstream collision resolution process, in accordance with the present invention. Recall that the MAP field transmitted by the HE conveys to the cable modems which upstream basic slots are available for contention transmission in the next frame. When more than one CM attempts to transmit upstream within the same basic slot, or within the same USC superslot, a collision occurs. A collision results in the corruption of data from both cable modems, and both must retransmit in order to send their original messages to the headend. Therefore, the HE utilizes a collision detection algorithm to detect when a collision has occurred and to transmit to the individual cable modems whether or not their contention burst was successful.

In step 2105, the MAP field indicates that there are i basic slots available for contention in the next frame. The cable modem generates a random integer, x, in accordance with step 2110. The value of x is uniformly distributed over the values one through i. The question is then asked, in step 2115, whether or not the message to be transmitted is a upstream slow control (USC) contention message. If the message to be transmitted upstream is not a USC message, then the contention message is transmitted in the xth basic slot of the asynchronous contention region in the next upstream frame, as per step 2120. If the message to be transmitted upstream is a USC message, then it is transmitted upstream in the next contention superslot, as directed by step 2125. The headend (HE) monitors for RF energy in each contention basic slot and superslot. If RF energy is not detected in step 2130, then the slot is idle. Idle slot results are not returned to the cable modems, as indicated in step 2135. If RF energy is detected, then step 2140 instructs to check whether the preamble is corrupted. If the preamble is corrupted, a collision is indicated and step 2145 directs that the HE report back to the cable modem that a collision has occurred. The collision is reported in the MAP field, which is conveyed as part of the fast control field (FCF). If the result of step 2140 is negative and the preamble is not corrupted, however, then step 2150 examines the forward error correction (FEC) for that slot and if no error is detected, or if an error is detected but corrected, the transmission is successful. Step 2155 conveys to the sending cable modem, via the MAP, field that the transmission of the contention message was successful. If the answer to step 2150 is negative, then a transmission collision is indicated and step 2145 directs that the HE report back to the cable modem that a collision has occurred. The collision is reported in the MAP field.

Figure 22:
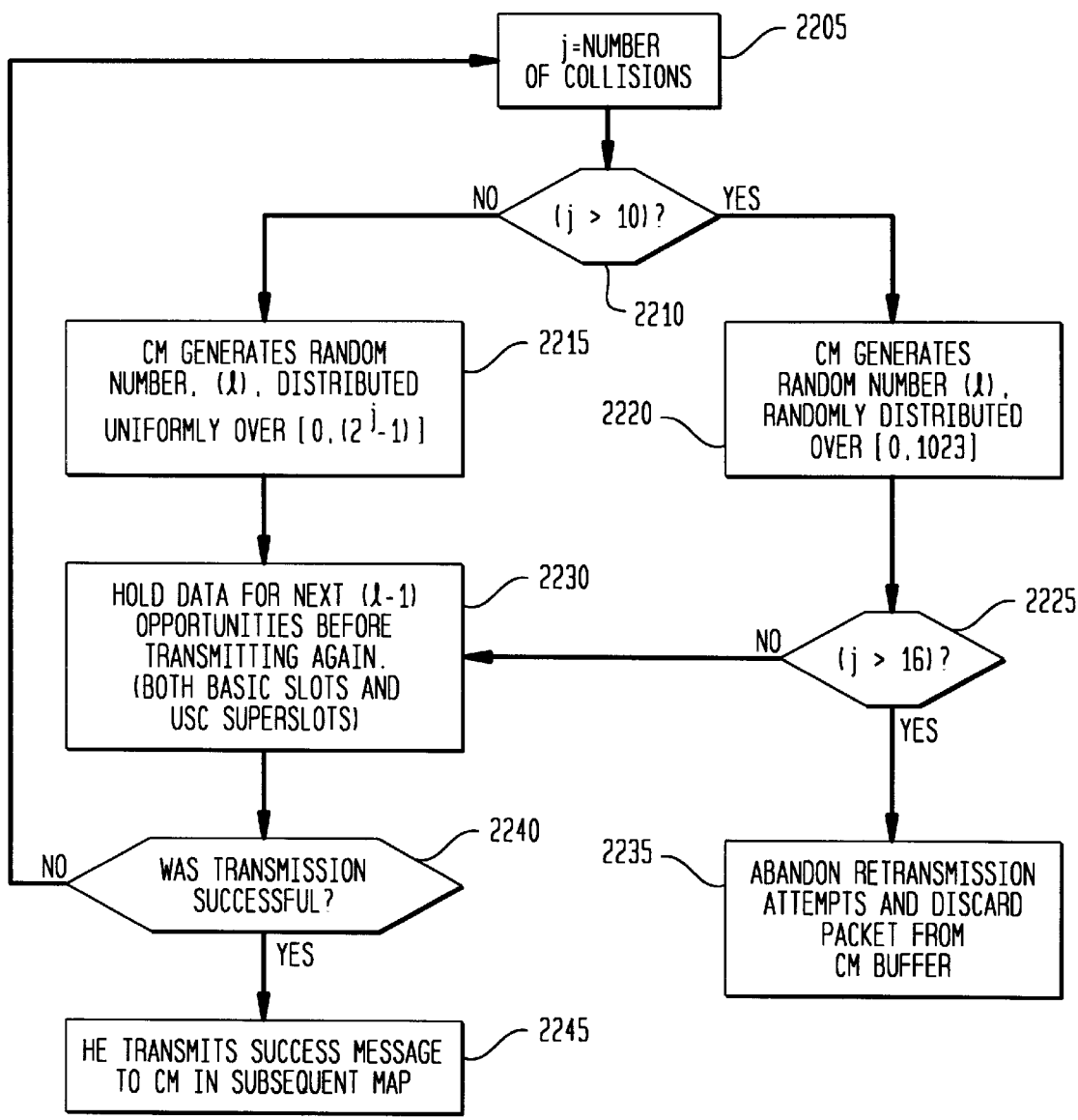
FIG. 22 is a flow diagram illustrating an exemplary retransmission process, for use when upstream contention messages result in a collision, and utilizing a binary-exponential backoff algorithm.

FIG. 22 is a flow diagram illustrating an exemplary retransmission process, for use when upstream contention messages result in a collision, and utilizing a binary-exponential backoff algorithm. When an upstream contention message results in a collision, the cable modems that were affected by the collision retransmit their message. The present invention utilizes a binary exponential backoff algorithm to control the retransmission of contention messages. In step 2205, the cable modem attempting to retransmit an upstream contention message first sets the variables equal to the number of collisions the message has currently encountered. If, in accordance with step 2210, less than ten collisions have been encountered, then step 2215 directs the CM to generate a random number, l, uniformly distributed over the range from zero through ($2^j-1$). If greater than ten collisions have been encountered during the retransmission of one message, then step 2220 directs the CM to generate a random number, l, uniformly distributed over the range from zero to 1023. Step 2225 checks if the number of collisions, j, is greater than sixteen. If greater than sixteen collisions have occurred, then step 2235 directs that retransmission attempts for the upstream contention message should be abandoned and that the message should be discarded from CM buffer memory. However, if the result of step 2225 is negative, then step 2230 is performed. Step 2230 is also performed as a natural consequence of completing step 2215. Step 2230 directs that the upstream contention message should be held for the next (l–1) opportunities of the same kind (either a basic slot or a USC superslot) before transmitting it again. The previously collided message is then retransmitted in the next contention slot opportunity. If transmission was successful, then, in accordance with step 2245, the HE transmits a success message to the transmitting CM in a subsequent MAP. If, however, the answer to step 2240 is negative, then the retransmission process starts again at step 2205.

Security and Encryption

Referring again to FIG. 2, illustrated as a portion of the ADAPT broadband communications network, are an encryptor 202 and a decryptor 270. These component functions have been previously described within the overview of the present application. A more complete description of the method utilized for system security and encryption is presented here. Although the method of security and encryption described is utilized in conjunction with the previously described ADAPT, it may also be utilized in conjunction with other protocols as well, and with different transmission modes across different mediums, as would be apparent to those skilled in the art.

Figure 23:
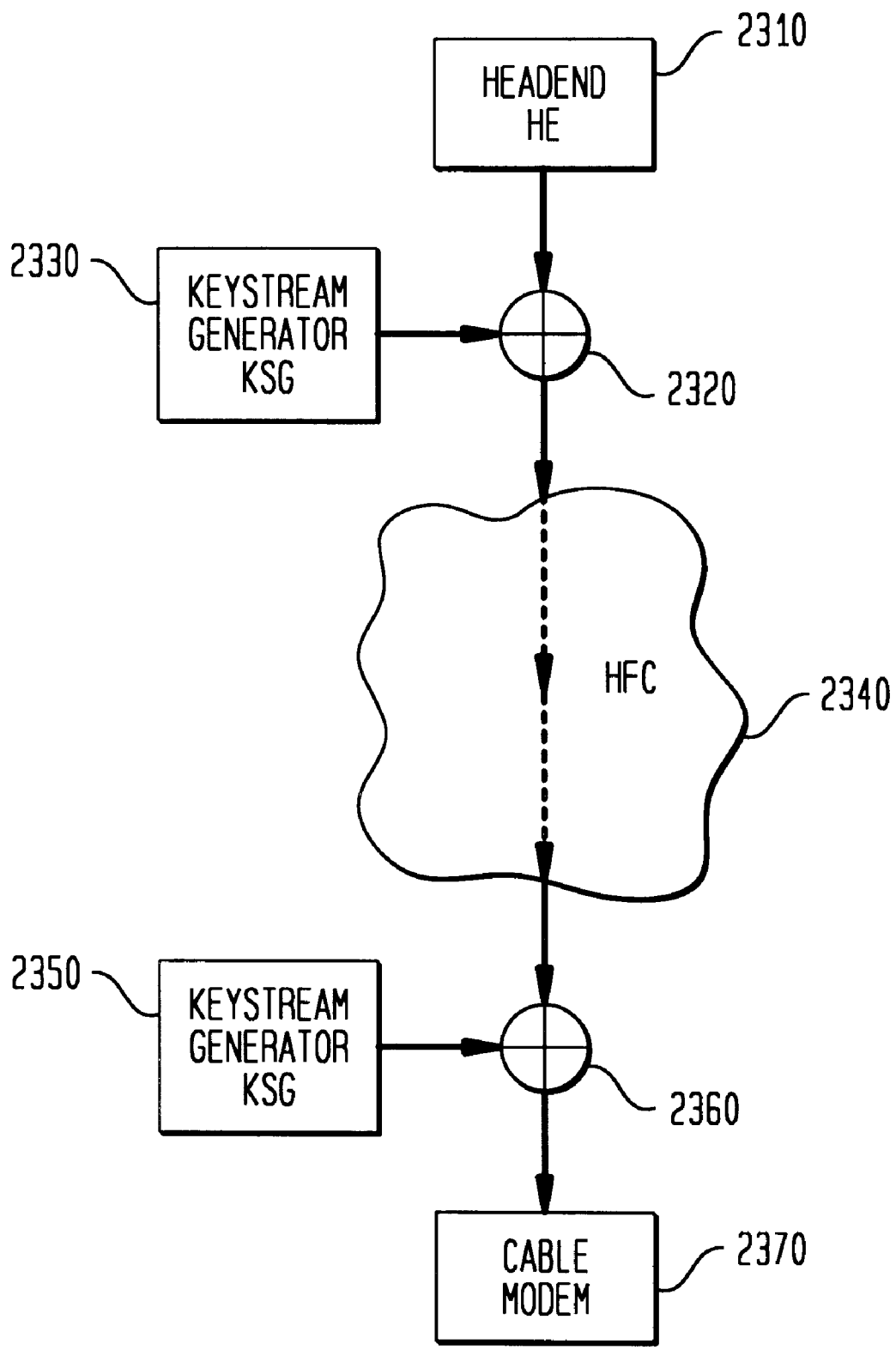
FIG. 23 is a representation of an exemplary embodiment of the encryption architecture associated with the present invention.

FIG. 23 is a representation of an exemplary embodiment of the encryption architecture associated with the present invention. During downstream transmission, a headend (HE) 2310 transmits a downstream payload to a cable modem (CM) 2370 over a hybrid fiber/coax network 2340. Upstream transmission, although not shown, possesses a similar architecture, except that during upstream transmission, the CM would be the transmitting or originating source and the HE would be the information destination. Alternatively, if the present invention is incorporated within a cellular wireless broadband communications network, then the functional equivalent of a 'headend' would be a 'common controller' and the functional equivalent of a 'cable modem' would be a 'mobile station' or simply 'station.' Additionally, for HFC networks concentrating on telephony, a network interface unit (NIU) may be substituted for a cable modem, since the functions for each are similar.

Prior to multiplexing, the HE 2310 sends downstream payload in plaintext format to one input of an 'exclusive OR gate' (XOR) 2320. The other input of the XOR gate 2320 is connected to a keystream generator (KSG) 2330. The KSG output bytes are white noise with each byte value of output being as equally probable as another and the KSG output being a statistically independent bytestream. Interception of the signal after KSG has been XORed with plaintext provides no useful information to a system attacker or an eavesdropper, since the ciphertext output has no correlation to the plaintext payload without knowing the key that is used to configure the KSG 2330. The encrypted signal is then completely processed by HE components and eventually transmitted over the hybrid fiber/coax network 2340 to the desired destination. At the cable modem 2370, the encrypted data is sent to an XOR gate 2360. A KSG 2350 with full access to the encryption keys utilized at the HE also delivers a keystream to XOR gate 2360 at the cable modem 2370. The resulting output is a decryption of the original encryption and a plaintext output of the downstream payload at the CM 2370.

The HE and a CM can secure their payload transmissions by use of a shared secret key, that is, a key known only to both parties. A key is a string of random bits, the length being great enough to preclude guessing its value. The key is used at both ends to configure an encryption algorithm. The present invention utilizes a shared secret key called a permanent key (PMK). The PMK is intended to remain in the HE and CM non-volatile memory (NVM) for the lifetime of the product, although a new PMK can be generated if the original PMK is compromised by an attacker. One exemplary embodiment of the present invention utilizes a 112 bit PMK, a random number used as a key to encrypt and decipher transmitted payload. The method of encryption used with the present invention is triple-DES, a very strong encryption algorithm considered by most cryptographers to be secure against future attacks for more than twenty years, based on projected expectations regarding future computing power. Other encryption algorithms may be used in conjunction with the present invention, as would be apparent to those skilled in the art, and therefore the algorithms description contained herein is to be construed as illustrative only. Many of the processes described herein can be modified or in some cases omitted in various embodiments of the invention without departing from the spirit of the invention. Further, many of the steps included in the description of lids invention may be accomplished in a greater number or fewer number of exchanges between components without departing from the spirit of the invention. Additionally, specific detailed data lengths chosen for variables, keys, data messages and the like are merely illustrative embodiments and may be varied without departing from the spirit of the present invention.

An exemplary embodiment of the present invention offers two methods of key exchange, Level 0 and Level 2. Both levels provide a high degree of security, each level being equally secure as the other for a given application, and also provide for mutual authentication between CM and HE. However, Level 0 is designed for one-way transmission systems and is considered secure with a plain old telephone service (POTS) return for security message exchanges, whereas Level 2 is secure for both one-way and two way systems. Level 2 requires the modem manufacturer to support a key certification authority (KCA), whereas Level 0 does not require a KCA. The KCA generates and sends public certificates to the network provider's operator support system (OS), via the Internet or other means, or otherwise posts them on a file transfer protocol (FTP) site. One exemplary embodiment of the present invention utilizes KCA generated certificates using Rabin's method with a 2048 bit modulus, although other methods and a longer or shorter bit modulus may be used as well, as would be apparent to those skilled in the art.

The present invention incorporates hierarchical security into both key exchange and encryption. Level 2 key exchange creates a hierarchical flow of trust via public certificates. That is, the manufacturer first certifies the cable provider to the CM user. The cable provider in turn certifies the HE to the user. Regarding encryption, a keystream is created by first using public keys and components, creating a permanent key (PMK) from those public keys and components, utilizing the PMK to create connection or session keys, creating a set of cryptovariables from the connection keys, and finally utilizing the cryptovariables to create a keystream. The keystream is XOR'ed with a plaintext input to produce a ciphertext output, while an exact duplicate keystream is XOR'ed at the communication destination with the arriving ciphertext to produce a plaintext output.

The following is a description of a key exchange between components of the present invention. Key exchange is a method of mutual authentication between CM and HE which must successfully occur prior to a flow of information between the CM and HE. Key exchange is therefore a necessary precursor to the encryption of plain text into ciphertext. First, a description of key exchange common to both Level 0 and Level 2 is presented, then the remainder of Level 0 key exchange is presented, followed by the remainder of Level 2 key exchange.

Figure 24:
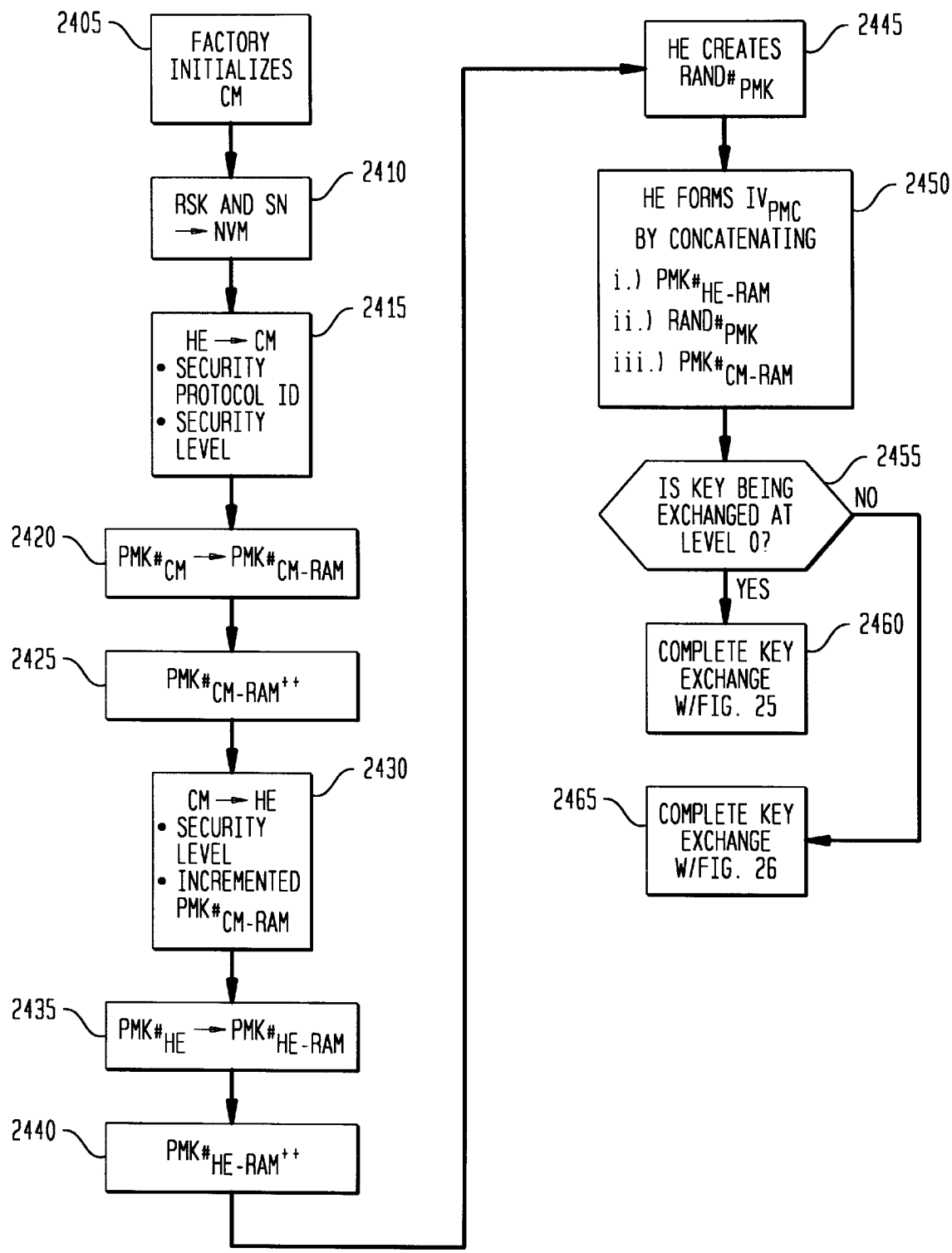
FIG. 24 is an exemplary process diagram for the common steps during implementation of a Level 0 or a Level 2 key exchange, in accordance with the present invention.

FIG. 24 is an exemplary process diagram for the common steps during implementation of either Level 0 or Level 2 key exchange, in accordance with the present invention. In accordance with step 2405, the factory which manufactures individual cable modems initializes the CM. Initialization consists of zeroing all cryptographic variables contained within the modem's non-volatile memory (NVM) with the exception of the and key certification authority share a set of master keys used to generate RSKs. The present invention uses 112 bit RSKs, however other length RSKs could also be used, as would be apparent to those skilled in the art. In accordance with step 2410, the manufacturer writes a single SN and a single RSK number into each cable modem's NVM.

Upon initial CM installation or reinitialization, in step 2415, an operator support system (OS) transmits a 'Control Key Request' message to the cable modem (CM) via the headend (HE). The message contains parameters defining its security protocol identification and desired level of security. The CM responds, in accordance with step 2420 by copying a $PMK\#_{CM}$ counter from the modem's NVM into the modem's random access memory (RAM) as $PMK\#_{CM\text{-}RAM}$ and then incrementing, in accordance with step 2425, $PMK\#_{CM\text{-}RAM}$ only. $PMK\#_{CM}$ is a sixteen bit permanent key counter in the CM NVM which is incremented at the close of a successful PMK update. $PMK\#_{CM\text{-}RAM}$ is a RAM-based copy of $PMK\#_{CM}$ and is incremented immediately after being loaded from NVM. Counters are utilized at both HE and CM to ensure the uniqueness of each PMK created.

In step 2430, the CM transmits a 'Control Key Response' message which contains two pieces of information; the desired security level for the transmission and the previously incremented $PMK\#_{CM\text{-}RAM}$. In step 2435, the HE responds to the 'Countrol Key Response' message by copying a $PMK\#_{HE}$ counter associated with the current PMK from NVM to RAM. $PMK\#_{HE}$ is a sixteen bit permanent key counter located in the NVM of the HE, and is incremented at the close of a successful PMK update. $PMK\#_{HE\text{-}RAM}$ is a RAM-based copy of $PMK\#_{HE}$ and is incremented immediately after being loaded from NVM, in accordance with step 2440.

In step 2445, the HE generates a thirty-two bit random number, $RAND\#_{PMK}$. The HE then forms a sixty-four bit initialization vector, $IV_{PMK}$, in accordance with step 2450, by concatenating in the following order $PMK\#_{HE\text{-}RAM}$, $RAND\#_{PMK}$, and $PMK\#_{CM\text{-}RAM}$. $IV_{PMK}$ is then temporarily stored in RAM. In step 2455, the key exchange process diverges, the key exchange process followed from this point forward depending upon the previously selected security level. If security Level 0 is desired, then completion of the key exchange process is accomplished using the Level 0 process illustrated in FIG. 25, in accordance with step 2460. If security Level 2 is desired, then completion of the key exchange process is accomplished utilizing the Level 2 process illustrated at FIG. 26, in accordance with step 2465.

Figure 25:
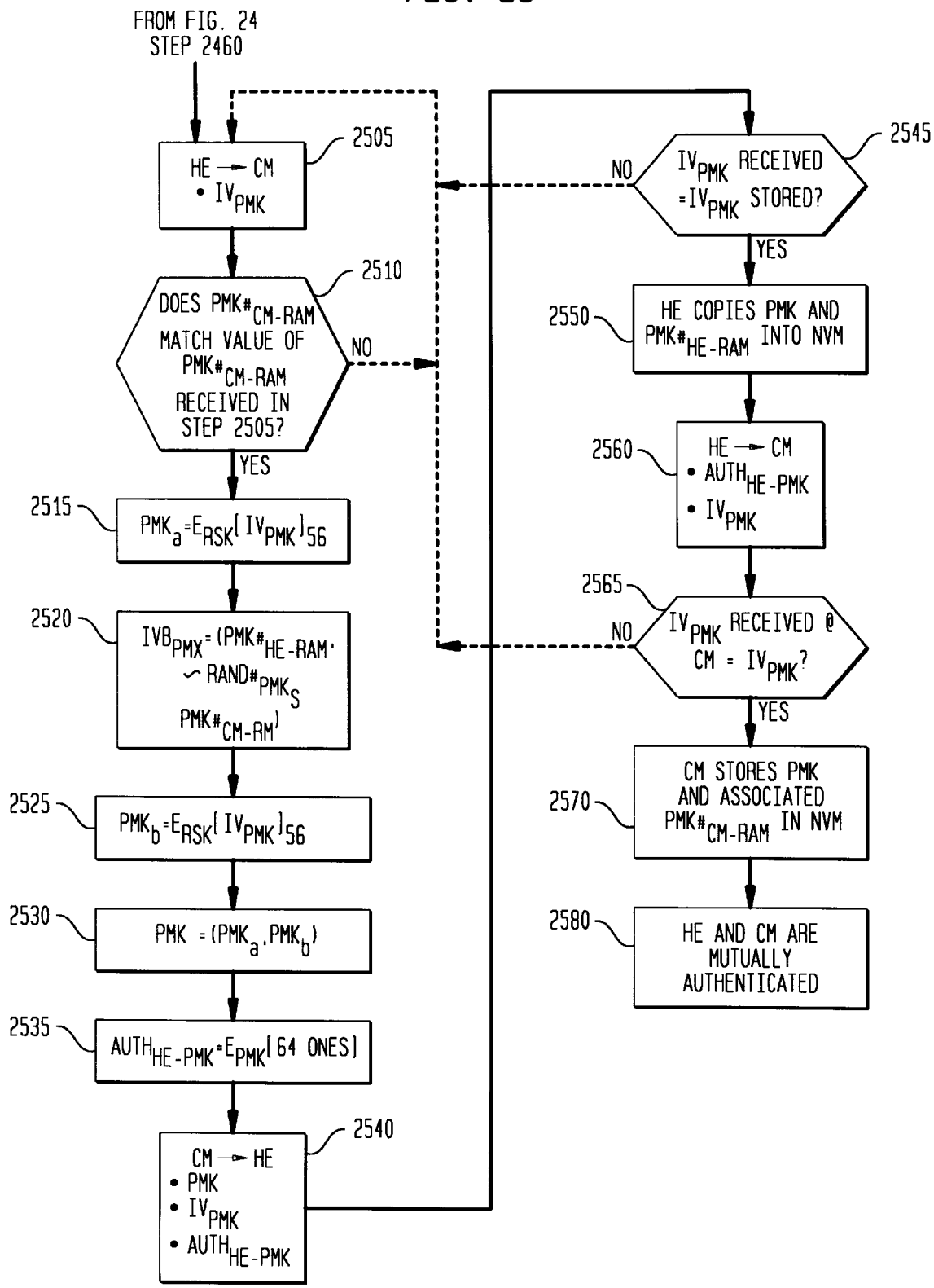
FIG. 25 is an exemplary process diagram for the remaining steps to complete the PMK exchange protocol associated with Level 0 security, in accordance with the present invention.

FIG. 25 is an exemplary process diagram for the remaining steps to complete the PMK exchange protocol associated with Level 0 security, in accordance with the present invention. In step 2505, the HE transmits $IV_{PMK}$ to the CM. As previously described, $IV_{PMK}$ is formed by concatenating in the following order, $PMK\#_{HE\text{-}RAM}$, $RAND\#_{PMK}$, and $PMK\#_{CM\text{-}RAM}$. The CM then compares the value of $PMK\#_{CM\text{-}RAM}$ just received from the HE with the present value of $PMK\#_{CM\text{-}RAM}$ residing at the CM, in accordance with step 2510. If the two values match, then step 2515 is performed. However, if the compared values of $PMK\#_{CM\text{-}RAM}$ differ, then in accordance with step 2510, step 2505 is repeated. A limit may be placed on the number of HE retransmissions of $IV_{PMK}$.

Assuming that step 2510 is successfully completed, the CM creates a permanent key (PMK). First, in step 2515, the first half of a permanent key, $PMK_a$, is created. $PMK_a$ is formed by encrypting the sixty-four bit IVPMK with triple-DES, the 112 bit RSK being the encryption key, and then truncating the sixty-four bit triple-DES output to fifty-six bits. Next, in accordance with step 2520, the CM forms another initialization vector ($IVB_{PMK}$). $IVB_{PMK}$ is formed by concatenating in the following order, $PMK\#_{HE-RAM}$, the one's complement of $RAND\#_{PMK}$, and $PMK\#_{CM-RAM}$. $PMK_b$ is then formed, in accordance with step 2525, by encrypting the sixty-four bit $IVB_{PMK}$ with triple-DES, the 112 bit RSK being the encryption key, and then truncating the sixty-four bit triple-DES output to fifty-six bits. Finally, in step 2530, the 112 bit permanent key (PMK) is formed by concatenating $PMK_a$ and $PMK_b$. In step 2535, the cable modem also creates a sixty-four bit authenticator, $AUTH_{HE-PMK}$, by triple-DES encrypting an all ones block with the PMK as the encryption key.

In step 2540, the cable modem transmits the PMK, $IV_{PMK}$, and $AUTH_{HE-PMK}$ to the headend. The HE, in step 2545 ensures that the value of $IV_{PMK}$ it has just received matches its own stored copy. If the values do not match, then both HE and CM should restart the process at step 2505. The number of attempts at matching $IV_{PMK}$s in step 2545 can be limited, if desired, since a failure to match values at this point is an indication that the downstream connection is possibly being spoofed by an attacker. If the answer at step 2545 is affirmative, the HE has verified that the PMK was created from the CM it is currently in communication with. The HE next copies the PMK and its associated $PMK\#_{HE-RAM}$ into NVM, in accordance with step 2550.

The HE then sends a message to the CM containing the $AUTH_{HE-PMK}$ and $IV_{PMk}$, in accordance with step 2560. The message is a signal to the CM, unique for each PMK generation session, that the IVPMK matched at the HE and that the HE copied the PMK and $PMK\#_{HE-RAM}$ into NVM. In step 2565, the CM compares the $IV_{PMK}$ it just received in step 2560 with its stored copy of $IV_{PMK}$, thus protecting against missed messages. If the $IV_{PMK}$s do not match, then both HE and CM should restart the process at step 2505. The number of attempts at matching IVPMKS in step 2565 can be limited, if desired, to prevent against possible spoofing attacks. If the result of step 2565 is affirmative, then the CM stores the PMK and the associated $PMK\#_{CM-RAM}$ in NVM, in accordance with step 2570. Both HE and CM have a mutually authenticated PMK under Level 0 security and may proceed with connection key (CCK) generation, in accordance with step 2580.

Another method for achieving PMK exchange protocol is to utilize Level 2 security, in accordance with the present invention. Level 2 security utilizes a cable modem manufacturer-run key certification authority (KCA) and also utilizes various certificates to authenticate the HE and the CM to each other. Level 0 sent a PMK upstream in the clear, but physically protected the PMK by a plain old telephone service (POTS) return. Level 2, on the other hand, is secure for one-way and two-way plants. The factory programs additional identifying information into a cable modem for Level 2 PMK generation. For Level 2 security, a 112 bit random seed key (RSK) and a ninety-six bit hash of the manufacturer's KCA modulus (public key), $n_{KCA}$, are programmed into the CM NVM at the factory. The Rabin public key ($n_{KCA}$) is the product of two primes which are kept secret within the KCA. One embodiment of the present invention utilizes an encryption scheme featuring a one-way implementation of Rabin's method. One-way Rabin's method features creation of certificates at the KCA and OS and encryption at the HE in a manner such that all square root functions are accomplished at the KCA, OS, and HE. Therefore, only squaring functions need be accomplished at individual cable modems, thus significantly decreasing the complexity of operation, amount of required hardware and RAM, and therefore the cost of individual cable modems.

Level 2 key exchange and authentication utilizes a series of four certificates. Prior to a description of the process of Level 2 key exchange, a brief description of the four certificates is first presented. The table below conveys the function, source and destination, and type of encryption used for each of the four certificates.

|   | FUNCTION | SENT FROM/TO | TYPE |
|---|---|---|---|
| Certificate A | Allows CM to authenticate OS | KCA ⇨ CM | Rabin |
| Certificate B | Allows CM to authenticate HE | OS ⇨ CM | Rabin |
| Certificate C | Allows HE to authenticate CM | KCA ⇨ HE | Triple-DES |
| Certificate D | Provides authenticated IVs to CM | HE ⇨ CM | Rabin |

Certificate A allows a cable modem to authenticate the operator support system (OS). When a CM is originally shipped to a cable operator, the manufacturer's order servicing system informs the KCA of the cable modem's serial number (SN) and its destination. The KCA then forms Certificate A, utilizing the cable modem SN and the OS Rabin public key ($n_{OS}$). The CM serial number and $n_{OS}$ are first concatenated. The square root modulo $n_{KCA}$ is then derived from the result of the concatenation. Mathematically, the operation is: $sqrt(SN, n_{OS})$ mod $n_{KCA}$. Finally, Certificate A is formed by concatenating $n_{KCA}$ with $[sqrt(SN, n_{OS})$ mod $n_{KCA}]$. The result is mathematically represented as: $[n_{KCA}, sqrt(SN, n_{OS})$ mod $n_{KCA}]$. The certificate is transmitted to the OS, then to the HE, which in turn transmits the certificate to the CM. Once Certificate A has been received by the CM, the OS is authenticated and the CM will accept messages from the OS.

Certificate B allows a cable modem to authenticate the headend. The OS certifies the HE to the cable modem being installed. The OS forms Certificate B, utilizing the cable modem SN and the HE Rabin public key ($n_{headend}$). The CM serial number and $n_{headend}$ are first concatenated. The square root modulo nos is then taken from the result of the concatenation just performed. Mathematically, the certificate is formed by the operation $sqrt(SN, n_{headend})$ mod nos. The certificate is transmitted to the HE, which in turn transmits the certificate to the CM. Once Certificate B has been received by the CM, the HE is authenticated and the CM will accept messages from the HE. The CM then removes $n_{OS}$ from RAM memory and writes $n_{headend}$ to RAM.

Certificate C allows the HE to authenticate the CM. The KCA forms another per-modem certificate which is sent to the OS and then to the HE. Initially, the KCA creates an initialization vector, $IV_{AUTH}$. $IV_{AUTH}$ is then triple-DES encrypted with the CM's random seed key (RSK) to yield a shared secret key, $SSK_{AUTH}$. The mathematical representation for the shared secret key is: $SSK_{AUTH}=E_{RSK}[IV_{AUTH}]$. The cable modem SN is then triple-DES encrypted with $SSK_{AUTH}$. Finally, Certificate C is formed by concatenating the SN, the $IV_{AUTH}$, and the encrypted form of the SN and then taking the square root modulo $n_{KCA}$ of the concatenated quantity. The mathematical representation for Certificate C is: $sqrt(SN, IV_{AUTH}, E_{SSKauth}[SN])$ mod $n_{KCA}$.

Certificate D is sent from the headend (HE) to the cable modem (CM) and authenticates initialization vectors (IVs)

to the modem. The HE and the CM mutually generate a permanent key initialization vector ($IV_{PMK}$) to be used to form a permanent key (PMK). The CM then concatenates SN, PMK, $IV_{PMK}$, and $SSK_{AUTH}$, encrypts the concatenation by squaring with the HE's public key, $n_{headend}$, and transmits the encrypted concatenation to the HE. The HE decrypts the message and decrypts $E_{SSKauth}[SN]$ that it had previously received to authenticate the CM, HE and CM then store PMK in NVM and both also have a shared secret key and so may commence with a connection.

Figure 26:
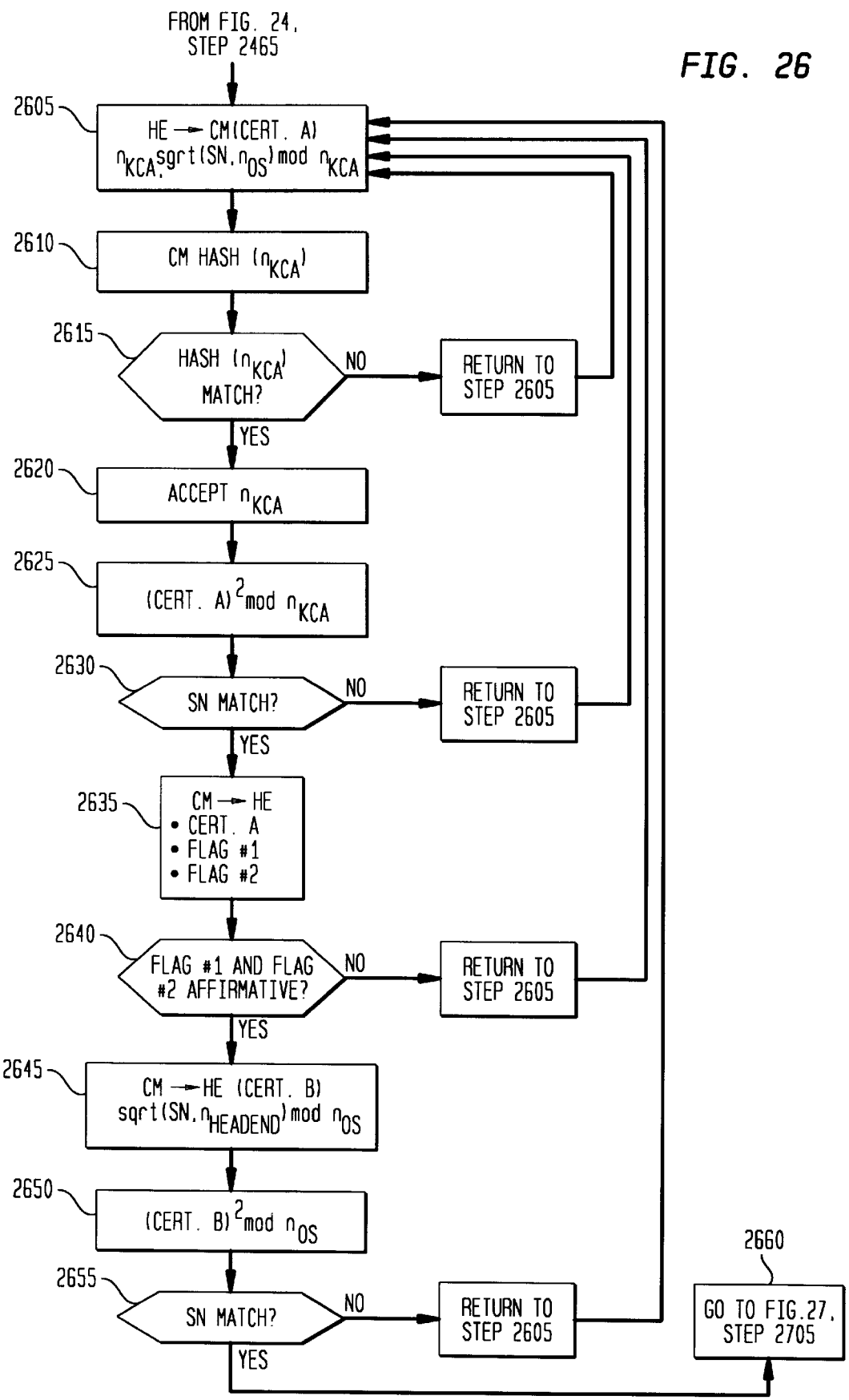
FIG. 26 is an exemplary representation a Level 2 key exchange which uses a certified Rabin's method public key with a cable modem public component to yield mutual authentication between headend and cable modem, in accordance with the present invention.

FIG. 26 is an exemplary representation of the use of a Rabin's method certified public key with a cable modem public component to yield mutual authentication between headend and cable modem, in accordance with the present invention. If the key exchange and mutual authentication are to be completed at Level 2, then step 2465 of FIG. 24 directs a transition to step 2605 of FIG. 26. In step 2605, the HE transmits Certificate A to the cable modem. Certificate A is mathematically represented as: sqrt(SN,$n_{OS}$) mod $n_{KCA}$ and is concatenated with the KCA's public key ($n_{KCA}$) within the message that transmits the certificate. The certificate contains the cable modem's SN and the OS' public key ($n_{OS}$), encrypted modulo $n_{KCA}$. In step 2610, the CM performs a hash function on the received $n_{KCA}$. The CM then compares the hash function result with the hash of $n_{KCA}$ that is stored in NVM as programmed by the manufacturer, in accordance with step 2615. If the result of the comparison is that the hash functions do not match, then the certification process is begun anew at step 2605. If the hash function results do match, then the CM accepts the full 2048 bit $n_{KCA}$ as authentic, per step 2620.

In step 2625, Certificate A is then decrypted by squaring the certificate modulo $n_{KCA}$, resulting in concatenated values for SN and $n_{OS}$. The CM then compares the CM SN it had just decrypted with the CM SN programmed into NVM at the manufacturer, in step 2630. If the result of step 2630 is that the two serial numbers do not match, then the certification process is begun anew at step 2605. If, however, the programmed SN and decrypted SN match, then, in accordance with step 2635, the CM transmits Flag#1 and Flag#2 back to the HE, labeled with Certificate A. Flag#1 indicates whether a match resulted from the comparison between stored and decrypted values of $n_{KCA}$. Flag#2 indicates whether a match resulted from the comparison between stored and decrypted values of the CM SN. In accordance with step 2640, if both Flag#1 and Flag#2 indicate an affirmative match, then step 2645 is next performed. If, however, the result of step 2640 is negative, then the certification process is begun anew at step 2605.

In step 2645, the HE transmits Certificate B to the CM. Certificate B contains an OS public key encrypted copy of the cable modem SN and the HE public key ($n_{headend}$) and is mathematically represented by: sqrt(SN, $n_{headend}$) mod $n_{OS}$. Certificate B is then decrypted at the CM by squaring modulo $n_{OS}$ the certificate, in accordance with step 2650. In step 1655, the CM compares the decrypted value of its SN with the SN stored in NVM. If the stored and encrypted values of the CM SN do not match, then the certification process is begun anew at step 2605. If, however, step 2655 is affirmative, then the Level 2 key exchange and authentication process continues, in accordance with step 2660, at FIG. 27, step 2705.

Figure 27:
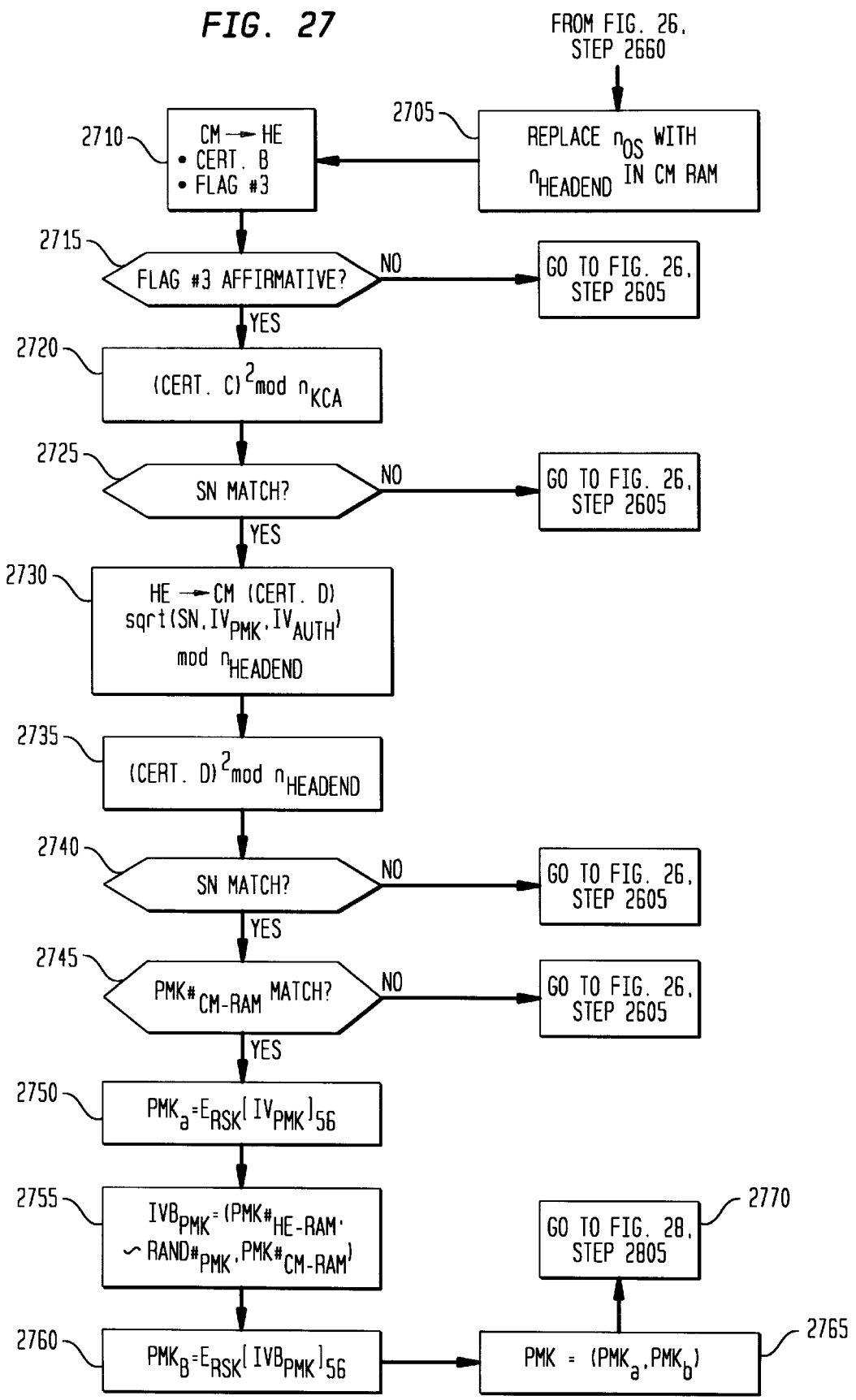
FIG. 27 is a continuation of the exemplary representation of a Level 2 key exchange begun in accordance with FIG. 26 and completed in accordance with FIG. 28.

FIG. 27 is a continuation of the exemplary representation of a Level 2 process of mutual authentication between headend and cable modem, begun in accordance with FIG. 26. Continuing with the key exchange and authentication process, in accordance with step 2705, the CM deletes the OS public key ($n_{OS}$) from RAM and writes the HE public key ($n_{headend}$) to RAM. In step 2710, the CM transmits a message containing Flag#3 labeled with Certificate B to the HE. Flag#3 communicates to the HE whether the SN comparison performed at step 2655 of FIG. 26 was successful. If Flag#3 indicates no SN match, then in accordance with step 2715, the HE directs that the Level 2 certification process begins again starting with step 2605 of FIG. 26. If, however, Flag#3 is affirmative, then the HE decrypts Certificate C by squaring the certificate modulo $n_{KCA}$, in accordance with step 2720. Decrypting Certificate C yields the cable modem's SN, $IV_{AUTH}$, and $E_{SSK}[SN]$. Recall that $E_{SSK}[SN]$ represents the cable modem's serial number, triple-DES encrypted with a shared secret key (SSK) that was derived from the random seed key (RSK) at the key certification authority (KCA). In step 2725, the HE compares the CM SN stored in its memory against the SN in Certificate C. If the serial numbers do not match, then the HE directs that the Level 2 authentication process begins again at step 2605 of FIG. 26.

If the serial numbers match, then in accordance with step 2730, the HE transmits Certificate D to the CM. Certificate D is an encrypted value representing the concatenated values of the cable modem serial number, the permanent key initialization vector ($IV_{PMK}$) and the authenticating initialization vector ($IV_{AUTH}$). Certificate D is a Rabin encrypted certificate utilizing the HE modulus as a key and is mathematically represented as: sqrt(SN, $IV_{PMK}$, $IV_{AUTH}$) mod $n_{headend}$. Once received by the CM, decryption is accomplished by squaring the certificate modulo $n_{headend}$, in accordance with step 2735. In step 2740, the cable modem SN decrypted from Certificate D is compared with the cable modem SN held in HE memory. If the two CM serial numbers do not match, then the HE directs that the Level 2 key exchange and authentication process begins anew at step 2605 of FIG. 26. If the serial numbers match, however, then the HE compares the cable modem RAM permanent key counter ($PMK\#_{CM-RAM}$), contained in the $IV_{PMK}$ just decrypted, with the $PMK\#_{CM-RAM}$ contained in NVM, in accordance with step 2745. If the $PMK\#_{CM-RAM}$ comparison does not result in a match, then the HE directs that the Level 2 key exchange and authentication process begins again at step 2605 of FIG. 26. If, however, the $PMK\#_{CM-RAM}$ comparison yields a match, then the process of creating a permanent key (PMK) begins.

The permanent key (PMK) is a 112 bit key, formed from two fifty-six bit halves, $PMK_a$ and $PMK_b$. In step 2750, $PMK_a$ is formed by triple-DES encrypting $IV_{PMK}$ with the RSK as key and then truncating the sixty-four bit result to achieve fifty-six bits. $IVB_{PMK}$ is a concatenation of $PMK\#_{HE-RAM}$, the ones complement of $RAND\#_{PMK}$, and $PMK\#_{CM-RAM}$, as illustrated in step 2755. $PMK_b$ is then formed by triple-DES encrypting $IVB_{PMK}$ with the RSK as key and then truncating the sixty-four bit result to achieve fifty-six bits. The PMK is formed by concatenating $PMK_a$ with $PMK_b$, in accordance step 2765. In step 2770, the Level 2 key exchange and authentication process continues, in accordance with step 2770, at FIG. 28, step 2805.

Figure 28:
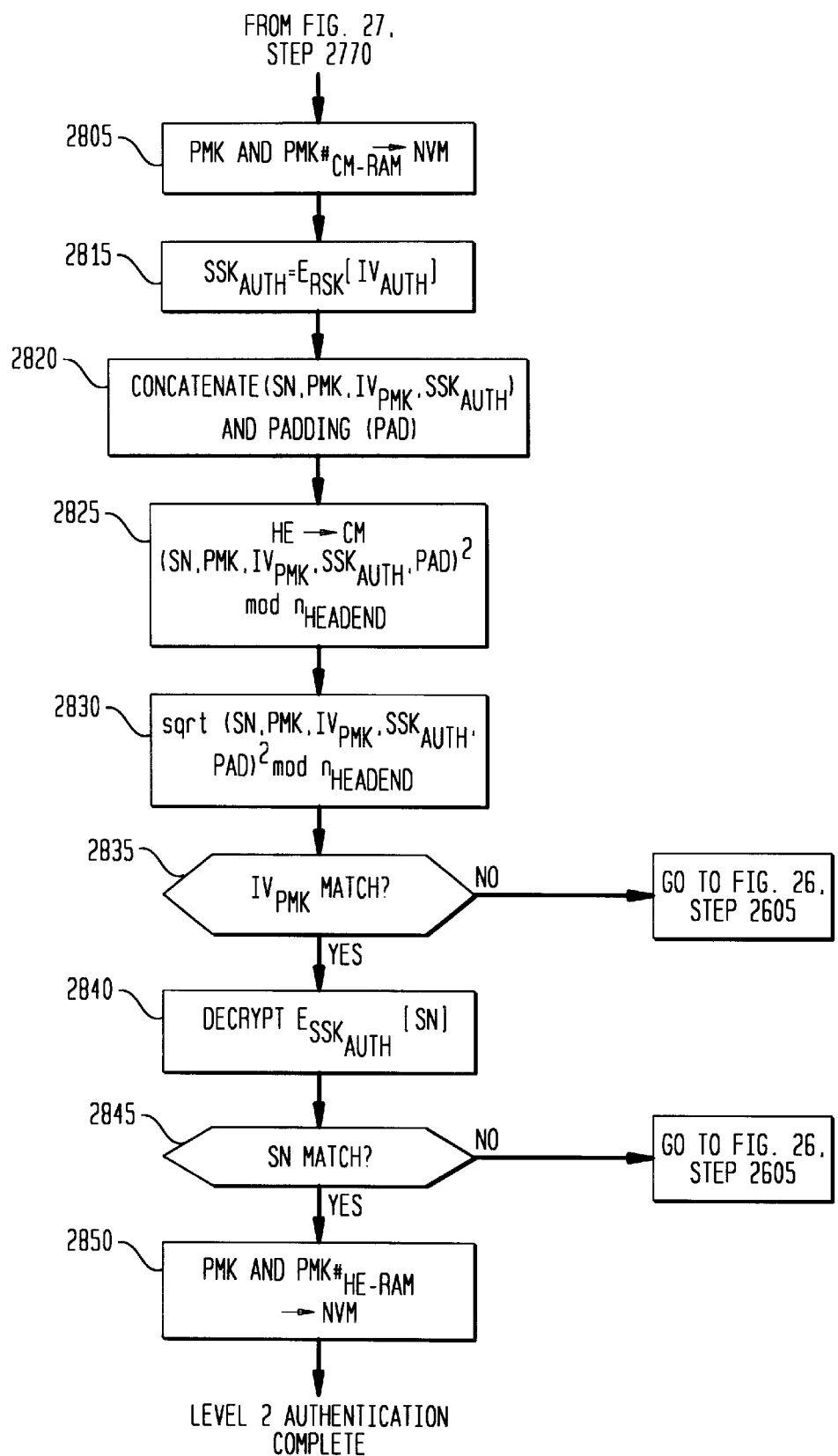
FIG. 28 is a representation of the concluding steps of the exemplary representation of a Level 2 key exchange begun in accordance with FIG. 26 and continued in accordance with FIG. 27.

FIG. 28 is the completion of an exemplary representation of a Level 2 process of mutual authentication between headend and cable modem, begun in accordance with FIG. 26, continued in accordance with FIG. 27, and in accordance with the present invention. In step 2805, the PMK is written to the NVM at the HE adjacent to $PMK\#_{CM}$. $PMK\#_{CM}$ is then incremented in NVM, in accordance with step 2810. In step 2815, $IV_{AUTH}$ is encrypted with RSK to form an authenticated shared secret key ($SSK_{AUTH}$). The CM next formulates a Rabin encrypted message to send to the HE containing the CM serial number, PMK, $IV_{PMK}$, and $SSK_{AUTH}$, in accordance with step 2820. A random number is provided for padding (PAD) to 2048 bits. When using Rabin' method to either encrypt or decrypt, it is necessary to provide random padding to the data to be encrypted or decrypted so as not to denegrate the level of security, as would be apparent to those skilled in the art. The terms are concatenated and Rabin encrypted by squaring the concatenation modulo $n_{headend}$. The resulting encrypted message is transmitted from the CM to the HE, and is mathematically represented as: $(SN, PMK, IV_{PMK}, SSK_{AUTH}, PAD)^2$ mod $n_{headend}$, in accordance with step 2825. In step 2830, the HE decrypts the message transmitted in step 2825 by taking the square root modulo $n_{headend}$ of the message. The HE then compares the decrypted $IV_{PMK}$ to the $IV_{PMK}$ stored in memory, in accordance with step 2835. If the result of step 2835 is negative, then the HE directs that the Level 2 key exchange and authentication process begins anew at step 2605 of FIG. 26. If, however, the $IV_{PMK}$ comparison yields a match, then the HE decrypts $E_{SSKauth}$ in accordance with step 2840. The decrypted value of the cable modem SN is then compared to the SN stored at the HE, in accordance with step 2845. If the result of step 2845 is negative, then the HE directs that the Level 2 key exchange and authentication process begins again at step 2605 of FIG. 26. If the result of step 2845 is affirmative, however, then the HE writes PMK and PMK#$_{HE-RAM}$ into NVM, in accordance with step 2850. The CM and HE have completed mutual authentication and now both possess a mutually created and mutually authenticated permanent key (PMK). The PMK is designed to be unbreakably encrypted for twenty years, and as such, the public key exchange described is intended to occur only once in the twenty year life of the cable modem, although if the PMK was compromised, a new public key exchange could be accomplished, resulting a new PMK. Advantageously, since the present invention doesn't require a public keying transaction at each connection or power up, delay time is avoided at each connection or power up. Once the PMK is generated, unavailability of the KCA or OS does not affect the present invention at the time of subsequent connections or power up.

One alternative embodiment of the present invention anticipates a variation in the method utilized for procuring a cable modem. This embodiment is useful if an individual CM user purchases a CM from a distributor or an electronics store, rather than being supplied with a cable modem from a cable company. Either packaged with the CM or supplied separately is a tamper-resistant, shrink-wrapped floppy disk containing a list of cable provider public keys. After the user selects a particular provider, the user connects a personal computer to the newly purchased modem and executes the floppy disk. Thee user selects a provider from the list included with the floppy disk. The PC software associates the selected provider with the provider's public key and forwards the key to the CM. The Level 2 process continues as before from this point on. If the software does neat support a particular selected provider, then the OS will supply KCA-generated certificates.

The present invention also incorporates the use of a virtual random number generator (VRNG) at individual cable modems, instead of an actual random number generator (RNG), and maintains an actual random number generator (RNG) only at the HE. The result is a lower priced cable modem. The cable modem operating as a VRNG relies on three sources of uniqueness: the CM counter, the HE counter, and the random number generator at the HE. When the CM is required to generate a random number, it signals the HE to generate a random number in its RNG. The HE then transmits the random number publicly in the form of a certificate. The CM then encrypts the number with its RSK number, known only to the CM, and therefore creates a random number known only to the CM itself and therefore equivalent to a random number generated by an actual RNG. Encryption systems are sometimes defeated by exploiting knowledge of weak randomizers. Using a triply-redundant source of uniqueness strongly mitigates against randomizer weakness.

Figure 29:
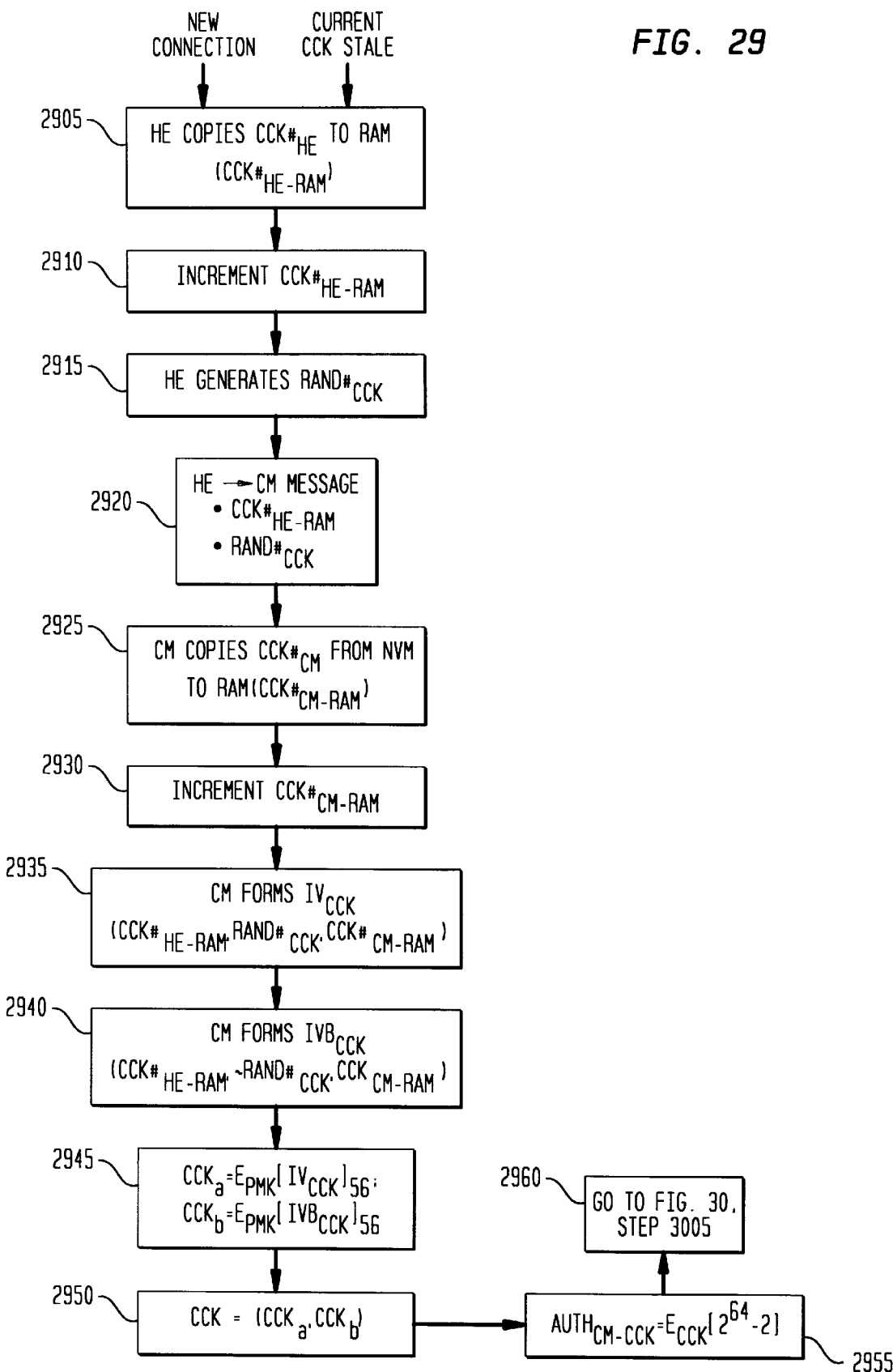
FIG. 29 is an exemplary representation of the method for generating a connection key (CCK) from a mutually authenticated permanent key (PMK), in accordance with the present invention.

FIG. 29 is an exemplary representation of a method for generating a connection key (CCK) from a mutually authenticated permanent key (PMK), in accordance with the present invention. The endpoint of the Level 0 or Level 2 registration process is to generate a secret key, PMK, which is negotiated between and shared by a CM and the HE. The PMK should remain secret for greater than the practical lifetime of the modem, twenty years, but can be regenerated at any time, if compromised. The PMK is used to generate connection keys (CCK). A CCK is another secret key, but is replaced each time there is a new connection between the CM and the HE, or if the CCK currently in use is a week old.

There are four reasons why the CCK is replaced weekly or at the start of each new connection. First, regenerating a new CCK at the start of each new connection prevents the system from vulnerability to an attacker executing a replay attack, that is, a situation where the attacker records and then replays a copy of either end's transmissions at the start of a connection. Such an attack would allow the attacker to decipher, at least partially, subsequent payloads, and in some cases to perfectly decrypt them. Second, although triple-DES is perceived by cryptographers to be very secure, it is nonetheless not a good practice to encrypt a large amount of data with any algorithm. Third, if the number of encrypted sixty-four bit blocks is on the order of $2^{32}$, then it is likely to have repeated ciphertext blocks, generating identical keystream at two different times, and rendering the data vulnerable to an attacker. Fourth, the concept of per-connection or session keys is very popular among providers and users of cryptographic products.

The HE maintains two connection key counters, one RAM based and the other written in NVM. The connection key counter in NVM (CCK#$_{HE}$) is a sixteen bit counter which is incremented at the close of a successful CCK update by loading its RAM-based image. The connection key counter in RAM (CCK#$_{HE-RAM}$) is also a sixteen bit counter. CCK#$_{HE-RAM}$ is incremented immediately after being written to from NVM. In step 2905, the HE copies CCK#$_{HE}$ to its equivalent RAM based counter, CCK#$_{HE-RAM}$. CCK#$_{HE-RAM}$ is then incremented in RAM only, in accordance with step 2910. The HE, in step 2915, then generates a thirty-two bit random number, RANDP#$_{CCK}$. The HE then transmits a message to the CM containing the value of the counter just incremented, CCK#$_{HE-RAM}$, and the random number just generated, RAND#$_{CCK}$, in accordance with step 2920.

A CM maintains two connection key counters, one RAM based and the other written in NVM. CCK counters are utilized at both HE and CM to ensure the uniqueness of each CCK created. The connection key counter in NTVM (CCK#$_{CM}$) is a sixteen bit counter which is incremented at the close of a successful CCK update. The connection key counter in RAM (CCK#$_{CM-RAM}$) is also a sixteen bit counter. CCK#$_{CM-RAM}$ is incremented immediately after being written to from NVM. In step 2925, the CM copies CCK#$_{CM}$ to $CCK_{CM-RAM}$, and increments CCK#$_{CM-RAM}$ only, in accordance with step 2930. In step 2935, the CM forms a connection key initialization vector ($IV_{CCK}$) by concatenating $CCK\#_{HE-RAM}$, $RAND\#_{CCK}$, and $CCK\#_{CM-RAM}$. The CM then takes the one's complement of $RAND\#_{CCK}$ and forms a second connection key initialization vector($IVB_{CCK}$) by concatenating $CCK\#_{HE-RAM}$, the one's complement of $RAND\#_{CCK}$, and $CCK\#_{CM-RAM}$. Ultimately, the connection key CCK is formed by concatenating two smaller connection keys, $CCK_a$ and $CCK_b$. $CCK_a$ is formed, in step 2945, by performing a triple-DES encryption of $IV_{CCK}$ using the 112 bit PMK bit as a key and then truncating the result to fifty-six bits and is mathematically represented as: $CCK_a = E_{PMK}[IV_{CCK}]$. Similarly, $CCK_b$ is formed, also in step 2945, by performing a triple-DES encryption of $IVB_{CCK}$ using the 112 bit PMK bit as a key and then truncating the result to fifty-six bits, and is mathematically represented as: $CCK_b = E_{PMK}[IV_{CCK}]$. The CM then concatenates $CCK_a$ and $CCK_b$ to yield a 112 bit control key, CCK, in accordance with step 2950. In step 2955, the CM creates a sixty-four bit authenticator, $AUTH_{CM-CCK}$, by triple-DES encrypting a sixty-four bit block comprising 63 ones followed by a zero ($2^{64}-2$) with the CCK as a key. This authenticator is used to inform the HE that the CM has the correct CCK. Mutual generation and authentication of CCK continues, in accordance with step 2960, at FIG. 30, step 3005.

In step 3005, the CM transmits a message to the HE, the message containing $IV_{CCK}$ and $AUTH_{CM-CCK}$. The HE then verifies the $CCK\#_{HE-RAM}$ stored in its RAM with the $CCK\#_{HE-RAM}$ just received imbedded within $IV_{CCK}$. If the values do not match, then in accordance with step 3010, the process of mutually generating and authenticating a CCK begins again at step 2905 of FIG. 29. However, if the result of step 3010 is affirmative, then the HE begins to generate a CCK in the same manner as accomplished at the CM. Specifically, in step 3015, $IV_{CCK}$ is created at the HE by concatenating $CCK\#_{HE-RAM}$, $RAND\#_{CCK}$, and $CCK\#_{CM-RAM}$. Similarly, and also in step 3015, $IVB_{CCK}$ is created by concatenating $CCK\#_{HE-RAM}$, the one's complement of $RAND\#_{CCK}$, and $CCK\#_{CM-RAM}$. Ultimately, the connection key, CCK, is formed by concatenating two smaller connection keys, $CCK_a$ and $CCK_b$. $CCK_a$ is formed, in step 3020, by performing a triple-DES encryption of $IV_{CCK}$ using the 112 bit PMK bit as a key and then truncating the result to fifty-six bits and is mathematically represented as: $CCK_a = E_{PMK}[IV_{CCK}]_{56}$. Similarly, $CCK_b$ is formed, also in step 3020, by performing a triple-DES encryption of $IVB_{CCK}$ using the 112 bit PMK bit as a key and then truncating the result to fifty-six bits, and is mathematically represented as: $CCK_b = E_{PMK}[IV_{CCK}]_{56}$. The HE then concatenates $CCK_a$ and $CCK_b$ to yield a 112 bit control key, CCK, in accordance with step 3025.

In step 3030, a check variable, $\omega_{HE}$, is created and set equal to the triple-DES result of ($2^{64}-2$), with CCK being the key. In step 3035, $\omega_{HE}$ is compared with $AUTH_{CM-CCK}$. If the result of this comparison is negative, then proceed to step 3040. In step 3040, if greater than n failures to match $AUTH_{CM-CCK}$ have occurred, then the process of mutually generating and authenticating a CCK begins again at step 2905 of FIG. 29. Otherwise return to step 3015 of FIG. 30 to regenerate $IV_{CCK}$ and $IVB_{CCK}$. If the result of step 3035 is affirmative, then the HE writes $CCK\#_{HE-RAM}$ to $CCK\#_{HE}$ in NVM, which is equivalent to incrementing the value of $CCK\#_{HE}$ stored in NVM, in accordance with step 3045. The HE next creates a sixty-four bit HE authenticator, $AUTH_{HE-CCK}$, by triple-DES encrypting an all ones block ($2^{64}-1$) with the CCK as key, in accordance with step 3050. $AUTH_{HE-CCK}$ is used to inform the CM that the HE has the correct CCK and therefore the CM can safely store its $CCK\#_{CM-RAM}$ to NVM.

In step 3055, the HE transmits a message containing the values of $IV_{CCK}$ and $AUTH_{HE-CCK}$ to the CM. The CM then examines the $IV_{CCK}$ contained in the received message and compares it to the value of $IV_{CCK}$ stored at the CM, in accordance with step 3060. If the result of step 3060 is negative, then the process of generating and authenticating a CCK will begin anew at step 2905 of FIG. 29. Otherwise, the CM next creates a check variable, $\omega_{CM}$, and fixes as its value the triple-DES result of ($2^{64}-1$), with CCK being the key, in accordance with step 3065. In step 3070, $\omega_{CM}$ is compared with $AUTH_{CM-CCK}$. If the values do not match, then the process of generating and authenticating a CCK will begin anew at step 2905 of FIG. 29. Otherwise, $CCK\#_{CM}$ is incremented in NVM, in accordance with step 3075, which is also equivalent to copying the RAM version, $CCK\#_{CM-RAM}$ to $CCK\#_{CM}$ in NVM. The result is a mutually generated and mutually authenticated CCK and therefore the process of encryption of plaintext into ciphertext utilizing SpeedyDES, in accordance with the present invention, may commence.

Figure 31:
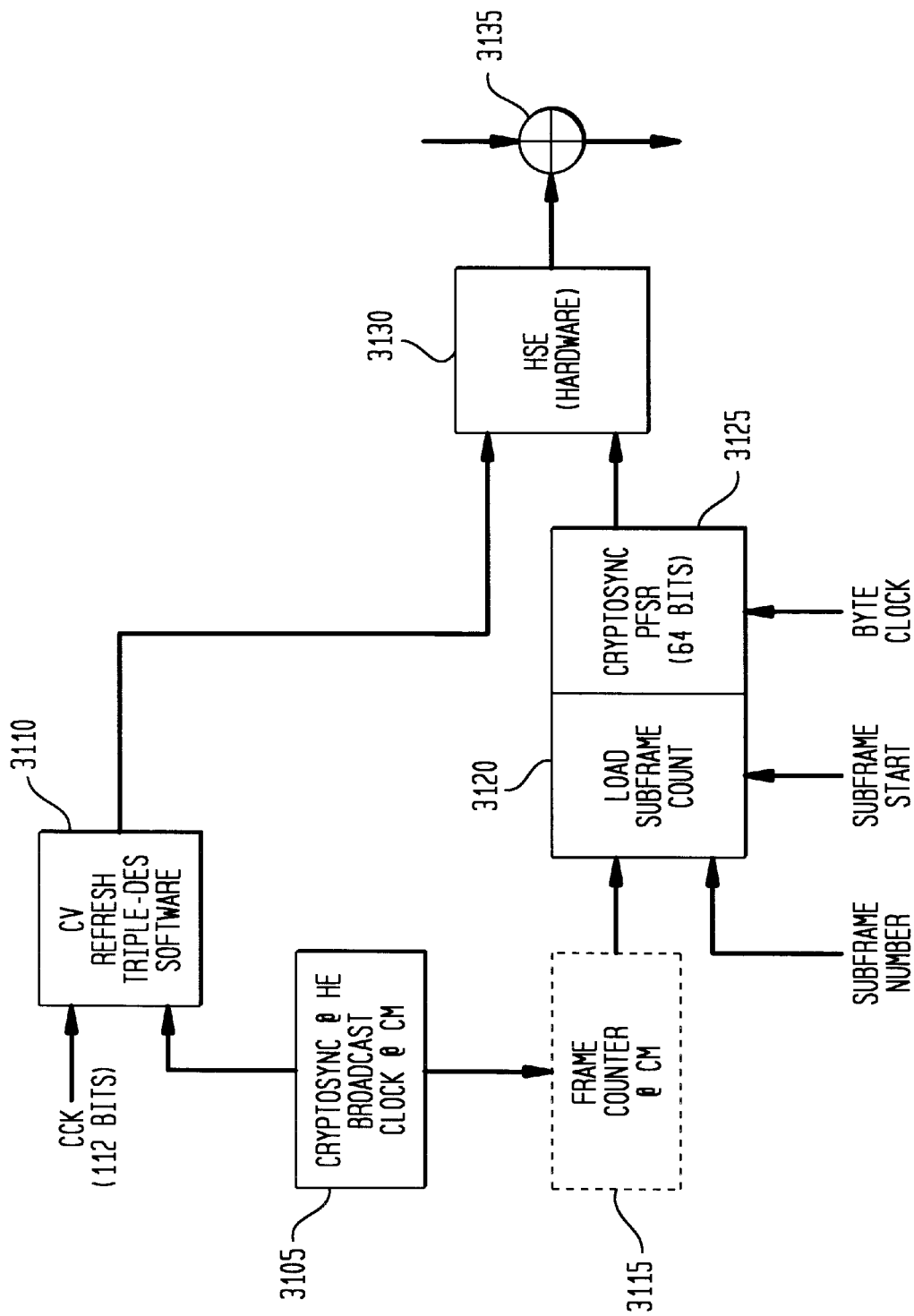
FIG. 31 is a block diagram illustrating an exemplary embodiment of a SpeedyDES keystream generator and the use of cryptosync to obtain ciphertext output, in accordance with the present invention.

FIG. 31 is a block diagram illustrating a SpeedyDES keystream generator and the use of cryptosync to obtain ciphertext output. Cryptosync is defined as the process of synchronizing an encryption algorithm at a transmitter with a decryption algorithm at a receiver. The present invention implements cryptosync by broadcasting a cryptosync clock 3105 from the HE downstream to the individual cable modems. Although utilization of self-synchronizing cable modems is an alternative, utilizing a broadcast clock reduces the costs of the individual cable modems while ensuring proper cryptosylic operation and eliminating error extension. Less than one tenth of one percent of available downstream bandwidth per channel is required to transmit the broadcast clock, therefore little added downstream overhead is incurred, resulting in an economical and efficient method of encryption/decryption. A brief overview of system operation and component interrelationships is presented next, followed by a more in depth description of individual component function and implementation.

Figure 30:
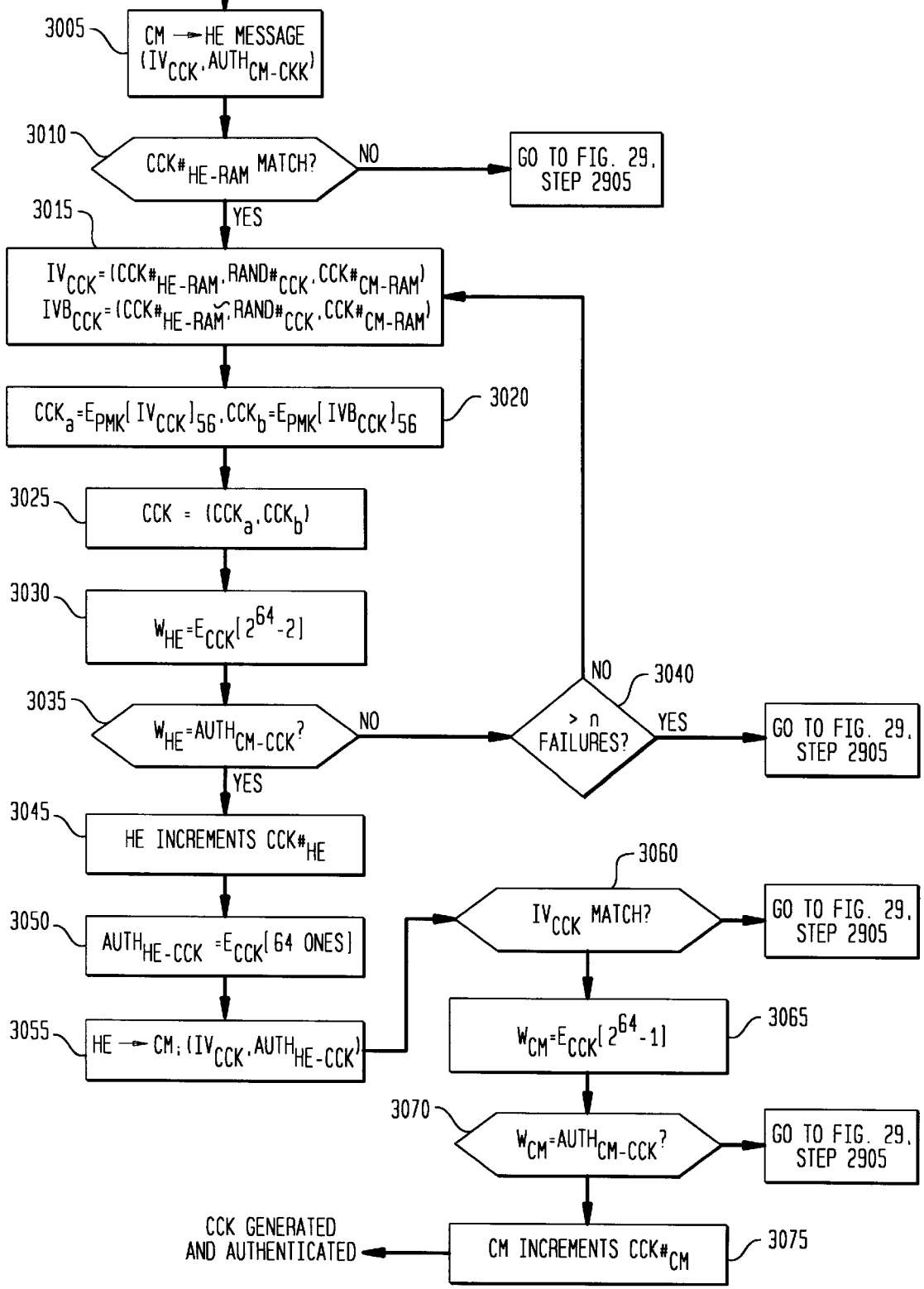
FIG. 30 is a continuation and completion of the exemplary representation begun in FIG. 29.

The CCK generated and authenticated in accordance with FIGS. 29 and 30 is an input to CV Refresh 3110, which performs a triple-DES encryption of a cryptosync clock 3105 in software. The CV Refresh 3110 therefore produces a triple-DES encrypted version of cryptosync clock values keyed to the value of CCK. Because the production of CV's occurs in software, it is inherently slower than an implementation in hardware. Therefore, the resulting CV keystream is one input to the High-Speed Engine (HSE) 3130. The cryptosync clock 3105 is also input to the load subframe count 3120 which in turn is input to the cryptosync pseudorandom feedback shift register (PFSR) 3125. The load subframe count 3120 provides information to the PFSR 3125 regarding the timing and synchronization of the leading edge of each downstream subframe along with a corresponding subframe number. When implemented at a CM, a Frame Counter 3115 is included between the broadcast clock 3105 and the load subframe count 3120. The Frame Counter 3115 produces a forty bit filtered version of the forty bit broadcast clock 3105, enabling continuous operation through bursts of noise which would tend to periodically corrupt all broadcast data, including the broadcast clock 3105. As described previously, the output of the load subframe count 3120 is an input to the cryptosync PFSR 3125. The sixty-four bit output of the PFSR 3125 is utilized to further extend the cryptosync uniqueness across a downstream subframe. The PFSR 3125 performs this function by acting as a scrambler, providing necessary sequence information to cryptoinitialize the HSE 3130, and pre-spreading the input to the HSE, requiring the HSE to perform fewer manipulations to create its bytestream output. The PFSR accomplishes this, in effect, by acting as a pseudo-randomizing bit sequencer.

The HSE 3130 is implemented in hardware and is utilized to provide a cryptographic keystream output operable at the same bit rate as plaintext transmission. The HSE 3130 keystream is then processed by XOR 3135, which provides an exclusive OR operation with data keystream. Incorporated within an encryptor, the HSE 3130 keystream is XOR'ed with a plaintext keystream, resulting in a ciphertext output. Incorporated within a decryptor, the HSE 3130 keystream is XOR'ed with a ciphertext keystream, resulting in a plaintext output.

Since basic system operation has been described, individual components and processes are now described in greater detail. It is understood that the following descriptions, as with previous descriptions within the detailed description of the present invention, are but just one embodiment of the present invention and that numerous modifications and alternative embodiments of the invention will be apparent to those skilled in the art in view of the foregoing description. For example, specific methods of encryption, various key and field lengths, and the order in which certain processes are accomplished may be replaced with others, as would be apparent to those skilled in the art, without departing from the spirit of the invention.

The cryptosync clock 3105, also utilized as the broadcast clock when it is transmitted to cable modems, is a forty bit frame counter. Once each flame, a control message is transmitted containing the clock count. The control message containing the clock is transmitted within the ADAPT fast control field (FCF). A forty bit frame counter was chosen because the count will not repeat for approximately eighty years. A subframe count is appended to the cryptosync clock 3105 to realize a subframe clock/counter. The system operates in a counter mode. Counter mode configures a cryptographic algorithm to be driven by a clock that is publicly known. The algorithm encrypts the clock value with a key to yield keystream. Counter mode is utilized to initialize encryption of various transmission types.

The present invention, known as SpeedyDES, will encrypt all messages and payload, including STM, ATM, and VL PDUs. Control messages, unless otherwise stated, are encrypted and transmitted as VL PDUs. The algorithm used in conjunction with the present invention, is formed in two parts within SpeedyDES. The first is a slow but extremely secure software algorithm implemented in software and known as the CV Refresh 3110. One specific embodiment of the present invention utilizes triple-DES of the cryptosync bits with the CCK as key. The resulting output, as previously described, are CVs. The second part of SpeedyDES is a high speed engine (HSE) 3130, implemented in hardware, which is a high speed, high efficiency, but low security algorithm. One embodiment of the present invention utilizes a Feistel network as the hardware based encrypting algorithm, although other networks implementing other encrypting techniques may be substituted as would be apparent to those skilled in the art. Since the HSE produces a limited number of bytes per CV update (approximately $2^{16}$), its low security is transformed to high security via the uniqueness of the CV update input, and the output of SpeedyDES produces a keystream of high speed, high efficiency, and high security.

The triple-DES algorithm, performed in software, is designed to consume little processing power. Additionally, transmission of controls and messages supporting security requires less than one tenth of one percent of downstream transmission capacity. SpeedyDES offers several advantages over use of a dedicated DES chip integrated within individual cable modems. First, the HSE, or hardware portion of SpeedyDES requires less than 3000 gates, approximately eighty percent fewer gates than a DES implementation in hardware alone, and therefore an HSE can be easily integrated into an ADAPT chip. Second, DES encrypts in increments of eight byte blocks, whereas SpeedyDES performs only enough cycles to yield the required number of keystream bytes, therefore granularity is enhanced, requiring less overhead for padding or the additional expense of implementation with a second DES chip. Third, DES utilizes a fifty-six bit key, whereas SpeedyDES results in the effective strength of two keys (a 112 bit key), resulting a greater degree of security than DES alone.

Transmitting the cryptosync clock as a broadcast clock 3105 for CM use means that each CM does not require its own clock. But because the clock is transmitted, the possibility of clock bit errors due to noise bursts is a problem. A solution is to design an optional Frame Counter 3115 into the cable modems. The frame count at the CM at the output of the Frame Counter 3115 is a forty bit filtered version of the forty bit broadcast clock. The frame count is utilized to provide a unique forty bit number for each frame. Since the frame count is forty bits in length, it will not repeat for approximately eighty years. To extend uniqueness across a frame, four subframe identification bits are appended to the frame count. To further extend the uniqueness across a subframe, the sixty-four bit PFSR 3125 is initialized with the frame count and subframe bits. By utilizing a PFSR 3125 rather than a simple across-frame binary counter, cryptosync upfront spreading is accomplished, reducing the computational load at the HSE 3130 for a given degree of security. For example, if a simple counter were implemented instead of a PFSR, only a few bits of each successive PDU would sequentially change, rendering the security system more vulnerable to decrypting attacks.

As previously described, ciphertext is created by XORing the HSE bytestream output with ADAPT payloads. During the asynchronous portions of subframe transmission (both ATR1 and ATR2), the sixty-four bit cryptosync and the sixty-four bit CV are simultaneously loaded into the HSE at the start of an asynchronous PDU. However, STM encryption presents a more challenging encryption conundrum, in that each downstream STM channel is contained in adjacent time slots (bytes) with no separation to allow for context switching overhead and cryptoalgorithm latency. The problem is addressed by writing STM designated keystream to RAM. Since an ADAPT subframe can accommodate at most 640 downstream STM channels (assuming 256 QAM), one embodiment of the present invention reserves adequate HE RAM to create two tables, Table A and Table B. Each table being 640 bytes wide with N vertical rows. Each column of length N would contain N bytes of keystream from a single modem. At any particular moment, one table would be written to column by column, with SpeedyDES keystream output, while the other table would be read back to the ADAPIT chip for XORing with STM.

A second embodiment of the present invention approaches the STM encryption conundrum in a similar way, but requires less available RAM. Instead of utilizing two tables, one table is used with a width of 640 bytes and a length of N bytes. In shift register fashion, STM bytestream is written to rows of RAM at the top of the pseudo-register, while STM bytestream is read from the bottom of the pseudo-register, thus providing the required delay and essentially decreasing the required RAM by fifty percent.

Either of the arrangements described above, STM encryption with one table or two tables, requires a corresponding adjustment to the cryptosyncing process at the HSE 3130. Accordingly, a virtual STM PDU is defined. A virtual STM PDIU corresponds to an open STM channel, that channel's virtual STM PDU represented by one column of the table implementations just described. Each virtual STM PDU has a length equal to N, which corresponds to the length of the aforementioned table. At the start of a virtual STM PDU, the output of the sixty-four bit PFSR is sampled at the subframe byte number corresponding to its respective STM channel.

In addition to the CCKs and other per-modem variables stored in HE RAM, the sixty-four bit per-context CVs are stored with a three byte CV meter. The CV meter records the quantity of high speed engine (HSE) 3130 usage of each unique CV. One complete cycle of the CV meter for a specific CV indicates that it has become state and should be renewed via triple-DES. The description of CV context generation and cryptosyncing that follows pertains to the CV meter and the periodic refreshing of stale CVs.

CV cryptosync between HE and CMs is enabled through two FCF fields, each seven bytes in length. Both field types contain mini-messages, one mini-message being a predecessor mini-message and the other being a successor mini-message. Mini-messages are not encrypted and are sent in the clear. Mini-messages are formatted as a concatenation of the twelve bit CM address, a four bit sequence number, and a forty bit frame switch count (FSC). Inclusion of the FSC serves two purposes; to inform cable modems when a CV switch occurs, and as an initialization vector for generating the next CV via triple-DES encryption. The FSC is the count of the frame following the last of three predecessor mini-messages. Predecessor mini-messages for a given session key (i.e. context) are sent once in each of the three frames preceding a CV switch. A predecessor mini-message has priority, within the FCF, over successor mini-messages.

Successor mini-messages are formatted identically to predecessor mini-messages. For the purpose of timing successor mini-messages, the HE cycles through a list of active sessions. For a given list element, the HE then transmits one successor mini-message in the next available FCF mini-message field, that is, a mini-message field not being allocated to a predecessor mini-message. Since mini-messages are not transmitted frequently, a low density demand for mini-message allocation results, and successful. transmission of a successor mini-message on a first attempt is frequently observed. If a cable modem misses all three predecessor mini-messages transmitted, but received at least one of the successor mini-messages, the cable modem will immediately switch to the new CV and begin generating the next CV to be used, thus the entire payload during the remainder of a missed CV will not be lost.

A new CV is utilized only if the CV meter count reaches $2^{16}$, the HE software has generated a new CV, and the new CV has been communicated to the HE hardware. Once these conditions are met, the HE transmits three predecessor mini-messages in the three frames immediately prior to the actual switch frame. The switch frame is defined as the first frame to actively utilize a newly generated CV. The switch frame is synchronized at the HE and cable modems so that each switch to the new CV on the same frame. A properly synchronized switch to the new CV assumes that at least one predecessor mini-message had been received at the CM. If the CM has missed all three predecessor mini-messages, then only the HE will switch to a new CV. HE and CM will have lost cryptosync at this point. However, HE hardware transmits successor mini-messages after the new CV was implemented at the HE. Since mini-messages are not encrypted and are transmitted in the clear, the cable modem can understand subsequent mini-messages, despite the HE implementation of a new CV. Mini-messages are sequenced to each cable modem by cycling through the list of active sessions. When a cable modem that has lost cryptosync with the HE receives a successor mini-message, the cable modem is instructed to immediately switch to the new CV.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather than limitation, and that details of the structure may be varied substantially without departing from the spirit of the invention and the exclusive use of all modifications which come within the scope of the appended claims are reserved.

What is claimed is:

1. A method for encryption of a digital signal transmitted from a source to a destination, said method comprising the steps of:

generating a multiplicity of periodic units from a clock;

representing each of said multiplicity of periodic units with an identifying pattern of bits corresponding thereto;

utilizing said identifying pattern of bits as an encrypting variable at said source; and transmitting said identifying pattern of bits, accompanying said digital signal, to said destination.

2. The method in accordance with claim 1, said method encrypting partially in software and partially in hardware, said method further comprising the steps of:

utilizing said identifying pattern of bits as a unique encrypting variable for a portion of encryption performed in software; and utilizing said identifying pattern of bits as a unique encrypting variable for a portion of encryption performed in hardware.

3. The method in accordance with claim 2 further comprising the steps of:

creating a permanent key, said permanent key being mutually generated and mutually authenticated between said source and said destination;

utilizing said permanent key to generate a connection key, said connection key mutually generated and mutually authenticated between said source and said destination;

encrypting said identifying pattern of bits in software, said connection key operable as an encrypting key, said encrypting process producing a series of cryptovariables;

sending cryptosync to a high speed engine, said high speed engine operable to encrypt said cryptosync, said high speed engine providing a rapid keystream generation output; and sending said cryptovariables to said high speed engine, said cryptovariables operable as keys for encryption of said cryptosync within said high speed engine.

4. The method in accordance with claim 3 wherein said connection key is replaced with a unique mutually generated and authenticated connection key for each new connection between said source and said destination.

5. The method in accordance with claim 3 wherein said connection key is replaced with a unique mutually generated and authenticated connection key whenever a specific duration of time has expired.

6. The method in accordance with claim 3 wherein each of said cryptovariables is replaced after a specified number of keystream bytes generated from said high speed engine with each of said cryptovariables.

7. The method in accordance with claim 1 further comprising the steps of:
   incorporating said identifying pattern of bits as a cryptosync stream;
   dividing said cryptosync stream into a multiplicity of frame counter packets;
   assigning each of said multiplicity of frame counter packets to each of a multiplicity of downstream frames;
   broadcasting each of said multiplicity of downstream frames to a plurality of destinations;
   reformatting said multiplicity of frame counter packets into said cryptosync stream at said plurality of destinations; and
   utilizing said cryptosync stream at each of said plurality of destinations as a broadcast clock, said broadcast clock utilized for decryption of said transmitted digital signal.

8. The method in accordance with claim 7 wherein broadcast of each of said multiplicity of frame counter packets is transported within a region of downstream frame structure dedicated to transport of asynchronous data.

9. The method in accordance with claim 7 wherein broadcast of each of said multiplicity of frame counter packets is transported within a fast control field (FCF), said FCF being a subdivided portion of said region of downstream frame structure dedicated to transport control and messaging information.

10. A method for encryption of a digital signal transmitted from a source and subsequent decryption at a destination, said method comprising the steps of:
    dividing time into a multiplicity of periodic units;
    representing each of said multiplicity of periodic units with a unique bit pattern corresponding thereto;
    utilizing said unique bit pattern for encrypting said digital signal at said source;
    transmitting said unique bit pattern, accompanying said digital signal, to said destination; and
    utilizing said unique bit pattern for decrypting said digital signal at said destination.

11. The method in accordance with claim 10, said method including a first portion of encryption performed in software and a second portion of encryption performed in hardware, said method further comprising the steps of:
    encrypting said unique bit pattern with a secret connection key as said first portion;
    utilizing said unique bit pattern as a pseudo-frame counter, said pseudo-frame counter an input to a pseudorandom feedback shift register (PFSR);
    transforming said unique bit pattern within said PFSR into a high speed engine (HSE) cryptosync;
    inputting said HSE cryptosync to a device implementing said second portion of encryption, said device comprising a high speed engine (HSE);
    utilizing said first portion of encryption output as an input to said HSE;
    generating an encryption keystream from said HSE, said encryption keystream formulated by encrypting said HSE cryptosync with said first portion of encryption output as said key; and
    utilizing said encryption keystream to encrypt a stream of plaintext from said source into a stream of ciphertext, said ciphertext to be transmitted to said destination.

12. The method in accordance with claim 11 wherein said HSE cryptosync further comprises an input associating individual subframe identities with a unique combination of bits within said HSE cryptosync.

13. The method in accordance with claim 11 wherein said PFSR output is utilized to extend said PFSR uniqueness across a downstream subframe by acting as a scrambler.

14. The method in accordance with claim 11 wherein said PFSR output is utilized to pre-spread input to said HSE, said pre-spreading reducing computational loading of said HSE.

15. The method in accordance with claim 11 wherein said PFSR output is utilized to cryptoinitialize said HSE.

16. The method in accordance with claim 11 further comprising the steps of:
    encrypting said secret connection key to generate a plurality of cryptovariables within said first portion of encryption;
    periodically replacing a previous cryptovariable with a unique new cryptovariable; and
    transmitting a mini-message to said destination, said mini-message used to notify said destination of a utilization of said unique new cryptovariable.

17. The method in accordance with claim 16 wherein said mini-message is a predecessor mini-message, said predecessor mini-message transmitted prior to said utilization of said unique new cryptovariable.

18. The method in accordance with claim 16 wherein said mini-message is a successor mini-message, said successor mini-message transmitted subsequent to said utilization of said unique new cryptovariable.

19. The method in accordance with claim 16 wherein said mini-message is transmitted within a fast control field.

20. The method in accordance with claim 11, said method operable for transmission of synchronous transfer mode (STM) protocol data units (PDUs), said method further comprising the steps of:
    sampling said encryption keystream designated for encryption of said STM PDUs;
    writing a plurality of STM PDU encryption keystream sample values to at least one table, said at least one table configured as a pseudo-shift register;
    reading said plurality of STM PDU encryption keystream sample values from said at least one table after an appropriate temporal delay, said appropriate temporal delay chosen to compensate for context switching overhead and cryptoalgorithm latency encountered with STM PDU transmission;
    encrypting STM PDU plaintext with said plurality of STM PDU encryption keystream sample values, said sample values having been read from at least one table after said appropriate temporal delay; and
    transmitting a plurality of encrypted STM PDUs to said destination for subsequent decryption.

21. The method in accordance with claim 20 wherein said at least one table is implemented as a first table and a second table; said first table used for writing to while said second table is being read from; and said first table used for reading from while said second table is being written to.

22. The method in accordance with claim 20 wherein said at least one table is implemented with one table, said table providing said appropriate temporal delay by performing as a pseudo-shift register.

23. The method in accordance with claim 10, said method encompassing bi-directional data transfer between a common source and a plurality of destinations, said method further comprising the steps of:

mutually authenticating said common source with each of said plurality of destinations; and mutually generating a shared secret permanent key between said common source and each of said plurality of destinations.

24. The method in accordance with claim 23, said method featuring an asymmetric encrypting/decrypting exchange for mutual authentication and shared secret permanent key generation, further comprising the steps of:

transmitting at least one encrypted authenticating message from said common source to each of said plurality of destinations;

transmitting encrypted authenticating return messages from each of said plurality of destinations to said common source over a separate plain old telephone service (POTS) return;

utilizing encryption/decryption functions using squaring operations at each of said plurality of destinations; and utilizing encryption/decryption functions using square root operations at said common source.

25. The method in accordance with claim 23, said method featuring an asymmetric encrypting/decrypting exchange for mutual authentication and shared secret permanent key generation over a two-way broadband transmission medium, further comprising the steps of:

transmitting downstream encrypted authenticating messages from said common source to each of said plurality of destinations over said two-way broadband transmission medium;

transmitting return upstream encrypted authenticating messages from each of said plurality of destinations to said common source over said two-way broadband transmission medium;

utilizing encryption/decryption functions using squaring operations at each of said plurality of destinations; and utilizing encryption/decryption functions using square root operations at said common source.

26. A method for encryption at a source, and decryption at a destination, of digital signal bi-directional transmission between a headend and a plurality of cable modems, said digital signal bi-directional transmission over a broadband hybrid fiber/coax communications network, said method comprising the steps of:

dividing time into a multiplicity of periodic units at said headend;

representing each of said multiplicity of periodic units with an identifying bit pattern corresponding thereto;

utilizing said identifying bit pattern as an encrypting variable at said headend;

transmitting said identifying bit pattern to said plurality of cable modems; and utilizing said identifying bit pattern as a decrypting variable at said plurality of cable modems.

27. The method in accordance with claim 26, said method encompassing bi-directional data transfer between said headend and said plurality of cable modems, said method further comprising the steps of:

mutually authenticating said headend with each of said plurality of cable modems; and mutually generating a shared secret permanent key between said headend and each of said plurality of cable modems.

28. The method in accordance with claim 27 wherein said headend is operable to select an appropriate level of security.

29. The method in accordance with claim 27, said method incorporating a process of mutually authenticating said headend to each of said plurality of cable modems, said method requiring the bilateral transmission of certificates between said headend and each of said plurality of cable modems, said method requiring generation of random numbers at said headend and each of said plurality of cable modems, said method further comprising the steps of:

incorporating a random number generator at said headend;

writing a unique random seed key within a nonvolatile memory component of each of said plurality of cable modems;

generating a random number as required at the headend via said random number generator;

publicly transmitting said random number to one of said plurality of cable modems; and one of said plurality of cable modems performing as a virtual random number generator by encrypting said random number with said unique random seed key.

30. A bi-directional broadband communications and data transfer encryption system having a plurality of cable modems, said plurality of cable modems interconnected with a headend via a transmission medium having a multiple access upstream channel and a broadcast downstream channel, comprising:

a cryptosync clock at said headend, said cryptosync clock dividing time into a multiplicity of periodic units;

a CV refresh unit, said CV refresh unit obtaining one input from said cryptosync clock and a second input from a connection key, said CV refresh unit encrypting said cryptosyne clock with said connection key, said CV refresh unit producing a cryptovariable output;

a load subframe counter, said load subframe counter obtaining one input from said cryptosync clock, a second input of a subframe identifying number, and a third input of a subframe start indicator;

a cryptosync pseudorandom feedback shift register (PFSR), said load subframe counter input to said PFSR, said PFSR providing initial prespreading of high speed engine cryptosync;

a high speed engine (HSE), said HSE producing an keystream generator output, said HSE having a HSE cryptosync as a first input and said cryptovariable as a second input; said second input utilized as an encryption key for said first input;

an XOR gate, said XOR gate performing a bit by bit "exclusive or" operation between said keystream generator output and a plaintext bytestream, said XOR gate producing a ciphertext bytestream output for transmission to said cable modem; and a broadcast clock, said broadcast clock consisting of the transmission of said headend cryptoclock to said plurality of cable modems, said broadcast clock utilized for decryption of said ciphertext bytestream at said plurality of cable modems.

31. The encryption system of claim 30 wherein said CV refresh unit is implemented in software.

32. The encryption system of claim 30 wherein said HSE is implemented in hardware.

33. The encryption system of claim 30 wherein encryption algorithms requiring utilization of a square root function are performed at the headend.

34. The encryption system of claim 30 wherein encryption algorithms requiring utilization of a square function are performed at said plurality of cable modems.

* * * * *